US012103018B2

(12) United States Patent
Sethi

(10) Patent No.: US 12,103,018 B2
(45) Date of Patent: Oct. 1, 2024

(54) HIGH-EFFICIENCY SMOOTH BORE NOZZLES

(71) Applicant: HEN Nozzles Inc., Castro Valley, CA (US)

(72) Inventor: Sunny Sethi, Castro Valley, CA (US)

(73) Assignee: HEN NOZZLES INC., Castro Valley, CA (US)

( * ) Notice: Subject to any disclaimer, the term of this patent is extended or adjusted under 35 U.S.C. 154(b) by 112 days.

(21) Appl. No.: 17/112,990

(22) Filed: Dec. 5, 2020

(65) Prior Publication Data

US 2021/0086006 A1 Mar. 25, 2021

Related U.S. Application Data

(63) Continuation-in-part of application No. 16/595,218, filed on Oct. 7, 2019, now abandoned.

(60) Provisional application No. 62/880,567, filed on Jul. 30, 2019.

(51) Int. Cl.

| | |
|---|---|
| ***B05B 1/06*** | (2006.01) |
| ***B05B 1/04*** | (2006.01) |
| ***B05B 1/12*** | (2006.01) |
| ***B05B 1/26*** | (2006.01) |
| ***B05B 1/34*** | (2006.01) |
| *A62C 31/03* | (2006.01) |

(52) U.S. Cl.

CPC ................ *B05B 1/06* (2013.01); *B05B 1/044* (2013.01); *B05B 1/12* (2013.01); *B05B 1/26* (2013.01); *B05B 1/3402* (2018.08); *A62C 31/03* (2013.01)

(58) Field of Classification Search

CPC ........... B05B 1/06; B05B 1/044; A62C 31/02; A62C 31/05

USPC .......................................... 239/589, 592–595

See application file for complete search history.

(56) References Cited

U.S. PATENT DOCUMENTS

| | | | |
|---|---|---|---|
| 177,239 | A | 5/1876 | Haley |
| 583,969 | A | 6/1897 | Askins |
| 927,449 | A | 7/1909 | Carnahan |
| 1,067,069 | A | 7/1913 | Smith |

(Continued)

FOREIGN PATENT DOCUMENTS

| | | |
|---|---|---|
| CH | 240951 | 2/1946 |
| CN | 105498134 B | 9/2018 |

(Continued)

OTHER PUBLICATIONS (PCT) US Patent and Trademark Office (ISA/US), International Search Report and Written Opinion of the International Searching Authority, International Application No. PCT/US2022/012242, 9 pages, Apr. 4, 2022.

(Continued)

*Primary Examiner* — Jason J Boeckmann

(74) *Attorney, Agent, or Firm* — Thompson Hine LLP

(57) ABSTRACT

A high efficiency nozzle is designed. The nozzle allows water streams with long-range and high surface area in one system. Suitable transitions in the fluid pathways allow creating water streams that have a robust flow profile. The system allows minimum energy loss whilst maximizing the velocity and surface area. Such nozzles can be used for a variety of applications including but not limited to fire suppression, pressure washing, watering, and other such applications.

27 Claims, 26 Drawing Sheets

(56) References Cited

U.S. PATENT DOCUMENTS

| | | | | | |
|---|---|---|---|---|---|
| 1,445,208 | A * | 2/1923 | Forward | F23D 11/10 | 239/592 |
| RE20,488 | E | 8/1937 | Zinkil | | |
| 2,092,897 | A | 9/1937 | Sudhaus | | |
| 2,130,173 | A | 9/1938 | Barnes | | |
| 2,166,300 | A * | 7/1939 | Komar | B21B 45/08 | 239/592 |
| 2,959,359 | A | 11/1960 | Casaletto | | |
| 3,101,906 | A * | 8/1963 | Webber | B05B 1/044 | 239/592 |
| 4,380,319 | A | 4/1983 | Shigut | | |
| 4,572,165 | A | 2/1986 | Dodier | | |
| 4,986,477 | A | 1/1991 | Roman | | |
| 5,283,990 | A | 2/1994 | Shank, Jr. | | |
| 5,704,825 | A | 1/1998 | LeCompte | | |
| 5,850,971 | A | 12/1998 | Smith | | |
| 5,975,996 | A | 11/1999 | Settles | | |
| 6,129,293 | A | 10/2000 | Jäger | | |
| 6,293,857 | B1 | 9/2001 | Allard | | |
| 6,598,810 | B2 | 7/2003 | Lanteri | | |
| 6,626,738 | B1 | 9/2003 | Shank | | |
| 6,969,015 | B1 * | 11/2005 | Salmela | B05B 1/042 | 239/455 |
| 7,458,532 | B2 | 12/2008 | Sloan | | |
| 7,669,780 | B2 | 3/2010 | Sugano | | |
| 9,649,644 | B2 | 5/2017 | Sloan | | |
| 2005/0205696 | A1 * | 9/2005 | Saito | B05B 1/04 | 239/592 |
| 2009/0193615 | A1 | 8/2009 | Nguyen | | |
| 2014/0131484 | A1 | 5/2014 | Gomez et al. | | |
| 2018/0236465 | A1 | 8/2018 | Krayer | | |
| 2021/0086203 | A1 | 3/2021 | Sethi | | |
| 2022/0176177 | A1 | 6/2022 | Sethi et al. | | |

FOREIGN PATENT DOCUMENTS

| | | | |
|---|---|---|---|
| EP | 1106212 | A1 | 6/2001 |
| NL | 8900809 | | 11/1990 |
| WO | 2016/031612 | A1 | 3/2016 |
| WO | 2017/195939 | A1 | 11/2017 |

OTHER PUBLICATIONS

U.S. Patent and Trademark Office, Non-Final Office Action, U.S. Appl. No. 16/595,218, 11 pages, Jul. 13, 2021.

U.S. Patent and Trademark Office, Final Office Action, U.S. Appl. No. 16/595,218, 8 pages, Dec. 6, 2021.

(PCT) European Patent Office (ISA/EP), Invitation to Pay Additional Fees, Partial International Search and Provisional Opinion, International Application No. PCT/US2021/038393, 11 pages, Nov. 11, 2021.

International Search Report and Written Opinion issued Aug. 18, 2022 which pertains to PCT Application No. PCT/US2022/030831, filed May 25, 2022, 12 pages.

International Search Report and Written Opinion issued Aug. 19, 2022 which pertains to PCT Application No. PCT/US2022/030833, filed May 25, 2022, 8 pages.

(PCT) European Patent Office (ISA/EP), International Search Report and Written Opinion of the International Searching Authority, International Application No. PCT/US2021/038393, 17 pages, Jan. 24, 2022.

English Translation of CH 240951 (Feb. 15, 1946).

U.S. Non-Final Office Action issued Dec. 2, 2021 which pertains to U.S. Appl. No. 17/112,993, filed Dec. 5, 2020, 16 pages.

U.S. Final Office Action issued Jun. 6, 2023 which pertains to U.S. Appl. No. 17/112,993, filed Dec. 5, 2020, 23 pages.

WIPO, International Preliminary Report on Patentability issued Jun. 15, 2023 which pertains to PCT Application No. PCT/US2021/038393, filed Jun. 22, 2021, 12 pages.

WIPO, International Preliminary Report on Patentability issued Jan. 4, 2024, which pertains to PCT Application No. PCT/US2022/012242. 8 pages.

WIPO, International Preliminary Report on Patentability issued Jan. 4, 2024, which pertains to PCT Application No. PCT/US2022/030831. 12 pages.

WIPO, International Preliminary Report on Patentability issued Jan. 4, 2024, which pertains to PCT Application No. PCT/US2022/030833. 7 pages.

* cited by examiner

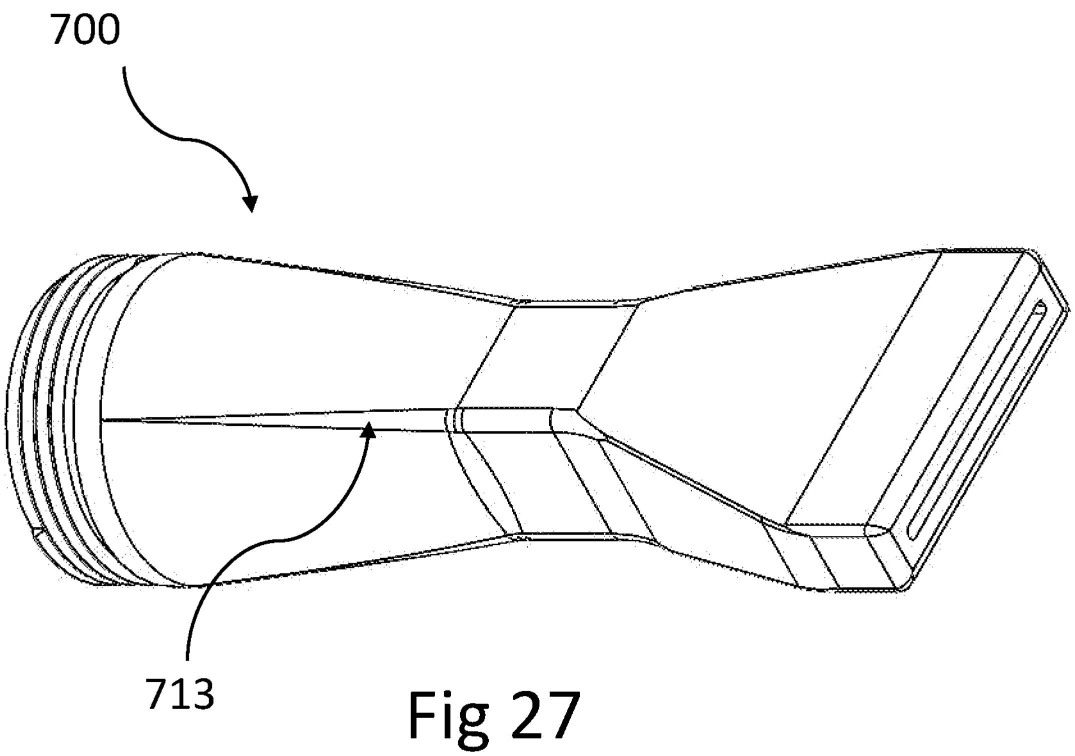
Fig 27
Fig 28
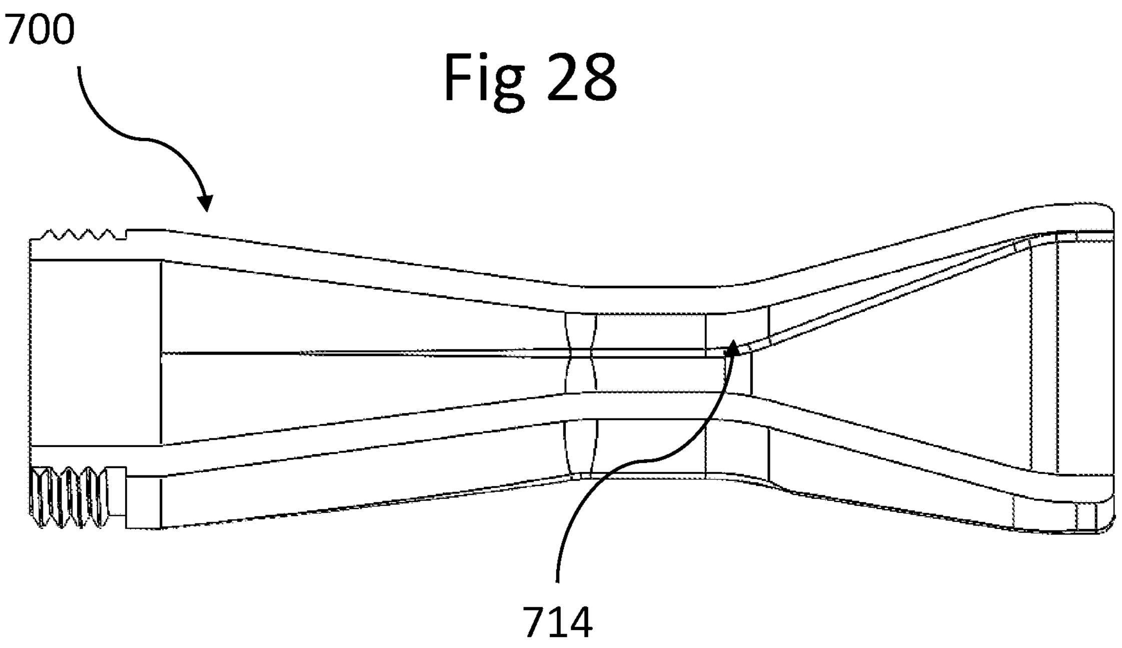

HIGH-EFFICIENCY SMOOTH BORE NOZZLES

FEDERALLY SPONSORED RESEARCH

This invention was made with government support under NSF Award Number (FAIN): 2014176 awarded by the National Science Foundation (NSF). The government has certain rights in the invention."

SEQUENCE LISTING OR PROGRAM

Not Applicable

TECHNICAL FIELD OF THE INVENTION

The present invention relates generally to systems and methods for manipulating water flow to generate water stream for fire suppression and other purposes. More specifically, the present invention relates to nozzles used with fire hoses. The nozzles may be designed to fit different hose sizes and can be manufactured out of different materials including but not limited to metals and polymers.

BACKGROUND OF THE INVENTION

A variety of methods are employed by fire departments across the U.S. to suppress fires. The fundamental mechanism of any fire suppression technique involves one or more of the following strategies: 1. Reduce ambient temperature; 2. Dilute amount of oxygen; 3. Introduce radical quenchers in the system; and 4. Remove the flammable material.

A variety of ground and aerial equipment are used to effectively implement a combination of 1 and 2 above. In some cases, chemicals that can quench the radicals can be sprayed over the affected area, however, the use of such chemicals can cause toxicity concerns. Therefore, till date, the most prominent technique for fire suppression is use of water streams.

Water is an excellent fire control material due to its thermal, physical, and chemical characteristics. When water is introduced in a fire, two key fire suppression effects occur: 1. Cooling effect: Water has a heat capacity of 4.2 J/g·K and a latent heat of vaporization of 2442 J/g. What this means is that if say a gallon of water, at 20° C. in poured on a burning fire and all the water evaporates, then the total heat that water will extract from the fire is 10.5 MJ.

However, in real life, not all the water may evaporate. Some water may fall and get absorbed by the porous surface. Water that is evaporating is extracting heat from the fire plumes and water that ends up falling on the surface, cools the fuel surface.

It is noteworthy that depending on the initial temperature of the water, heat absorbed via evaporation is significantly higher than heat absorbed via specific heat.

In addition to cooling effects, evaporating water helps in diluting oxygen and fuel vapors. For a large number of hydrocarbon fuels, Limiting Oxygen Concentration (LOC) is around 12% in air. What this means is that if oxygen percentage in air, drops below 12%, the flame (oxidative reaction) will extinguish. As water evaporates, its volume increases by almost 1,700 times. This means that 1 gallon of water will evaporate in over 1,700 gallons of steam.

Even though water has such superior fire suppression capabilities, some other key aspects need to be considered to maximize efficiency. These include reach, penetration, water, stream's evaporation efficiency, and geometry.

Reach or range is defined as the distance that the water jet can travel. This means the water jet need to have a maximum velocity that is allowable with the given equipment. The velocity of the water stream or water jet at the point where it leaves the nozzle and enters the atmosphere is termed as exit velocity. Another key aspect that determines water's effective reach is the droplet size. Small droplets dissipate easier than larger droplets. For two water streams with the same exit velocity, the stream with smaller water droplets will dissipate sooner and would have a smaller effective range than the stream with larger droplets. For fire-fighter safety and effectiveness of fire control, the line of attack needs to be as far as possible. Another key aspect to consider is the penetration of water jets. Penetration is the ability of the water jet to cut through dense media and reach the target. Examples of dense media in fire-fighting include hot gases, thick grass, or other fuel source. The hot gases from the burning region maybe flowing at significant velocity. Any droplets that get blown away before reaching the fire lead to lower efficiency, lower effective range and may even pose risk to fire fighters. Penetration is a direct function of the momentum of the water droplet. That is, it depends on both the velocity and the mass of the water droplet.

Another example of the significance of penetration is in wildland fires. High penetration is critical for extinguishing the flames in thick brush fires. In cases where water streams may have low penetration, the surface fire may suppress but the internal regions can have burning regions. This can cause the re-ignition of flames.

A water stream's evaporation efficiency is a critical parameter that determines how much heat would be absorbed per unit water used. In wildfires, the burning structures include grass, trees, and airborne foliage. Water that falls on the ground may seep into the porous surface and not contribute to cooling. As an example, say 1 Gallon of water is introduced in a fire area and only 0.5 Gallon of water evaporate. Other 0.5 Gallon falls on the porous ground and gets seeped in the ground. Total heat absorbed in this case would be:

Weight in gms of 1 Gallon of water=3780 gms

Heat absorbed in going from 20° C. to 100° C.=4.2×3780×(100°−20° C.)=1.27 MJ

Heat absorbed by 0.5 Gallon due to evaporation=(2442×3780)/2=4.6 MJ

Total heat absorbed=4.6+1.3=5.9 MJ

As compared to 10.5 MJ/Gallon absorbed when 100% of water is evaporated, only 5.9 MJ/Gallon is absorbed when 50% of water is evaporated. In addition to lower cooling efficiency, a lower evaporation rate would also lead to a smaller degree of dilution.

The geometry of the water stream can play a critical role both for fire suppression rate and ergonomics of the fire-fighters. Ideally more lateral area covered by a water jet would allow firefighters to cover a larger area with fewer bodily movements. In addition, for certain fires, wider water streams present a more stable geometry to allow targeting the fire region with greater precision as compared to narrow water streams. For a given flow rate, a larger width water stream will have a thinner profile. This tends to create unstable water stream and it would start converting to smaller droplets before reaching a suitable target. To allow greater reach and spread, diverging streams are most ideally suited, where diverging streams can be defined as a water stream that increases in external surface area as it moves from source to target This process of increasing the external surface area causes the water stream to start thinning and eventually break down in smaller droplets.

Nozzles are often used to manipulate the flow of the incoming water stream to create an outgoing stream with suitable velocity and geometry. Nozzles are devices that have two openings, an "inlet" or the opening through which water enters the nozzle and an "outlet" or region through which the water leaves the nozzle. The incoming water stream that enters the inlet of the nozzle, is defined by its "static pressure" and its "volumetric flow rate". The static pressure is the pressure exerted by a fluid when there is no flow. This pressure is generally measured by stopping the water flow using devices such as end caps or valves and measuring the pressure using pressure gauge. Pumps like in fire engines or fire-hydrants maybe used to create generate this pressure. The volumetric flow rate is a function of pressure, hose type, hose length, and nozzle.

In the US most common unit to measure this static pressure is pounds per square inch "PSI". A typical static pressure in fire hydrants can range from 50 PSI-100 PSI. Fire engines may be able to use pumps to create higher PSI. The volumetric flow rate of the stream is the volume of water passing through a cross-section per unit time.

In the US this is generally measured in gallons per minute (gpm). Other common units to measure the volumetric flow rate is liters per minute (lpm). The shape and size of the inlet and outlet along with the internal geometry of the nozzle determine the key properties of the final stream that comes out of the outlet. These key properties of the final stream that may be critical for fire control include but are not limited to the velocity of the stream, the throughput of the stream, and the geometrical shape of the stream.

The velocity increase happens in nozzles due to the principles of conversation of mass. Water being an incompressible liquid, the amount of water that enters the nozzle per unit time should be the same as the amount of water that leaves the nozzle. If the inlet has an area $A_{in}$ and velocity $V_{in}$ and outlet has an area $A_{out}$ and velocity $V_{out}$. Then by conservation of mass:

$$A_{in} \times V_{in} = A_{out} \times V_{out}$$

Thus, ideally just by reducing the area of outlet, we can achieve higher jet velocities. However, there are other aspects of fluid flow that are not captured by the conservation of mass. The second aspect, that is based on conservation of energy is given by Bernoulli's equation:

$$P_1 + \tfrac{1}{2}\rho\upsilon_1^2 + \rho g h_1 = P_2 + \tfrac{1}{2}\rho\upsilon_2^2 + \rho g h_2$$

Bernoulli's equation captures the effect of inlet and outlet pressure, kinetic energy and potential energy due to gravitational effects. Since a nozzle inlet and outlet height difference is negligible, we can ignore those terms and the equation for our case becomes:

$$P_1 + \tfrac{1}{2}\rho\upsilon_1^2 = P_2 + \tfrac{1}{2}\rho\upsilon_2^2$$

An example of Bernoulli's flow is shown in FIG. 4.

A key aspect governing cooling efficiency is the throughput of water that is coming out of the nozzle. To maximize outlet throughput, it is important to minimize any back-pressure or residual pressure that may be created due to nozzle geometry. The amount of back-pressure depends on the geometry of the flow channel. For the given water throughput, that is measured in units such as gallons per minute (gpm), this back pressure increases as the ratio of inlet and outlet increases. This means that as we go to smaller and smaller outlet diameter, we cannot increase the velocity of the stream indefinitely. The constricted exit starts to reduce the gpm. Therefore, two different CSAs may have the same exit velocity but different GPM. This constriction effect where GPM is reduced by reducing the exit CSA is used to control the flow-rate of the fire-hose nozzles. For example, in cases where water availability is constrained, a lower GPM stream is preferable. In that scenario, smaller orifice nozzles are used by the fire-fighters.

In addition to constrictions caused by reducing the exit area, the inner geometry of the nozzle can also impact the backpressure and flow rate. For example, a large number of spray or fog nozzles are based on impinging of high-velocity water on some form of a surface to break the water jet down in smaller droplets. Geometries that allow water flow without significant back-pressure are called streamlined bodies. The flow pathways that can create a no-flow zone in certain sections are called blunt or bluff or blunt bodies.

In addition to high velocity and high gpm, the efficiency of the exiting stream may include other factors, such as back blow, the impact of wind on the stream direction, and ability of the stream to deliver maximum amount of the water at the target. For cases where fog nozzles are used, due to formation of small droplets very close to the nozzle, the water is highly sensitive to wind directions and a significant amount of water may be lost before reaching the target.

Another critical aspect of any firefighting nozzle is nozzle reaction. Nozzle reaction is the force that nozzle exerts on the fire fighter handling the nozzle. This reaction force has two components to it. A backward force that is caused due to large volumes of water exiting through the nozzle and a combination of upward and backward force that is caused due to poor design of the nozzle.

Currently, commercial nozzles fall in two categories. They are called smooth bore nozzles and fog nozzles. Smooth bore nozzles and have a truncated cone geometry. They are known as smooth bore because the flow pathway inside the nozzle has no features or restrictions. This allows the water to flow without experiencing any backpressure. Smooth bore nozzles are defined by the inlet size and opening diameter of the exit. For example, for handlines nozzles in the US, most of the smooth-bore nozzles have an inlet of 1.5". These 1.5" inlet nozzles may have exit diameters from ⅜" to more than 1". These exit diameters are also known as the orifice size. Fire-departments decide what orifice size to employ based on a variety of factors like type of fire and availability of water. As an example, municipal fire departments that have access to fire-hydrants may choose a 15/16" orifice nozzle, whereas a wildland fire department with no access to fire-hydrants may choose ⅜" or ½" orifice nozzle.

For the given orifice size, smooth-bore nozzles have long reach and high penetration. However, these water streams lack high surface area that is required to boost the cooling efficiency. As an example, a ⅜" smooth bore nozzle, under 50 PSI may have a flow of 30 GPM and a 15/16" smooth bore nozzle under similar condition will have a flow of 150 GPM. That is a 5× volume increase. However, external surface area of a 15/16" nozzle is only 2.5× that of ⅜" nozzle. This leads to significantly lower evaporation efficiency of a 15/16" smooth bore nozzle as compared to a ⅜" smooth bore nozzle. This leads to longer than expected time to suppress a given fire and wastage of water.

To mitigate this effect, fog nozzles were designed. Fog nozzles have a high surface area stream that is ideal for faster heat removal. The mechanism by which these fog streams are created cause significant loss of kinetic energy causing high residual pressure in the nozzle. This high residual pressure can manifest itself as a combination of high nozzle reaction, low reach and low gpm. In addition, fog nozzles create small water droplets right at the orifice of the nozzle. These small droplets have small momentum, thus causing low penetration efficiency and low wind stability. An ideal nozzle is one that can combine reach and penetration of smooth bore nozzle with high efficiency of fog nozzles.

SUMMARY OF THE INVENTION

The present invention is to design a nozzle that can combine high reach and penetration of a smooth bore nozzle with a high surface area of fog nozzles. The nozzles are designed to generate a water stream with one or more of the following key attributes: 1. High velocity; 2. High GPM; 3. High surface area to enable faster evaporation.; 4. Have a wide diverging stream to allow covering maximum area.; 5. Low nozzle reaction as compared to comparative fog nozzles.

The flow pathway in the nozzle is designed such that there are no blunt sections that could cause excessive loss of water kinetic energy. This is then combined with a suitable exit cross-sectional area. The optimized cross-sectional-area (CSA) allows attaining high velocity, based on conservation of mass. The cross-sectional area for given conditions is chosen such that it can allow attaining maximum velocity without significant loss in the exit gpm. For example, if the baseline water flow is 150 gpm, the exit CSA should be such that due to residual pressure in nozzle, the GPM should stay at >90 GPM. Similar reduction factors were used to create a more suitable exit geometry of jets to enable high-velocity streams with high surface area. This specific example is provided for the purposes of illustration and ease of explanation. However, a person of ordinary skill in the art would appreciate the many variations and alterations to the provided details are within the scope of the invention. This example is not intended to limit the embodiments of the subject matter of the application or uses of such embodiments.

Various mechanisms and designs were evaluated to create high surface area streams and high surface area diverging streams. As discussed above, existing commercial methods of creating high surface area leads to loss of kinetic energy of water due to blunt regions within the nozzle. The current invention used a flow pathway that allowed streamlined flow and is designed such that backpressure on water stream that occurs in fog nozzles due to the blunt sections is minimized while higher surface area is created. The same streamlined flow is further tapped in to create unique diverging flow conditions. Various transitional regions are designed in the flow pathway to reduce turbulence from incoming water stream and prevent stream cross-overs.

Definitions

As used herein, "cross-sectional area" or "csa" or "CSA" refers to the area of a section of the water stream at that point. For example, for a standard tubular nozzle, the exit csa would be the circle of the same diameter as the exiting water stream diameter. For a hollow cylinder, the CSA would be the difference in area of external circle and the internal circle that form the cross-section of that hollow cylinder. As an example, for a solid stream of 1" diameter (0.5" radius), the csa would be $\pi \times 0.52 = 0.785$ inch2. However, for the hollow cylinder which has an external diameter of 1" and internal diameter of 0.5" (radius of 0.5" and 0.25"), the csa would be $(\pi \times 0.52 - \pi \times 0.252) = 0.589$ inch2.

As used herein "surface area" refers to the external surface area of the stream of water per unit length. Surface area at exit refers to the surface area per unit length of the stream right after it exits the nozzle. This value of "surface area" or surface area per unit length, would be equal to the perimeter of the stream at that section. For example, for a solid stream of 1" diameter, the surface area per unit length would be equal to $\pi \times 1$". For the hollow cylinder which has an external diameter of 1" and internal diameter of 0.5" (radius of 0.5" and 0.25"), the surface area would still be $\pi \times 1$". It has been shown theoretically that higher external surface area streams are more effective in heat absorption due to larger area of contact with hot gases.

As used herein, "range" or "reach" means distance to which the water stream can reach under given conditions of pressure and throughput. The range increases with increasing pressure and reduces with reducing pressure. For a given pressure, the smaller cross-sectional area will typically result in the longer range, however this relationship of range and cross-sectional area is not linear and after a certain point, the range will start reducing with further reduction in cross-sectional area.

As used herein, "throughput" means the amount of water coming out of the nozzle. The standard units to measure throughput are gallons per minute (gpm) or liters per minute (lpm). As used herein, "exit-velocity" means the speed of the water stream as it exits the nozzle. Exit velocity has a direct correlation with range for a given nozzle type. For some nozzles, like fog nozzles, exit velocity maybe high but due to the formation of small water droplets early on, the range may be low.

As used herein, "rectangular" or "rectangular shape" means a geometric shape defined by its width and height. A rectangular shape where width and height are equal is square. Rectangular shapes can have sharp corners or rounded corners. The radius of the corners could be a function of manufacturing constraints, design constraints or solely for decorative purposes.

As used herein, "residual pressure" is the amount of pressure that nozzle is exerting back on the water stream. As csa goes down, this residual pressure increases and causes reduction in throughput. Some nozzles like fog nozzles have high residual pressure due to blunt inserts.

As used herein, "streamlined" means structures that do not hinder flow of the fluid. FIG. 1 shows an example of a streamlined body. Streamlined structure 1 has a gradual change in topography allowing fluid 2 to flow around it without creating back flow or turbulence. When nozzle uses streamlined geometries to enhance water velocity the net backpressure is minimal due to any backflow. There will still be backpressure due to boundary conditions as more and more fluid tries to exit through a smaller cross-sectional area.

As used herein, "blunt" or "bluff" means a structure or feature that has sharp transitions causing fluid to create backflow and turbulent conditions. An example of a blunt structure is shown in FIG. 2. The blunt surface 3 creates a barrier to flow to the fluid 4, forcing fluid to create back flows and turbulence.

As used herein, "diverging" means moving apart or increasing in CSA. A diverging stream would be one where the CSA at nozzle exit is smaller than CSA at the target. Some fog nozzles have diverging profiles.

As used herein, "heat removal rate" of a stream is the amount of heat absorbed per unit time. The heat removal rate can be measured in units of KiloWatts (KW) and is a critical quantity determining water stream's effectiveness in controlling fire.

As used herein, "coverage" means the width of the stream when it reaches the target. Coverage will determine the amount of area at the target that would be covered by the stream and is a critical quantity for fire control.

As used herein, a "smooth bore nozzle" is a type of nozzle that has a uniform reduction in CSA. A typical smooth bore nozzle has a truncated conical geometry as shown in FIG. 3. A typical smooth bore nozzle 5 has a streamlined fluid flow pathway 6. This allows water to move from a larger cross-section to a smaller cross-section without experiencing any regions of backflow. Due to streamlined flow pathways, smooth bore nozzles can attain high reach and penetration. The key drawback of a smooth bore nozzle is the low surface area of the exiting stream.

As used herein, a "fog nozzle" is a type of nozzle that deliberately creates turbulence in water to generate smaller water droplets. These water droplets allow stream with higher surface area, which can have a higher heat absorption rate. A typical fog nozzle structure is shown in FIG. 4. The fog nozzle 12 has a semi-blunt insert 13. The insert helps break down the water stream 14 in smaller droplets as water exits the nozzle 15. The turbulence created by the insert 13 manifests itself in back pressure and allows breaking the stream down in water droplets. These fog nozzles can be narrow stream fog nozzles or wide stream fog nozzles.

As used herein, the term "substantially" is defined as largely but not necessarily wholly what is specified. In any disclosed embodiment, the terms "substantially." "approximately, and "about may be substituted with "within a percentage of what is specified" In addition, certain terminology may also be used in the following description for the purpose of reference only, and thus are not intended to be limiting.

BRIEF DESCRIPTION OF THE DRAWINGS

The accompanying drawings are used to illustrate the theoretical principals behind the invention and to schematically illustrate various exemplary embodiments of the invention that form part of the specifications. These drawings along with the background given above and detailed description given below provide detailed explanation of the invention, and wherein:

FIG. 27 is a perspective view of another embodiment of the high-efficiency nozzle of FIG. 26, wherein the nozzle has external and internal filets for ease of manufacturing and reducing turbulence associated with sharp corners.

FIG. 28 is a perspective cutaway view of the nozzle of FIG. 27. The cross-section shows internal filets formed for ease of manufacturing and reducing turbulence associated with sharp corners.

DETAILED DESCRIPTION OF THE INVENTION

Figure 1:
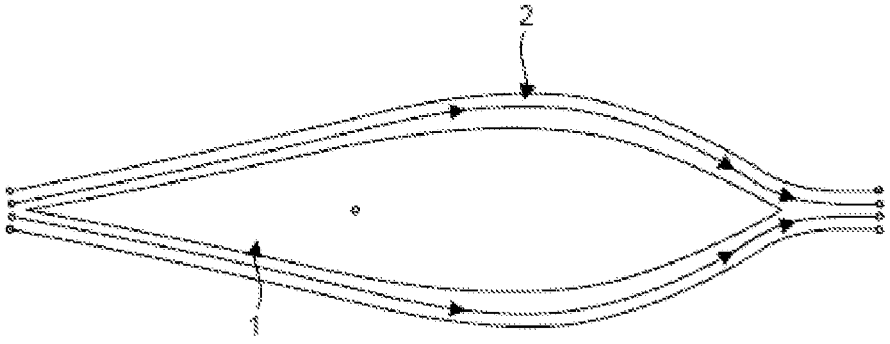
FIG. 1 is a schematic illustration showing an example of a streamlined body. The schematic shows that the fluid can move around the body without encountering any dead spots.
Figure 2:
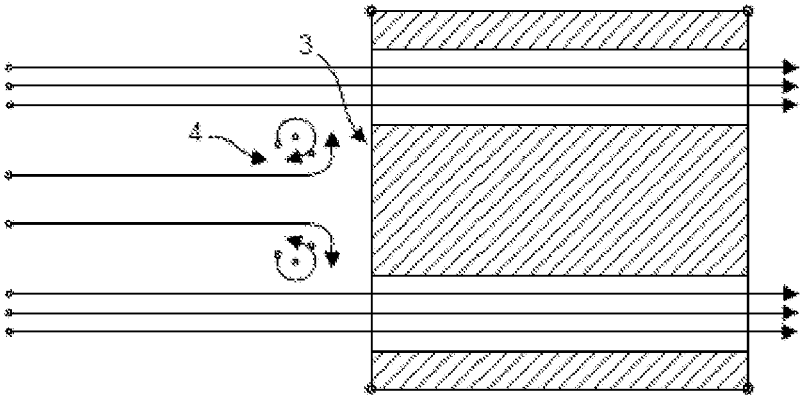
FIG. 2 is a schematic illustration of a blunt body. The flow pathway has sections that can inhibit fluid flow and cause back-pressure and turbulence.
Figure 3:
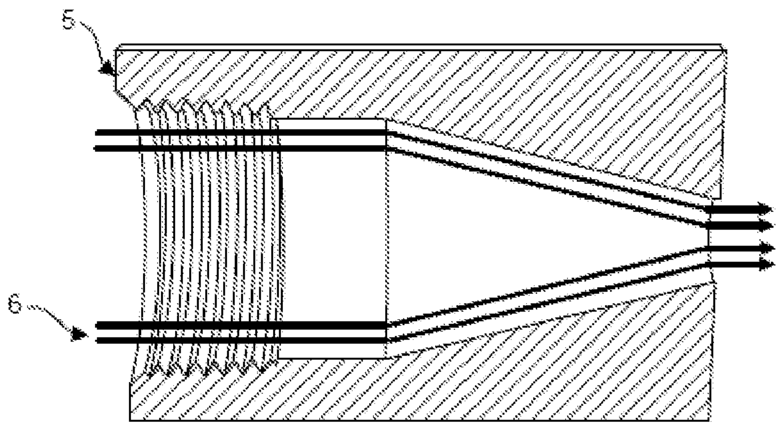
FIG. 3 is schematic example showing a cross-section of a conventional smooth bore nozzle. The exit cross-sectional area is smaller than the entry cross-sectional area allowing the fluid to get enhanced velocity. The pathway is streamlined. However, the exiting water stream has a low surface area.
Figure 4:
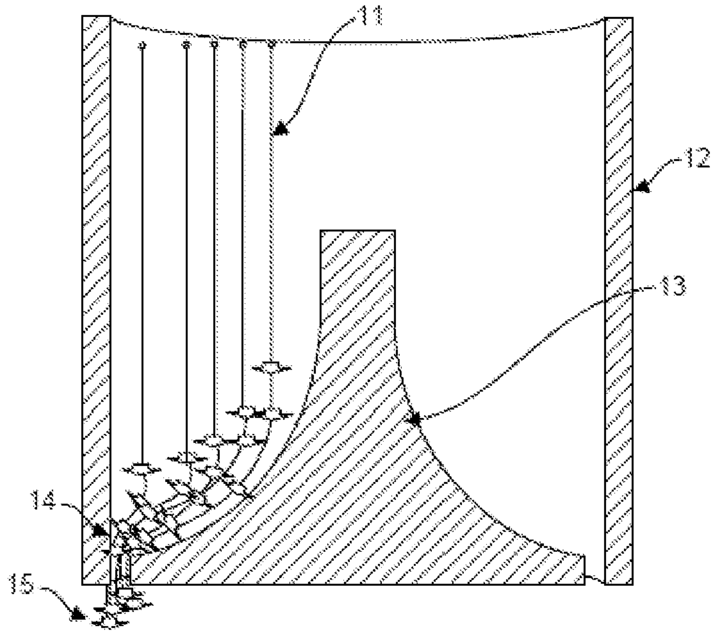
FIG. 4 is a schematic diagram showing a cross-section of a typical fog nozzles that are used currently. The nozzle has a semi-blunt insert that is attached to the outer body of the nozzle with help of various attachments and screws. The incoming water jet is forced to impinge on the blunt section and create water droplets.

Various figures and images are used to schematically illustrate the principle behind the current invention and schematically illustrate various embodiments of the current invention. Hence, the description of the various embodiments of the present invention is intended to be read in connection with the accompanying drawings. These drawings and images are to be considered part of the entire written description.

The descriptions contain many specifics for the purposes of illustration and ease of explanation. However, a person of ordinary skill in the art would appreciate the many variations and alterations to the provided details are within the scope of the invention. The following detailed description is not intended to limit the embodiments of the subject matter of the application or uses of such embodiments. As used herein, the word "exemplary" means "serving as an example". Any embodiment that is described as exemplary is not necessarily to be construed as preferred or advantageous over other variations and embodiments.

In the following description, numerous specific details are set forth, such as specific dimensions and angles, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present invention. The feature or features of one embodiment can be applied to other embodiments, even though not described or illustrated, unless expressly prohibited by this disclosure or the nature of the embodiments.

In the following sections, water stream and water jet are used interchangeably and is defined as water flowing through the air, where it exited from a nozzle. This water jet or water stream may have a velocity component parallel to the nozzle or it may have a trajectory that is diverging at certain angles. In addition, this water stream or water jet maybe composed of continuous water streamlines or water droplets of varying sizes. The water stream or water jet maybe such that it exits the nozzle as a solid stream and breaks down in smaller water droplets as it moves further from the nozzle. Fire-suppression is defined as reducing the intensity of a fire. Fire suppression may lead to the complete elimination of fire or reduction of the intensity of a fire.

With the traditional nozzle technologies, the user has to choose between long-range and high penetration of smooth-bore nozzles or high surface area streams of fog or combination nozzles. This specification describes nozzle designs that allow creating water streams with high reach similar to smooth bore nozzles and high surface area streams of fog or combination nozzles. These new high-efficiency nozzles would allow the user to perform tasks with greater efficiency. A few examples are provided for the ease of understanding but are not intended to limit the scope of the invention. First example provided of for a firefighter whose intended use of the nozzle is to suppress fire. By enabling longer range and higher surface area in one stream, the present invention allows faster fire suppression rates. A second example is provided for an individual who is trying to use the nozzle with garden hose for the purposes of cleaning. The high pressure and large surface area of the water stream allows this individual to clean at a significantly faster rate. These two specific examples are provided for the purposes of illustration and ease of explanation. However, a person of ordinary skill in the art would appreciate the many variations and alterations to the provided details are within the scope of the invention.

Exemplary embodiments of the present invention are now described with reference to the figures.

In all the subsequent exemplary embodiments, the high-efficiency nozzles can be directly attached to a hose or attached via the use of a suitable adaptor. The method of attachment should not impact the primary functionality of the nozzle. For example, a nozzle with a 1.5" NH female thread can directly attach to a 1.5" NH male thread on the hose. Or a nozzle with a 1.5" NH male thread can attach to a 1.5" male thread on the hose via 1.5"×1.5" female-female adaptor. This specific example is provided for the purposes of illustration and ease of explanation. However, a person of ordinary skill in the art would appreciate the many variations and alterations to the provided details are within the scope of invention. This example is not intended to limit the embodiments of the subject matter of the application or uses of such embodiments.

In all the subsequent exemplary embodiments the key functionality is derived from the design of the nozzle and the nozzle can be scaled to fit hoses of various sizes, including but not limited to National Hose (NH) sizes ¾", 1", 1.5", 2" or 2.5"; garden hose sizes and NPT sizes used with smaller water flow. The outlet area is optimized based on the inlet GPM, pressure rating, and desired output GPM. For example, for a 1.5" NH nozzle with an inlet pressure of 75 PSI and an incoming GPM of 150-200 a suitable outlet CSA would be in the range of 0.1 $inch^2$ to 1 $inch^2$. A smaller outlet CSA would allow reducing the output of the water stream and allow increasing the stream velocity. As an example, a wildland fire department may prefer an outgoing flow of 35 GPM and require outlet to be 0.1 $inch^2$, and a municipal fire department may require a flow of 150 GPM requiring outlet to be 1 $inch^2$. The choice of a suitable CSA depends on the final application. This specific example is provided for the purposes of illustration and ease of explanation. However, a person of ordinary skill in the art would appreciate the many variations and alterations to the provided details are within the scope of the invention. This example is not intended to limit the embodiments of the subject matter of the application or uses of such embodiments.

The functionality of the various exemplary embodiments presented is derived based on its design aspect and is not limited by the choice of hose size or CSA choice. The present embodiment could be operated through the complete range and the advantages listed are to be considered for traditional nozzles with the same inlet water conditions and same outlet CSA. For example, a smooth bore nozzle commonly used by municipal firefighters in the continental US is 1.5" NH inlet with 15/16" outlet diameter. The outlet CSA in this case is 0.69 $inch^2$. A comparative high-efficiency nozzle would have an inlet of 1.5" NH and an outlet CSA of 0.69 $inch^2$±0.1 $inch^2$. This specific example is provided for the purposes of illustration and ease of explanation. However, a person of ordinary skill in the art would appreciate the many variations and alterations to the provided details are within the scope of the invention. This example is not intended to limit the embodiments of the subject matter of the application or uses of such embodiments.

Figure 5:
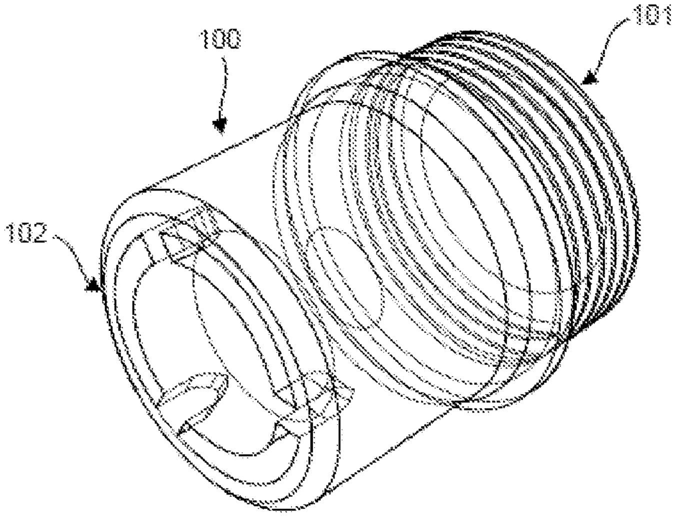
FIG. 5 is a perspective view of a high efficiency nozzle in accordance with an exemplary embodiment of the present invention.
Figure 6:
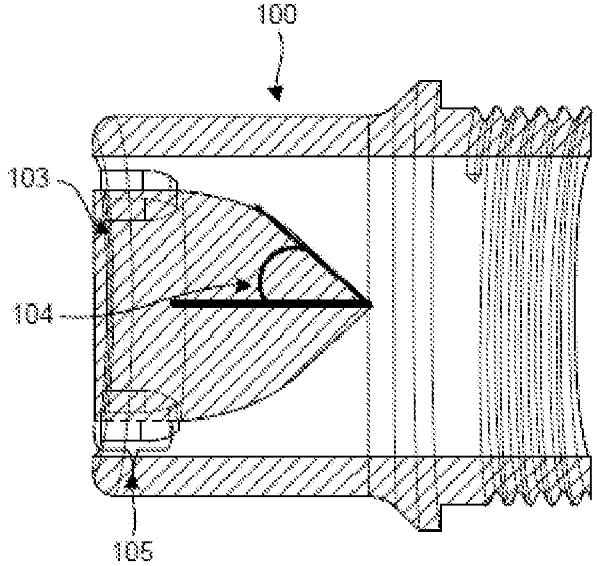
FIG. 6 is a perspective cutaway view of the nozzle of FIG. 5. The cross-section shows a streamlined cone is used to expand the incoming stream to create an outgoing stream with high velocity and surface area.
Figure 7:
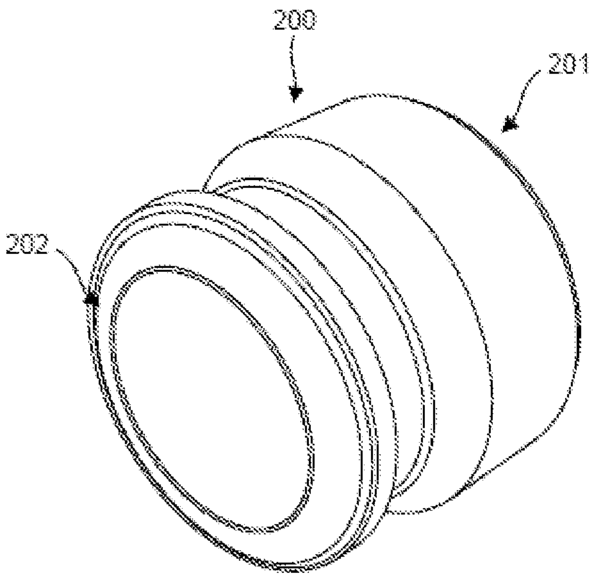
FIG. 7 is a perspective view of another embodiment of the present invention, wherein the incoming water stream is expanded to a larger outer diameter and at the same time a streamlined cone is used to reduce the exiting cross-sectional area of water stream.
Figure 8:
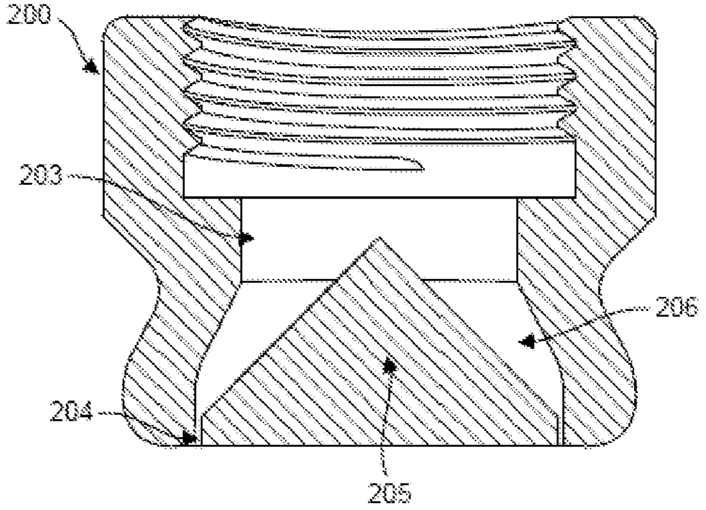
FIG. 8 is a perspective cutaway view of the nozzle of FIG. 7. The cross-section shows how external diameter of water stream is expanded at the same time as the net cross-sectional area is reduced. This allows outgoing stream with higher velocity and surface area.

With reference to the figures, FIG. 5-6, provides detailed illustrations of high-efficiency nozzle 100 in accordance with an exemplary embodiment of the current invention. In this embodiment the nozzle inlet 101 can be directly attached to a hose or attached via use of a suitable adaptor. The method of attachment should not impact the primary functionality of the nozzle. The key functionality is derived from the design of the nozzle and the nozzle can be scaled to fit hoses of various sizes, including but not limited to National Hose (NH) sizes ¾", 1", 1.5", 2" or 2.5". The inlet 101 can have suitable fitting or threads that would allow it to directly attach to a hose or attach to the hose using an adaptor. The threads can be male of female threads as per the requirement. The exit 102 is designed such that it forms a hollow cylinder on exit. The hollow cylinder geometry allows increasing the external surface area which allowing a suitable CSA at exit to attain high stream velocity. The FIG. 6 shows the cross-section of the nozzle 100. The water flow pathway is designed such that there is a streamlined cone 103 inside the nozzle. The cone is designed such that it creates the hollow cylinder stream without causing any back-pressure or turbulence. The angle at which cones top surface penetrates the water 104 can have a value from 10° to 60°. The smaller angle would allow a more gradual transition of a solid stream into a hollow cylinder stream but would make the nozzle very long. The larger angle would allow a smaller nozzle size but would require a more rapid transition.

With reference to the figures, FIG. 5-6, another exemplary embodiment of high efficiency nozzle 100 is presented. In this embodiment the nozzle inlet 101 can be directly attached to a hose or attached via use of a suitable adaptor. The method of attachment should not impact the primary functionality of the nozzle. The key functionality is derived from the design of the nozzle and the nozzle can be scaled to fit hoses of various sizes, including but not limited to National Hose (NH) sizes ¾", 1", 1.5", 2" or 2.5". The inlet 101 can have suitable fitting or threads that would allow it to directly attach to a hose or attach to the hose using an adaptor. The threads can be male of female threads as per the requirement. The exit 102 is designed such that it forms a hollow cylinder on exit. The hollow cylinder geometry allows increasing the external surface area which allowing a suitable CSA at exit to attain high stream velocity. The FIG.

6 shows the cross-section of the nozzle 100. The water flow pathway is designed such that there is a streamlined cone 103 inside the nozzle. The cone is designed such that it creates the hollow cylinder stream without causing any back-pressure or turbulence. The angle at which cones top surface penetrates the water 104 can have a value from 10° to 60°. The larger angle would allow a smaller nozzle size but would require a more rapid transition. The high efficiency nozzle 100 can further have a straight section 105, such that the exiting stream can attain a more stable profile before exiting the nozzle. The straight section 105 can allow minimize impact of any geometric transition from a solid stream to a hollow cylinder on the exiting stream. This straight section can have a length of 0.02" to 2".

With reference to the figures, FIG. 5-6, another exemplary embodiment of high efficiency nozzle 100 is presented. In this embodiment the nozzle inlet 101 can be directly attached to a hose or attached via use of a suitable adaptor. The method of attachment should not impact the primary functionality of the nozzle. The key functionality is derived from the design of the nozzle and the nozzle can be scaled to fit hoses of various sizes, including but not limited to National Hose (NH) sizes ¾", 1", 1.5", 2" or 2.5". The inlet 101 can have suitable fitting or threads that would allow it to directly attach to a hose or attach to the hose using an adaptor. The threads can be male of female threads as per the requirement. The exit 102 is designed such that it forms a hollow cylinder on exit. The hollow cylinder geometry allows increasing the external surface area which allowing a suitable CSA at exit to attain high stream velocity. The FIG. 6 shows the cross-section of the nozzle 100. The water flow pathway is designed such that there is a streamlined cone 103 inside the nozzle. The cone is designed such that it creates the hollow cylinder stream without causing any back-pressure or turbulence. The angle at which cones top surface penetrates the water 104 can have a value from 10° to 60°. The larger angle would allow a smaller nozzle size but would require a more rapid transition. The high efficiency nozzle 100 can further have a straight section 105, such that the exiting stream can attain a more stable profile before exiting the nozzle. The straight section 105 can allow minimize impact of any geometric transition from a solid stream to a hollow cylinder on the exiting stream. This straight section can have a length of 0.02" to 2". The streamlined cone 103 is such that it is removable. The configuration allows ease of manufacturing, wherein the nozzle is assembled using two components. The first component is the cylindrical configuration with suitable diameter and threads and the second component is the cone. The cone can be assembled inside the cylindrical configuration via suitable mechanisms including but not limited to via screws, snap-on fasteners, welding, or any alternate mechanism.

With reference to the figures, FIG. 5-6, another exemplary embodiment of high efficiency nozzle 100 is presented. In this embodiment the nozzle inlet 101 can be directly attached to a hose or attached via use of a suitable adaptor. The method of attachment should not impact the primary functionality of the nozzle. The key functionality is derived from the design of the nozzle and the nozzle can be scaled to fit hoses of various sizes, including but not limited to National Hose (NH) sizes ¾", 1", 1.5", 2" or 2.5". The inlet 101 can have suitable fitting or threads that would allow it to directly attach to a hose or attach to the hose using an adaptor. The threads can be male of female threads as per the requirement. The exit 102 is designed such that it forms a hollow cylinder on exit. The hollow cylinder geometry allows increasing the external surface area which allowing a suitable CSA at exit to attain high stream velocity. The FIG. 6 shows the cross-section of the nozzle 100. The water flow pathway is designed such that there is a streamlined cone 103 inside the nozzle. The cone is designed such that it creates the hollow cylinder stream without causing any back-pressure or turbulence. The angle at which cones top surface penetrates the water 104 can have a value from 10° to 60°. The cone is designed such that the front end of the cone extends beyond the front end of the outer wall of the nozzle. This extended length can be anywhere from 0.25 mm to 25 mm. This extended section helps to further guide the stream and form a complete circular profile.

With reference to the figures, FIG. 5-6, another exemplary embodiment of high efficiency nozzle 100 is presented. In this embodiment the nozzle inlet 101 can be directly attached to a hose or attached via use of a suitable adaptor. The method of attachment should not impact the primary functionality of the nozzle. The key functionality is derived from the design of the nozzle and the nozzle can be scaled to fit hoses of various sizes, including but not limited to National Hose (NH) sizes ¾", 1", 1.5", 2" or 2.5". The inlet 101 can have suitable fitting or threads that would allow it to directly attach to a hose or attach to the hose using an adaptor. The threads can be male of female threads as per the requirement. The exit 102 is designed such that it forms a hollow cylinder on exit. The hollow cylinder geometry allows increasing the external surface area which allowing a suitable CSA at exit to attain high stream velocity. The FIG. 6 shows the cross-section of the nozzle 100. The water flow pathway is designed such that there is a streamlined cone 103 inside the nozzle. The cone is designed such that it creates the hollow cylinder stream without causing any back-pressure or turbulence. The angle at which cones top surface penetrates the water 104 can have a value from 10° to 60°. The cone is designed such that the front end of the cone towards the nozzle exit has a diverging profile. The diverging angle can be anywhere from 0.5° to 60°. This diverging profile allows the exiting stream to have a diverging profile on exiting the nozzle.

The nozzle 100 can be such that it is manufactured using a single component or the nozzle can be manufactured using multiple components. The method of manufacturing would not impact the functionality of these nozzles. A few examples are provided for ease of explanation and are not intended to limit the scope of present invention. These components can be manufactured individually and then put together using suitable fasteners that could include snap fittings, screws, welds, or adhesives. This specific example is provided for the purposes of illustration and ease of explanation.

However, a person of ordinary skill in the art would appreciate the many variations and alterations to the provided details are within the scope of invention. This example is not intended to limit the embodiments of the subject matter of the application or uses of such embodiments.

The nozzle 100 can be such that it is manufactured using metallic alloys like brass or various aluminum alloys. One specific example of aluminum alloy that can be used to manufacture these nozzles is aluminum alloy 356. The nozzles can also be manufactured using polymers or composite materials. Some example of suitable polymers that can be used to manufacture these nozzles include but are not limited to ABS, poly amides, poly carbonate, poly olefins like HDPE, PP and LDPE. The nozzle can be manufactured using 3D printing techniques using a printer like Stratasys F120 3D printer. The choice of material or the manufacturing techniques used would not impact the key functionality of these nozzles.

FIGS. 7-10 provide illustrations of high efficiency nozzle 200, in accordance with another exemplary embodiment of the current invention. In this embodiment, the nozzle 200 is designed such that the exiting stream has a hollow cylinder configuration similar to nozzle 100, however in this case the outer diameter of the exiting stream is even larger than the outer diameter of the incoming solid stream. In this embodiment the nozzle inlet 201 can be directly attached to a hose or attached via use of a suitable adaptor. The method of attachment should not impact the primary functionality of the nozzle.

The key functionality is derived from the design of the nozzle and the nozzle can be scaled to fit hoses of various sizes, including but not limited to National Hose (NH) sizes ¾", 1", 1.5", 2" or 2.5". The inlet 201 can have suitable fitting or threads that would allow it to directly attach to a hose or attach to the hose using an adaptor. The threads can be male of female threads as per the requirement. The exit 202 is designed such that it forms a hollow cylinder on exit. The hollow cylinder has an outer diameter that is larger than the outer diameter of the incoming water stream, this allows enhances the external surface area. The diameter of the incoming water stream 203 can be increased such that the diameter of the exiting stream 204 is anywhere from 10% to 300% larger than 203. A streamlined cone 205 is used to morph the incoming stream in a hollow cylinder. The angle of the cone can be anywhere from 10° to 60°. As the stream comes out of the cone, it has an outer surface area proportional to the diameter With reference to FIG. 7-10 another exemplary embodiment of high efficiency nozzle 200 is presented. In this embodiment, the nozzle 200 is designed such that the exiting stream has a hollow cylinder configuration similar to nozzle 100, however in this case the outer diameter of the exiting stream is even larger than the outer diameter of the incoming solid stream. In this embodiment the nozzle inlet 201 can be directly attached to a hose or attached via use of a suitable adaptor.

The method of attachment should not impact the primary functionality of the nozzle. The key functionality is derived from the design of the nozzle and the nozzle can be scaled to fit hoses of various sizes, including but not limited to National Hose (NH) sizes ¾", 1", 1.5", 2" or 2.5". The inlet 201 can have suitable fitting or threads that would allow it to directly attach to a hose or attach to the hose using an adaptor. The threads can be male of female threads as per the requirement. The exit 202 is designed such that it forms a hollow cylinder on exit. The hollow cylinder has an outer diameter that is larger than the outer diameter of the incoming water stream, this allows enhances the external surface area. The diameter of the incoming water stream 203 can be increased such that the diameter of the exiting stream 204 is anywhere from 10% to 300% larger than 203. A streamlined cone 205 is used to morph the incoming stream in a hollow cylinder. The angle of the cone can be anywhere from 10° to 60° and the stream has a straight section before exiting the nozzle to allow a more stable profile on exit. The length of this straight section can be anywhere from 0.02" to 2".

With reference to FIG. 7-10 another exemplary embodiment of high efficiency nozzle 200 is presented. In this embodiment, the nozzle 200 is designed such that the exiting stream has a hollow cylinder configuration similar to nozzle 100, however in this case the outer diameter of the exiting stream is even larger than the outer diameter of the incoming solid stream. In this embodiment the nozzle inlet 201 can be directly attached to a hose or attached via use of a suitable adaptor.

The method of attachment should not impact the primary functionality of the nozzle. The key functionality is derived from the design of the nozzle and the nozzle can be scaled to fit hoses of various sizes, including but not limited to garden hose (GH) sizes ½" ¾" or 1"; National Hose (NH) sizes ¾", 1", 1.5", 1.75" 2" or 2.5". The inlet 201 can have suitable fitting or threads that would allow it to directly attach to a hose or attach to the hose using an adaptor. The threads can be male of female threads as per the requirement. The exit 202 is designed such that it forms a hollow cylinder on exit. The hollow cylinder has an outer diameter that is larger than the outer diameter of the incoming water stream, this allows enhances the external surface area. The diameter of the incoming water stream 203 can be increased such that the diameter of the exiting stream 204 is anywhere from 10% to 300% larger than 203. A streamlined cone 205 is used to morph the incoming stream in a hollow cylinder. The angle of the cone can be anywhere from 10° to 60° and the stream has a straight section before exiting the nozzle to allow a more stable profile on exit. The length of this straight section can be anywhere from 0.02" to 2". The cone is designed such that the front end of the cone extends beyond the front end of the outer wall of the nozzle. This extended length can be anywhere from 0.005" to 1". This extended section helps to further guide the stream and form a complete circular profile.

With reference to FIG. 7-10 another exemplary embodiment of high efficiency nozzle 200 is presented. In this embodiment, the nozzle 200 is designed such that the exiting stream has a hollow cylinder configuration similar to nozzle 100, however in this case the outer diameter of the exiting stream is even larger than the outer diameter of the incoming solid stream. In this embodiment the nozzle inlet 201 can be directly attached to a hose or attached via use of a suitable adaptor.

The method of attachment should not impact the primary functionality of the nozzle. The key functionality is derived from the design of the nozzle and the nozzle can be scaled to fit hoses of various sizes, including but not limited to National Hose (NH) sizes ¾", 1", 1.5", 2" or 2.5". The inlet 201 can have suitable fitting or threads that would allow it to directly attach to a hose or attach to the hose using an adaptor. The threads can be male of female threads as per the requirement. The exit 202 is designed such that it forms a hollow cylinder on exit. The hollow cylinder has an outer diameter that is larger than the outer diameter of the incoming water stream, this allows enhances the external surface area. The diameter of the incoming water stream 203 can be increased such that the diameter of the exiting stream 204 is anywhere from 10% to 300% larger than 203. A streamlined cone 205 is used to morph the incoming stream in a hollow cylinder. The angle of the cone can be anywhere from 10° to 60° and the stream has a straight section before exiting the nozzle to allow a more stable profile on exit. The length of this straight section can be anywhere from 0.02" to 2". The cone is designed such that the front end of the cone towards the nozzle exit has a diverging profile. The diverging angle can be anywhere from 0.5° to 60°. This diverging profile allows the exiting stream to have a diverging profile on exiting the nozzle.

The nozzle 200 can be such that it is manufactured using a single component or the nozzle can be manufactured using multiple components. The method of manufacturing would not impact the functionality of these nozzles. A few examples are provided for ease of explanation and are not intended to limit the scope of present invention. These components can be manufactured individually and then put together using suitable fasteners that could include snap fittings, screws, welds, or adhesives. An example of the components that can be manufactured as individual component to form the final nozzle includes a diverging adaptor that can allow incoming stream to go from 203 to 204 and a cone 205. The cone 205 can then be attached to the adaptor using suitable fittings. This specific example is provided for the purposes of illustration and ease of explanation. However, a person of ordinary skill in the art would appreciate the many variations and alterations to the provided details are within the scope of invention. This example is not intended to limit the embodiments of the subject matter of the application or uses of such embodiments.

The nozzle 200 can be such that it is manufactured using metallic alloys like brass or various aluminum alloys. The nozzles can also be manufactured using polymers or composite materials. The choice of material would not impact the functionality of these nozzles.

Figure 9:
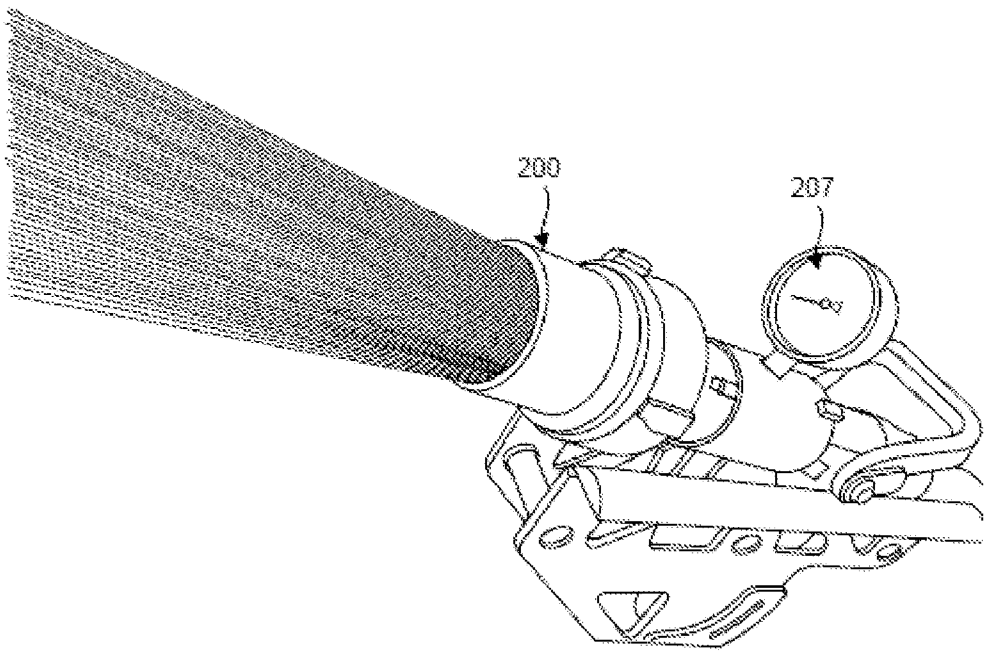
FIG. 9 is an image of nozzle from FIG. 7 with 75 PSI water connected to it. The image shows exiting stream and the pressure gauge reading residual pressure.
Figure 10:
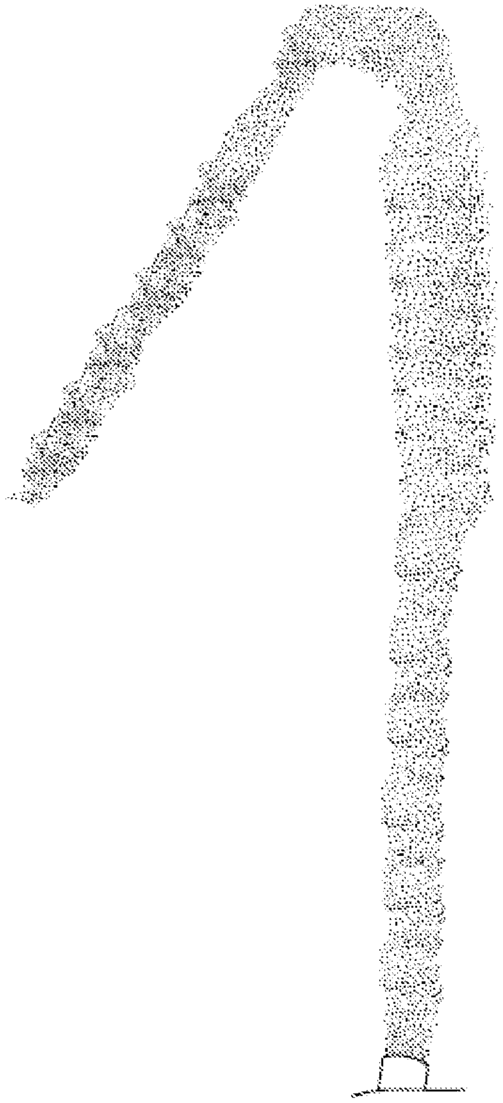
FIG. 10 is an image of water stream coming out of nozzle from FIG. 7 with 75 PSI water connected to it. The image shows exiting stream with large outer surface area and large range.
Figure 11:
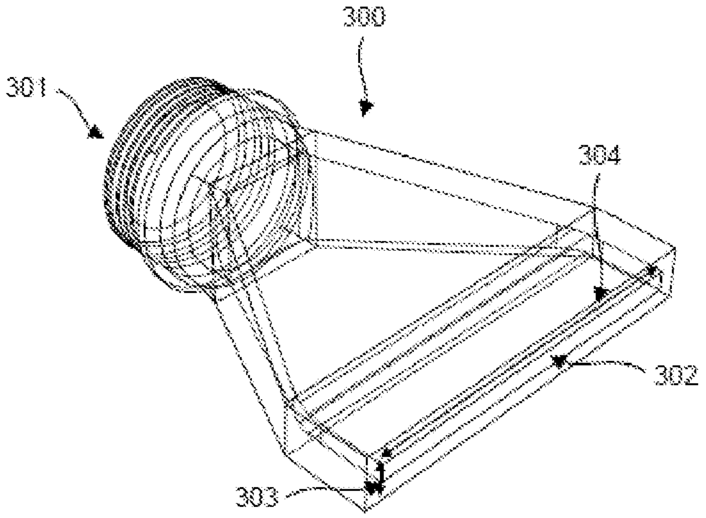
FIG. 11 is a perspective view of another exemplary embodiment of the present invention, wherein the incoming cylindrical water stream is converted into a rectangular stream with significantly higher surface area and velocity.
Figure 12:
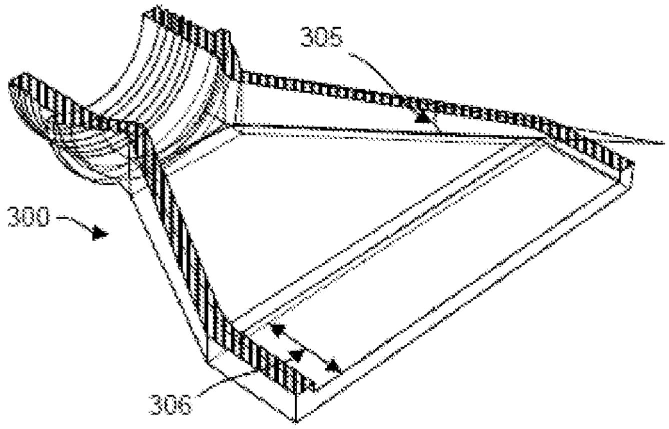
FIG. 12 is a perspective cutaway view of the nozzle of FIG. 11. The cross-section shows a streamlined pathway is used to spread and compress the incoming stream simultaneously to create a high velocity rectangular stream.

A specific example of the nozzle 200 is provided in FIG. 9 and FIG. 10. This specific example is provided for the purposes of illustration and ease of explanation. However, a person of ordinary skill in the art would appreciate the many variations and alterations to the provided details are within the scope of invention. This example is not intended to limit the embodiments of the subject matter of the application or uses of such embodiments. In this specific example the nozzle 200 for this specific case was designed for an incoming water stream of 1.5" diameter. The outlet CSA can for this specific example can be in the range of 0.2 inch2 to 0.75 inch2 and the straight section can be in the range of 0.25"-1". The exiting stream had an outer diameter of 2.5" and the CSA of exiting stream was in the range of 0.25 inch2 to 1 inch2. The similar range and throughput as standard smooth bore nozzles used by fire departments across the US. The pressure gauge 207 showed extremely low residual pressure in the nozzle. The final stream had a surface area 2.5 times that of the standard smooth bore nozzle yet had same range and throughput as a smooth bore nozzle with comparative outlet CSA. This 2.5 times enhanced external surface area allows higher area of contact between the water stream and the hot medium in burning structures and would allow significantly faster fire control rates.

To maximize both the velocity and perimeter, it is desired to have a shape that can have the largest perimeter for the given area. What this means is that if a target CSA of A is chosen, out of different geometric shapes that can have area A, circle would have the smallest perimeter and a rectangle with high ratio of length to width will have one of the highest perimeters. A specific example of provided for the ease of explanation and is not intended to limit the scope of the invention.

For example, a target CSA of 100 mm2 is selected. The circle that will have a CSA of 100 mm2 will have a perimeter of approximately 35.44 mm. A rectangle with length of 100 mm and width of 1 mm, will have the same CSA of 100 mm2, however its perimeter would be 202 mm. This is 6 times more than the perimeter of the circle. Based on these theoretical calculations a set of high efficiency nozzles were designed with rectangular outlet CSA. The subsequent sections provide exemplary embodiments for such high efficiency nozzles.

FIGS. 11-14 provide illustrations of high efficiency nozzle 300, in accordance with another exemplary embodiment of the current invention. In this embodiment, the nozzle 300 is designed such that the exiting stream has a rectangular profile. In this embodiment the nozzle inlet 301 can be directly attached to a hose or attached via use of a suitable adaptor. The method of attachment should not impact the primary functionality of the nozzle. The key functionality is derived from the design of the nozzle and the nozzle can be scaled to fit hoses of various sizes, including but not limited to National Hose (NH) sizes ¾", 1", 1.5", 2" or 2.5". The inlet 301 can have suitable fitting or threads that would allow it to directly attach to a hose or attach to the hose using an adaptor. The threads can be male of female threads as per the requirement. The exit 302 is designed such that the exiting stream forms a rectangular cross-section on exiting the nozzle. The thickness of the stream 303 and the length of the stream 304 dictate the CSA and perimeter. The thickness 303 is designed such that it has a value greater than 0.1 mm and less than 10 mm. The value of 304 is derived using the value of 303 and the desired exiting CSA. The value of 304 can vary anywhere from 0.5" to 8". The CSA can have a value in the range of 0.1 inch2 to 2 inch2. The circular to rectangular geometry has a completely streamlined flow without any blunt section. The rate of transition from circle to rectangle is determined by the convergence angle 305. This angle dictates the length over which the circular cross-section gets converted in a rectangular cross-section. The value of this angle 305 can be anywhere from 10° to 60°. The circular cross-section of incoming water jet is gradually transformed in a rectangular geometry without creating any blunt sections that could cause back pressure.

FIGS. 11-14 provide illustrations of high efficiency nozzle 300, in accordance with another exemplary embodiment of the current invention. In this embodiment, the nozzle 300 is designed such that the exiting stream has a rectangular profile. In this embodiment the nozzle inlet 301 can be directly attached to a hose or attached via use of a suitable adaptor. The method of attachment should not impact the primary functionality of the nozzle. The key functionality is derived from the design of the nozzle and the nozzle can be scaled to fit hoses of various sizes, including but not limited to National Hose (NH) sizes ¾", 1", 1.5", 2" or 2.5". The inlet 301 can have suitable fitting or threads that would allow it to directly attach to a hose or attach to the hose using an adaptor. The threads can be male of female threads as per the requirement. The exit 302 is designed such that the exiting stream forms a rectangular cross-section on exiting the nozzle. The thickness of the stream 303 and the length of the stream 304 dictate the CSA and perimeter. The thickness 303 is designed such that it has a value greater than 0.1 mm and less than 10 mm. The value of 304 is derived using the value of 303 and the desired exiting CSA. The value of 304 can vary anywhere from 0.5" to 8". The CSA can have a value in the range of 0.1 inch2 to 2 inch2. The circular to rectangular geometry has a completely streamlined flow without any blunt section. The rate of transition from circle to rectangle is determined by the convergence angle 305. This angle dictates the length over which the circular cross-section gets converted in a rectangular cross-section.

The value of this angle 305 can be anywhere from 10° to 60°. The circular cross-section of incoming water jet is gradually transformed in a rectangular geometry without creating any blunt sections that could cause back pressure. Another variation of the current embodiment is presented. In this variation after the circular to rectangular transition a straight section 306 is designed. The straight section 306 is such that the exiting stream can attain a more stable profile before exiting the nozzle. This straight section 306 can allow minimize impact of any geometric transition from a circle to a rectangle on the exiting stream. The length of this straight section 306 ca be anywhere from 0" to 4".

Figure 13:
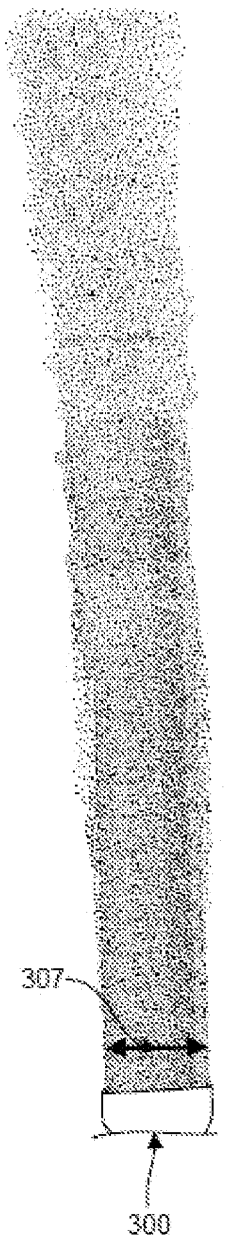
FIG. 13 is an image of water stream coming out of nozzle from FIG. 11 with 75 PSI water connected to it. The image shows exiting stream with large outer surface area and large range.
Figure 14:
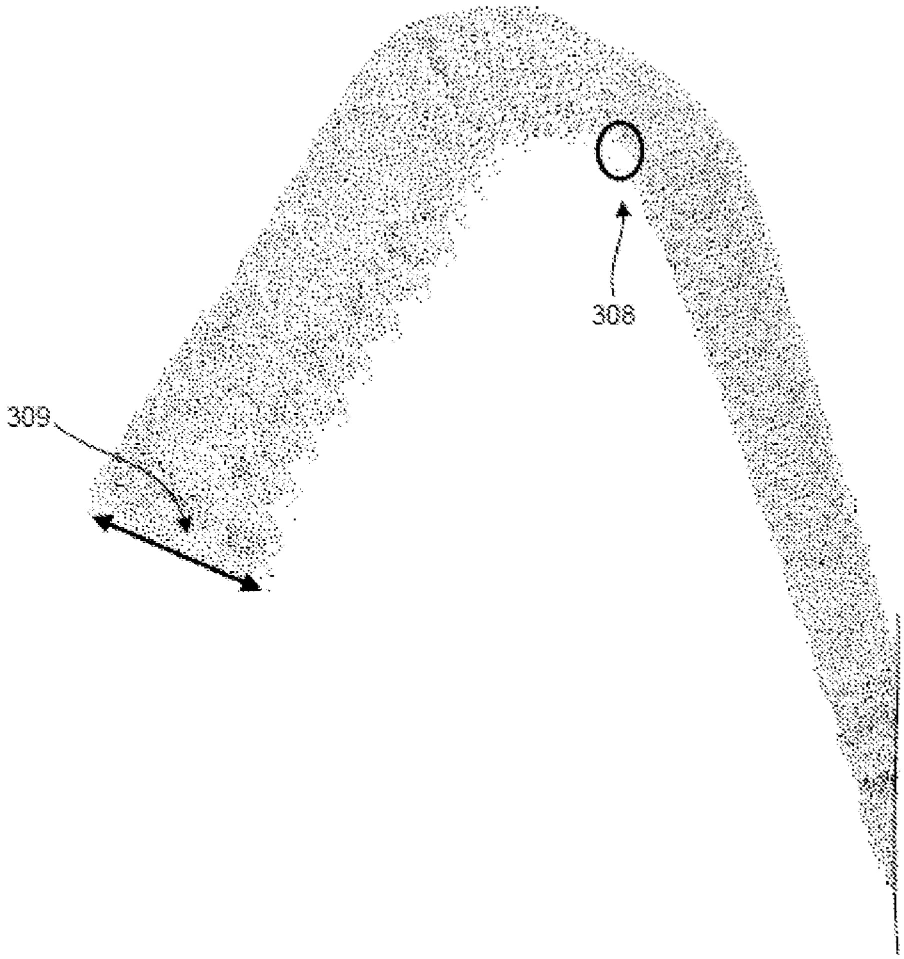
FIG. 14 is a perspective image of water stream coming out of nozzle from FIG. 11 with 75 PSI water connected to it. The image shows exiting stream with large range and an extremely large coverage at target. The figure also shows the thin edge of the profile.

A specific example of the nozzle 300 is provided in FIG. 13 and FIG. 14. This specific example is provided for the purposes of illustration and ease of explanation. However, a person of ordinary skill in the art would appreciate the many variations and alterations to the provided details are within the scope of invention. This example is not intended to limit the embodiments of the subject matter of the application or uses of such embodiments. In this specific example the nozzle 300 for this specific case was designed for an incoming water stream of 1.5" diameter. The CSA of the exiting slot/rectangle in this specific case was in the range of 150 mm2 to 750 mm2. The height of the slot/rectangle at the outlet was in the range of 1 mm to 10 mm. The length of the slot/rectangle at the outlet corresponded to the CSA and the height of the slot/rectangle by the relationship: length of the slot/rectangle at outlet×width of the slot/rectangle at outlet=CSA at outlet. As a specific example the exiting stream had a width 307 of 4". As compared to current industry standard smooth bore nozzles with an exiting stream with diameter of 15/16", this particular example shows that the exiting stream from nozzle 300 has more than 3 times the surface area while maintaining the range and throughput. In addition to high surface area, high range, and high throughput the design offers unique benefits as shown in FIG. 14. The exiting stream has a thin cross-section 308. This allowed the stream to be minimally impacted by the wind. As the rectangular stream hits the target, it diverges and provides a coverage of 3 ft-5 ft. This coverage is significantly larger as compared to 1"-2" coverage provided by traditional smooth bore nozzles.

The nozzle 300 can be such that it is manufactured using a single component or the nozzle can be manufactured using multiple components. The method of manufacturing would not impact the functionality of these nozzles. A few examples are provided for ease of explanation and are not intended to limit the scope of present invention. These components can be manufactured individually and then put together using suitable fasteners that could include snap fittings, screws, welds, or adhesives. This specific example is provided for the purposes of illustration and ease of explanation.

However, a person of ordinary skill in the art would appreciate the many variations and alterations to the provided details are within the scope of invention. This example is not intended to limit the embodiments of the subject matter of the application or uses of such embodiments.

The nozzle 300 can be such that it is manufactured using metallic alloys like brass or various aluminum alloys. The nozzles can also be manufactured using polymers or composite materials. The choice of material would not impact the functionality of these nozzles.

Figure 15:
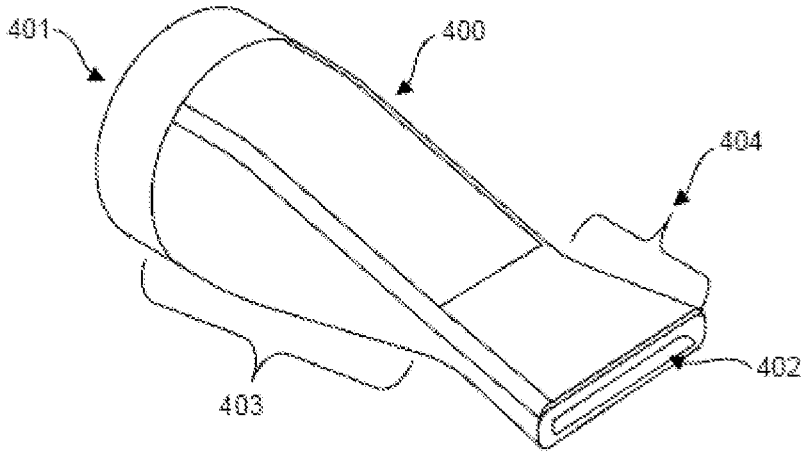
FIG. 15 is a perspective view of another exemplary embodiment of the present invention, wherein the incoming cylindrical water stream is converted in a rectangular stream in first stage of the nozzle and then directed to diverge laterally.
Figure 16:
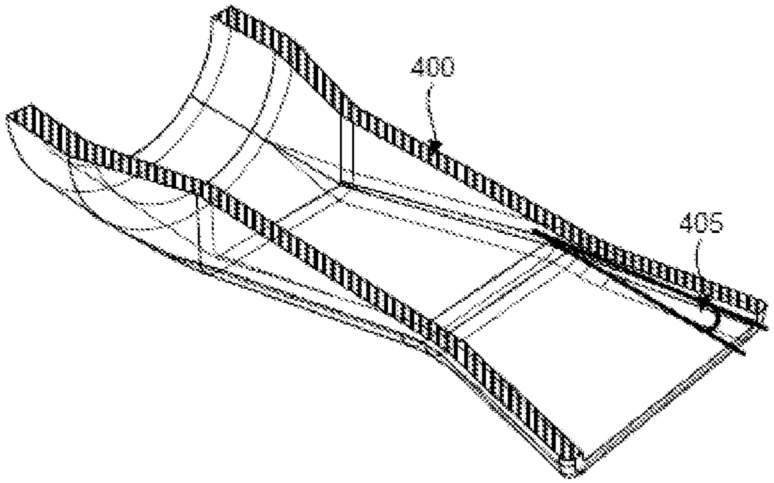
FIG. 16 is a perspective cutaway view of the nozzle of FIG. 15. The cross-section shows a streamlined pathway is used to spread and compress the incoming stream simultaneously to create a high velocity rectangular stream. This stream is then directed to diverge on coming out of the nozzle.

FIGS. 15-16 provide illustrations of high efficiency nozzle 400, in accordance with another exemplary embodiment of the current invention. As a further variation of nozzle 300, nozzle 400 is designed such that exiting stream has diverging profile. Diverging flow is a flow wherein the CSA of the stream increases as it moves further away from the nozzle. The diverging flow can be two directional diverging flow, wherein both the width and thickness increase with the distance or the diverging flow can be one directional, wherein only one-dimension increases. In this embodiment the nozzle inlet 401 can be directly attached to a hose or attached via use of a suitable adaptor. The method of attachment should not impact the primary functionality of the nozzle. The key functionality is derived from the design of the nozzle and the nozzle can be scaled to fit hoses of various sizes, including but not limited to National Hose (NH) sizes ¾", 1", 1.5", 2" or 2.5". The inlet 401 can have suitable fitting or threads that would allow it to directly attach to a hose or attach to the hose using an adaptor. The threads can be male of female threads as per the requirement. The diverging stream comes out of the exit 402. The diverging profile of nozzle 400 allows maximizing the coverage at the target. The water stream CSA is converted from the circular to rectangular profile in a streamlined manner and the CSA is reduced to allow enhanced velocity in the section 403. This rectangular profile is then expanded on one or two directions in the section 404. As the high velocity stream enters from section 403 to section 404, it is able to expand in the desired direction due to constraint geometry. As this stream exits the nozzle, the stream is able to maintain its diverging profile. The angle at which the stream diverges is given by divergence angle 405. The divergence angle allows the water jet coming out of the nozzle to spread at a greater rate. The divergence angle 405 can be anywhere from 0.5° to 45°. In the various examples given above for diverging type jet streams, the angle of divergence can vary from a straight slot/rectangle jet at 0 degrees to a high spread slot/rectangle jet which can be as high as 45 degrees. The reach and penetration will reduce as we increase the divergence angle.

Figure 17:
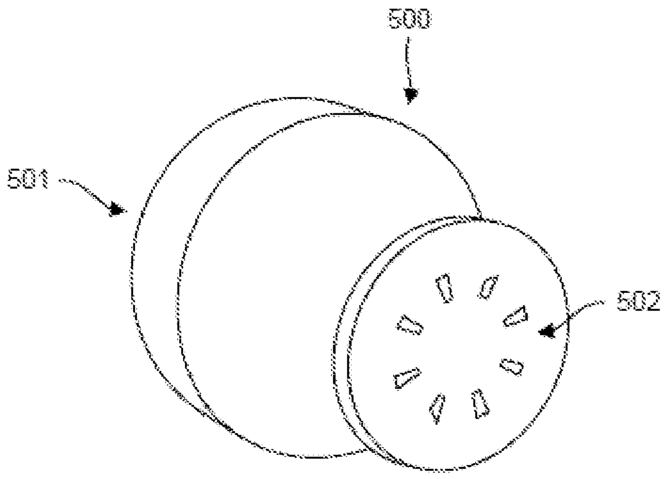
FIG. 17 is a schematic illustration of another exemplary embodiment of the present invention, wherein the incoming cylindrical water stream follows a pathway like current smooth bore nozzles to enhance the velocity. However, towards the exit end of the nozzle, streamlined structures are used to divide the stream in multiple diverging streams. This allows having similar reach and penetration as jet nozzle however with higher surface area and coverage.
Figure 18:
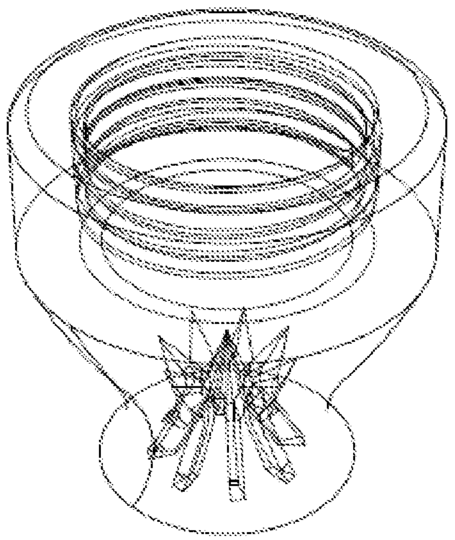
FIG. 18 is a perspective wire-frame view of the nozzle of FIG. 17. The image shows a streamlined pathway is used to initially enhance the velocity of incoming stream and then diverge it in multiple exiting streams.

FIG. 17-18 provide illustrations of high efficiency nozzle 500, in accordance with another exemplary embodiment of the current invention. Nozzle 500 is designed such that the exiting stream of water is divided in multiple streams in a streamlined fashion. This process of dividing the stream in multiple streams allow increasing the surface area by more than 200% while keeping the cross-sectional area the same. This allowed to maintain the exit velocity of the water jet while enhancing the surface area significantly. The exiting water stream can be divided in 2-12 streams and the nozzle 500 shown in FIG. 17 is an example, not intended to limit the scope of the invention. In this embodiment the nozzle inlet 501 can be directly attached to a hose or attached via use of a suitable adaptor. The method of attachment should not impact the primary functionality of the nozzle. The key functionality is derived from the design of the nozzle and the nozzle can be scaled to fit hoses of various sizes, including but not limited to National Hose (NH) sizes ¾", 1", 1.5", 2" or 2.5". The inlet 501 can have suitable fitting or threads that would allow it to directly attach to a hose or attach to the hose using an adaptor. The threads can be male of female threads as per the requirement. The multiple streams come out of the exit 502.

For example, a nozzle can have an exit with 2-12 sections of pie that are diverging outward at angles ranging from 0.5 degrees to 30 degrees. Such multiple section nozzles can also replace the traditional fog nozzles with conical patterns. The high efficiency nozzles designed as in the drawing will have a more streamlined geometry, hence allowing greater range at similar spread to a traditional fog nozzle. FIG. 18 shows the wireframe depicting interior pathway of the spreading pie design as described in the current embodiment.

Figure 19:
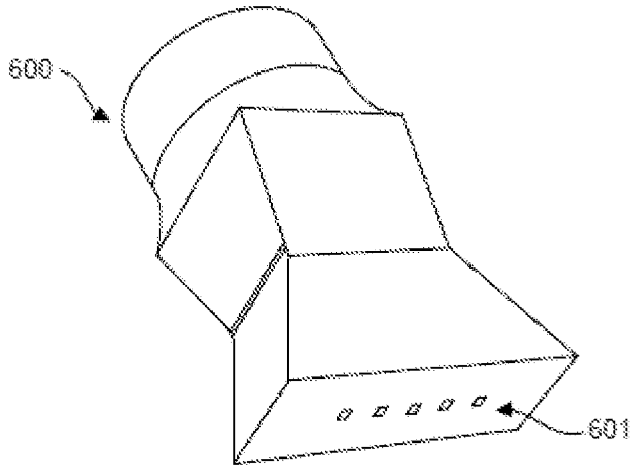
FIG. 19 is a perspective view of another exemplary embodiment of the present invention, wherein the incoming cylindrical water stream is converted in a rectangular stream in first stage of the nozzle and then directed to exit as multiple rectangular streams.
Figure 20:
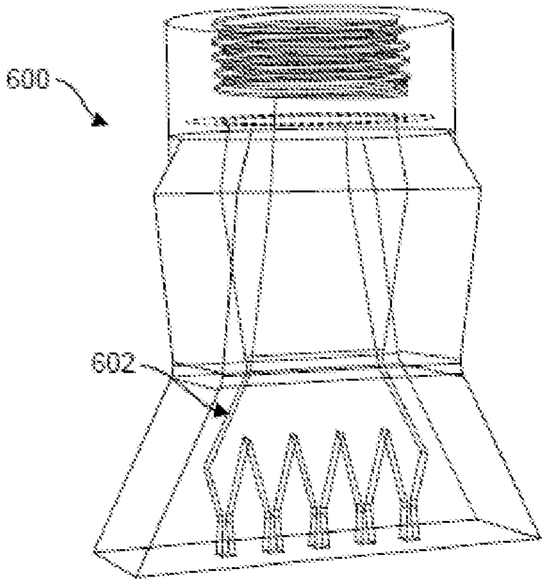
FIG. 20 is a perspective wire-frame view of the nozzle of FIG. 19. The image shows a streamlined pathway is used to initially enhance the velocity of the incoming stream and convert it into a rectangular stream. This then diverges laterally in multiple streams.

FIG. 19-20 provide illustrations of high efficiency nozzle 600, in accordance with another exemplary embodiment of the current invention. Nozzle 600 is designed such that circular cross-section of the nozzle is gradually transformed in a linear cross-section without creating any blunt surface. This is then divided in multiple independent streams with linear pattern. This linear pattern of streams allows higher coverage area. The example shown in FIG. 19 and FIG. 20 is for ease of explanation and is not intended to limit the scope of the present invention. The exiting stream can have anywhere from 2 to 25 individual streams. In this embodiment the nozzle inlet can be directly attached to a hose or attached via use of a suitable adaptor. The method of attachment should not impact the primary functionality of the nozzle. The key functionality is derived from the design of the nozzle and the nozzle can be scaled to fit hoses of various sizes, including but not limited to National Hose (NH) sizes ¾", 1", 1.5", 2" or 2.5".

The inlet can have suitable fitting or threads that would allow it to directly attach to a hose or attach to the hose using an adaptor. The threads can be male of female threads as per the requirement. The multiple streams come out of the exit 501. For example, a nozzle can have an exit with 2-12 sections of linear streams that can go in a straight manner or they can be diverging outward at angles ranging from 0.5 degrees to 30 degrees. Such multiple section nozzles can also replace the traditional fog nozzles with conical patterns. The high efficiency nozzles designed as in the drawing will have a more streamlined geometry, hence allowing greater range at a similar spread to a traditional fog nozzle. FIG. 20 shows the wireframe depicting interior pathway 602 of the spreading pie design as described in the current embodiment.

Figure 21:
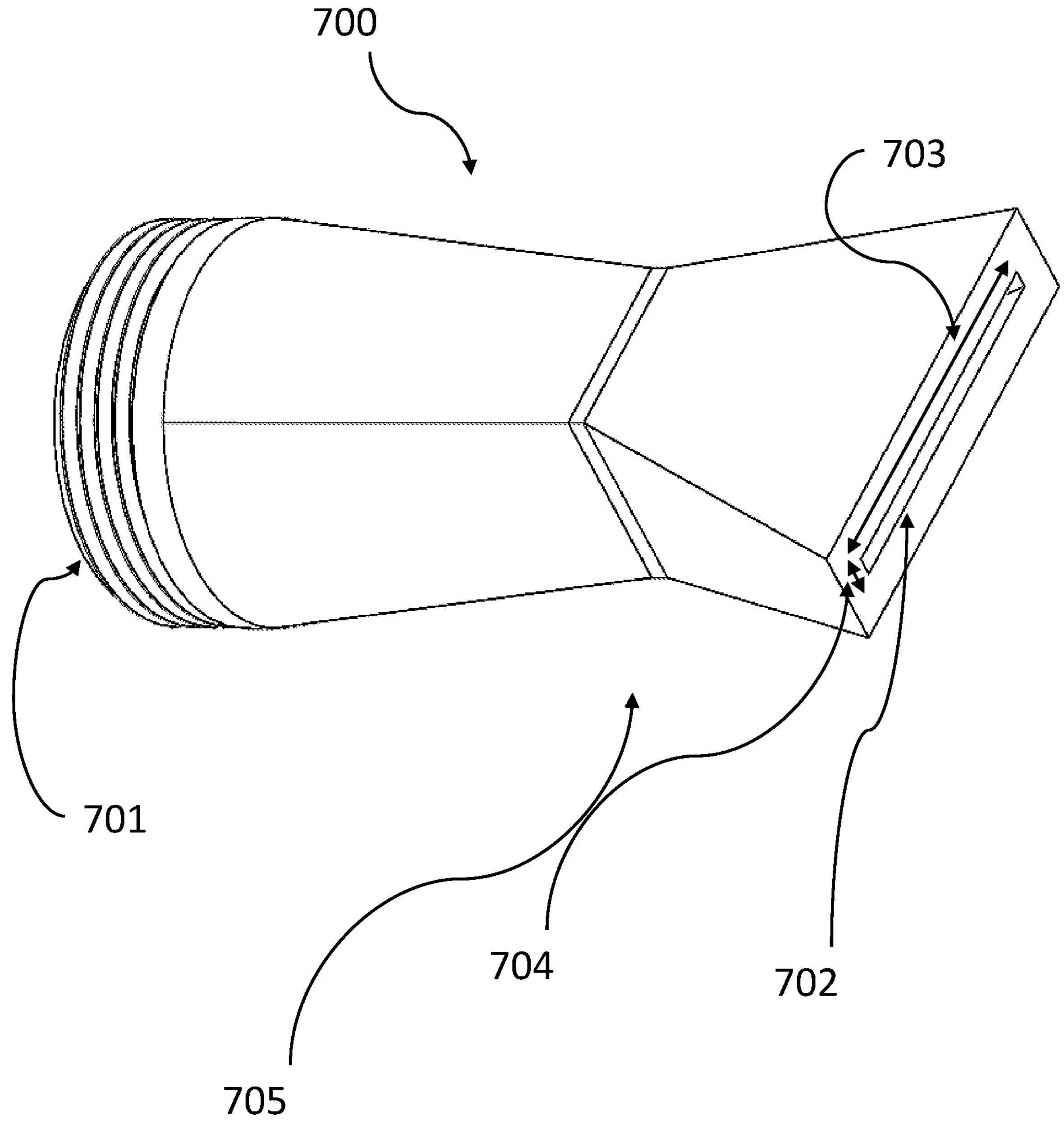
FIG. 21 is a perspective view of a high-efficiency nozzle in accordance with an exemplary embodiment of the present invention. The nozzle is such that the fluid flow pathway converges to a smaller cross-section before diverging to the final exit geometry. This smaller cross-section is referred to as transitional cross-section. The cross-sectional area of the transitional cross-section is such that it is smaller than or equal to the nozzle inlet, and it is larger than or equal to the nozzle outlet.
Figure 22:
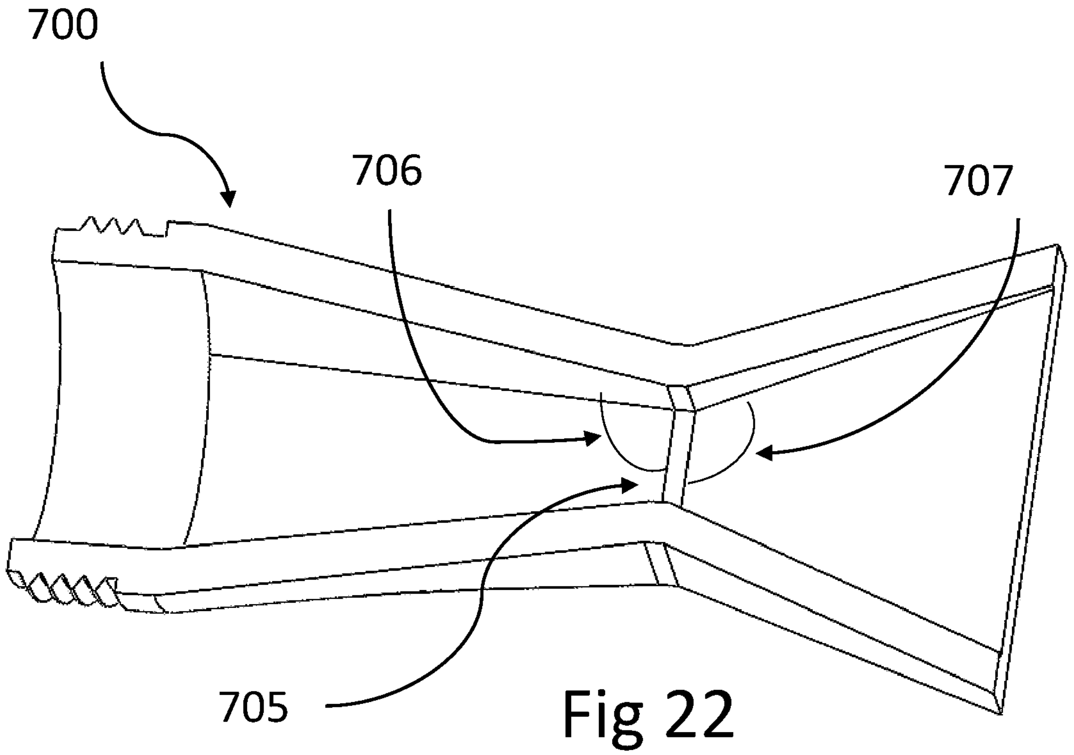
FIG. 22 is a perspective cutaway view of the nozzle of FIG. 21. The cross-section shows internal geometric parameters that enable the formation of a water stream with a desirable profile.
Figure 23:
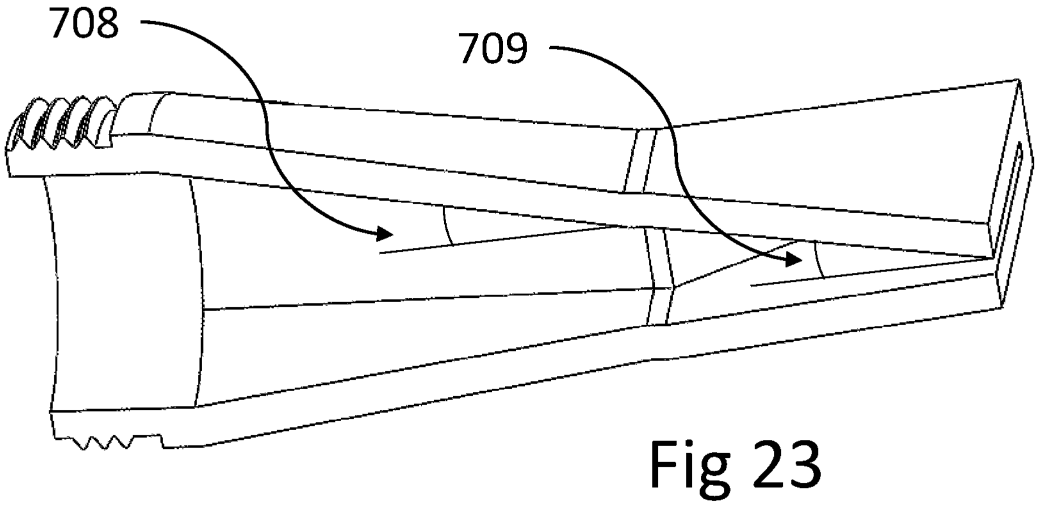
FIG. 23 is another perspective cutaway view of the nozzle of FIG. 21. The cross-section shows internal geometric parameters that enable the formation of a water stream with a desirable profile.

With reference to the figures, FIGS. 21-23, provides detailed illustrations of a high-efficiency nozzle 700 in accordance with an exemplary embodiment of the current invention. In this embodiment, the nozzle inlet 701 can be directly attached to a hose or attached via the use of a suitable adaptor or have another functional element between the hose and the nozzle like an on-off valve or a flow meter. The method of attachment should not impact the primary functionality of the nozzle. The key functionality is derived from the design of the nozzle and the nozzle can be scaled to fit hoses of various sizes, including but not limited to National Hose (NH) sizes ⅜", ½", ¾", 1", 1.5", 2" or 2.5"; or US garden hose sizes (½", ¾", ⅝" or 1").

The threads on the inlet section 701 can be male or female threads as per the requirement. The type of thread does not impact of limit the functionality of the nozzle. The exit 702 is designed such that as the water stream exits the nozzle, it forms a flat stream geometry. The velocity of the stream is a function of the cross-sectional area (CSA) of the nozzle exit, whereas the external surface area is a function of perimeter of the water stream exiting the nozzle. For any given geometric shape, a circle has the smaller ratio of perimeter to area. As compared to a circular geometry, a thin rectangle has significantly higher ratio of perimeter to area. This ratio of the CSA and perimeter for a rectangular geometry is a direct function of the ratio of the width of the rectangle and its height. Higher is the ratio of width and height of the rectangle, also known as the aspect ratio of the rectangle, higher would be the ratio of its perimeter and area.

For the nozzle 700, the width of the exiting water stream is determined by the width of the nozzle exit 703; the thickness of the water stream is determined by the height of the nozzle exit 704.

In this embodiment, the nozzle 700 is designed such that the incoming water stream converges to a transitional cross-section 705 with a profile P and an area A. This position of transitional cross-section 705 is such that it lies in between the nozzle inlet and the nozzle exit. The profile P of the transitional area 705 can be a square, a square with rounded edges, an ellipse, or a circle. The area A of the transitional cross-section is such that it is equal to or smaller than the inlet cross-section and it is equal to or greater than the exit cross-section.

Figure 42:
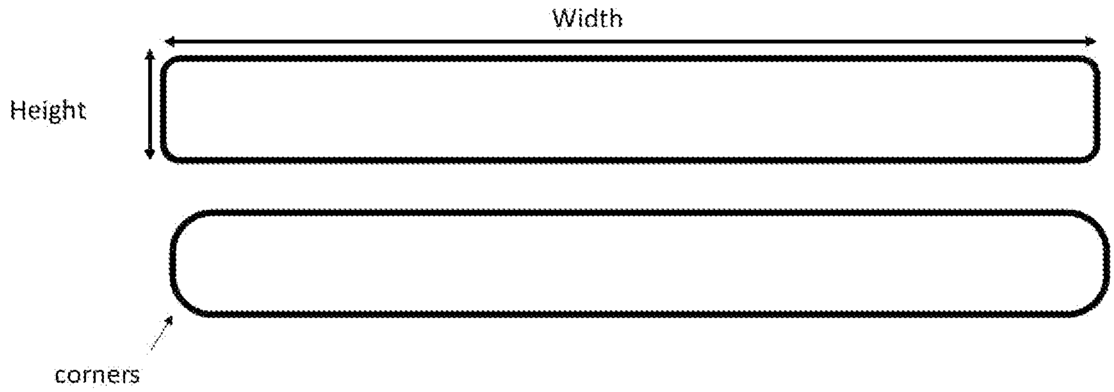
FIG. 42 is an exemplary illustration for how the present invention defines and uses the term "rectangular shape" as defined by its width and height.

As illustrated by FIG. 42, in reference to transitional cross section 705, the transitional cross-section can be any rectangular shape, such as a square, and the corners of such a shape can be designed and defined by rounded or sharp edges or corners.

For purposes of the present invention, a rectangular shape, as used to define the transitional cross-section and transitional sections, is defined as a geometric shape, such that it has a dimension defined by its width, its height (as well as length when defining a transitional section having a length/depth. The shape is such that the width and the height can be the same (a square) or different (a rectangle). The ratio of width of the rectangular shape to height of the rectangular shape is defined as the aspect ratio. The corners of the rectangular shape can be sharp or have a radius to them. The corners do not significantly impact properties of the rectangular shape but may be required due to constraints of the manufacturing system.

As an example, if a rectangular shape is printed on a 3D printer like ULTIMAKER S5 using ABS filament, the shape could have sharp corners. However, if the shape is machined on a CNC machine, the corners would have a radius that is limited by the diameter of the milling tool. The above example is given for ease of understanding the reason behind and definition of the transitional cross-section and the scope of any claims should not be limited to the above examples.

It was determined using detailed computational fluid dynamics simulations and experimentations that to enable a diverging profile with a suitable angle of divergence, this transitional area is critical. This transitional area also reduced the water streamlines cross-over.

The functions of the transitional cross-sectional area 705 include but are not limited to (a) reduce water streamline cross-overs to allow a more streamline water stream exiting from the nozzle; (b) reduce turbulence in the incoming water stream; and (c) allow suitable diverging and converging angles to the final exit cross-section.

FIGS. 22 and 23 show the cross-sections of nozzle 700. The angle at which the incoming water stream converges to the transitional cross-section 705 is shown by the angles 706 and 708. This angle can vary from 5 degrees to 60 degrees. The smaller angle of convergence prevents water streamlines from crossing over. The advantage of a larger angle is that a larger angle allows creating more compact geometries. The choice of convergence angle is a function of desired flow efficiency, manufacturing constraints and cost of the final product. In our optimization studies, it was determined that the most suitable angles to optimize between flow and cost were between 10 degrees and 30 degrees. As the water stream flows from the transitional cross-section to the final area, the water stream converges in one direction and diverges in the other angle such that in one case the rate of convergence with respect to cross sectional area is greater than the rate of divergence with respect to the cross sectional area, such that overall the flow pathway converges with respect to cross sectional area. The convergence helps increase the velocity of the water stream. The divergence helps create diverging stream patterns as the water stream exits the nozzle. The transition from the transitional cross-sectional area 705 to the final cross-sectional area 702 is defined by the divergence angle 707 from the transitional area 705 to the final area 702 and the convergence angle 709 from the transitional area 705 to the final area 702. The value of divergence angle 707 can vary from 0 degree to 60 degrees. The value of convergence angle 709 can vary from 0 degree to 60 degrees. The flow pathway section can have a perimeter length that increases along the flow direction. The function of the divergence angle 707 is to create a water stream such that on exiting the nozzle, the stream has a diverging profile. The diverging profile of the water stream would allow continual increase in surface area of water stream and coverage. The function of convergence angle is to provide an increase in velocity of the water stream by keeping the same or reducing the cross-sectional area from the transitional cross-section 705 to the final exit area. The shape of the final cross-sectional area is such that the width is greater than the height. This elongated geometry allows creating water streams with high surface area. The elongated geometries can include, but are not limited to rectangular shapes like rectangles, rectangles with rounded edges and ellipses. All these geometries can be defined by their width and height. The width of the final cross-sectional area 703 and its height 704 dictate the final flow rate and geometric attributes of the water stream as it exits the nozzle. The width 703 can vary from 0.05" to 6" and height 704 can vary from 0.01" to 6". The net area as a function of 703 and 704 determines the final flow rate and that area can vary from the final cross-sectional area (CSA) determines the flow rate from the nozzle. This combination of convergence and divergence allows creating water streams with long range, high pressure, and large surface area. This combination of properties is critical for a variety of applications. As an example, in our experimental studies, such combination of properties showed to enhance the fire suppression rate.

Some examples are provided for ease of understanding. For municipal fire-fighting a flow rate of 120-150 GPM is required, in that case an optimum CSA is between 0.5 $inch^2$ to 0.75 $inch^2$. In case of wildland fire-fighting a flow rate of 30 GPM-60 GPM is desired. In that case an optimum CSA is between 0.1 $inch^2$ to 0.3 $inch^2$. For garden hose application, in the US, typical flow is 3 GPM to 6 GPM. In that case an optimum CSA would be between 0.025 $inch^2$ to 0.05 $inch^2$. The above examples are given to facilitate better understanding of the embodiment and is not necessarily to be construed as preferred or advantageous over other variations and embodiments. In our various studies, it was determined that the final CSA does not impact the fundamental principles behind this invention. The dimensions scale down proportionally.

Figure 24:
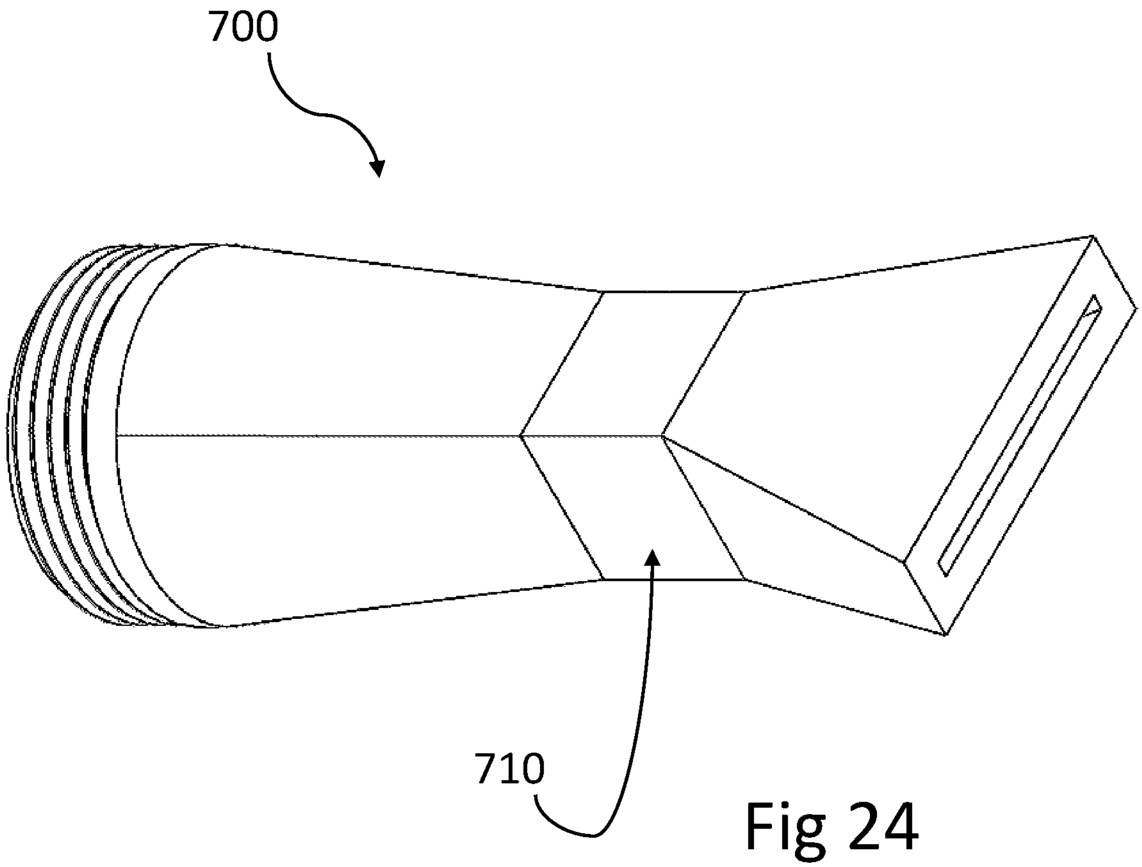
FIG. 24 is a perspective view of another embodiment of the high-efficiency nozzle of FIG. 21, wherein the nozzle has an extended transitional region that enables regulating fluid streamlines and minimizing turbulence.
Figure 25:
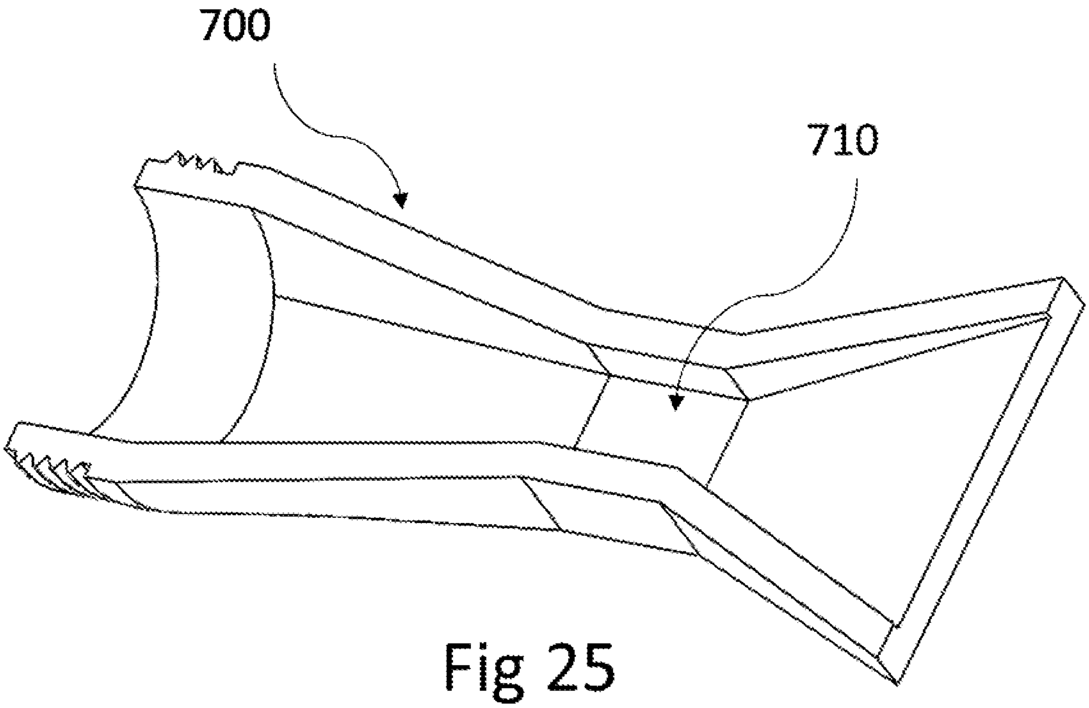
FIG. 25 is a perspective cutaway view of the nozzle of FIG. 24.

With reference to the figures, FIGS. 24-25, another exemplary embodiment of nozzle 700 is provided. In this embodiment, the nozzle inlet 701 can be directly attached to a hose or attached via use of a suitable adaptor or have another functional element between the hose and the nozzle like an on-off valve or a flow meter. The method of attachment should not impact the primary functionality of the nozzle. The key functionality is derived from the design of the nozzle and the nozzle can be scaled to fit hoses of various sizes, including but not limited to National Hose (NH) sizes ⅜", ½", ¾", 1", 1.5", 2" or 2.5"; or US garden hose sizes (½", ¾", ⅝" or 1").

The threads on the inlet section 701 can be male or female threads as per the requirement. The type of thread does not impact of limit the functionality of the nozzle. The exit 702 is designed such that as the water stream exits the nozzle, it forms a flat stream geometry. The velocity of the stream is a function of the cross-sectional area (CSA) of the nozzle exit, whereas the external surface area is a function of perimeter of the water stream exiting the nozzle. For any given geometric shape, a circle has the smaller ratio of perimeter to area. As compared to a circular geometry, a thin rectangle has significantly higher ratio of perimeter to area. This ratio of the CSA and perimeter for a rectangular geometry is a direct function of the ratio of the width of the rectangle and its height. Higher is the ratio of width and height of the rectangle, also known as the aspect ratio of the rectangle, higher would be the ratio of its perimeter and area.

For the nozzle 700, the width of the exiting water stream is determined by the width of the nozzle exit 703; the thickness of the water stream is determined by the height of the nozzle exit 704.

In this embodiment, the nozzle 700 is designed such that the incoming water stream converges to a transitional cross-section 705 with a profile P and an area A. This position of transitional cross-section 705 is such that it lies in between the nozzle inlet and the nozzle exit. The profile P of the transitional area 705 can be a square, a square with rounded edges, an ellipse, or a circle. The area A of the transitional cross-section is such that it is equal to or smaller than the inlet cross-section and it is equal to or greater than the exit cross-section.

It was determined using detailed computational fluid dynamics simulations and experimentations that to enable a diverging profile with a suitable angle of divergence, this transitional area is critical. This transitional area also reduced the water streamlines cross-over.

The functions of the transitional cross-sectional area 705 include but are not limited to (a) reduce water streamline cross-overs to allow a more streamline water stream exiting from the nozzle; (b) reduce turbulence in the incoming water stream; and (c) allow suitable diverging and converging angles to the final exit cross-section.

In the present embodiment, the cross-sectional area is extended to have a length shown by 710 in FIGS. 24 and 25. In our studies, it was discovered that a sharp transition from converging to diverging profiles creates turbulence in the water stream. The turbulence leads to back-pressure that can impact the range and geometry of the water stream. The straight section 710 allows fluid streamlines to have an efficient transition from the converging to the diverging profile. This helps increase the range of the water stream. The length of the straight section can be between 0.02" to 2".

FIGS. 22 and 23 show the cross-sections of the nozzle 700. The angle at which the incoming water stream converges to the transitional cross-section 705 is shown by the angles 706 and 708. This angle can vary from 5 degrees to 60 degrees. The smaller angle of convergence prevents water streamlines from crossing over. The advantage of larger angle is that larger angle allows creating more compact geometries. The choice of convergence angle is a function of desired flow efficiency, manufacturing constraints and cost of the final product. In our optimization studies it was determined that the most suitable angles to optimize between flow and cost were between 10 degrees and 30 degrees. As the water stream flows from the transitional cross-section to the final area, the water stream converges in one direction and diverges in the other angle. The convergence helps increase the velocity of water stream. The divergence helps create diverging stream patterns as water stream exits the nozzle. The transition from the transitional cross-sectional area 705 to the final cross-sectional area 702 is defined by the divergence angle 707 from the transitional area 705 to the final area 702 and the convergence angle 709 from the transitional area 705 to the final area 702. The value of divergence angle 707 can vary from 0 degree to 60 degrees. The value of convergence angle 709 can vary from 0 degree to 60 degrees. The function of the divergence angle 707 is to create a water stream such that on exiting the nozzle, the stream has a diverging profile. The diverging profile of the water stream would allow continual increase in surface area of water stream and coverage. This increase in surface area of the water stream is critical for enhancing fire suppression rate. The function of convergence angle is to provide increase in velocity of the water stream by keeping same or reducing the cross-sectional area from the transitional cross-section 705 to the final exit area. The shape of the final cross-sectional area is such that the width is greater than the height. This elongated geometry allows creating water streams with high surface area. The elongated geometries can include, but are not limited to rectangles, rectangles with rounded edges and ellipses. All these geometries can be defined by their width and height. The width of the final cross-sectional area 703 and its height 704 dictate the final flow rate and geometric attributes of the water stream as it exits the nozzle. The width 703 can vary from 0.05" to 6" and height 704 can vary from 0.01" to 6". The net area as a function of 703 and 704 determines the final flow rate and that area can vary from the final cross-sectional area (CSA) determines the flow rate from the nozzle.

Some examples are provided for ease of understanding. For municipal fire-fighting a flow rate of 120-150 GPM is required, in that case an optimum CSA is between 0.5 $inch^2$ to 0.75 $inch^2$. In case of wildland fire-fighting a flow rate of 30 GPM-60 GPM is desired. In that case an optimum CSA is between 0.1 $inch^2$ to 0.3 $inch^2$. For garden hose application, in the US, typical flow is 3 GPM to 6 GPM. In that case an optimum CSA would be between 0.025 $inch^2$ to 0.05 $inch^2$. The above examples are given to facilitate better understanding of the embodiment and is not necessarily to be construed as preferred or advantageous over other variations and embodiments. In our various studies, it was determined that the final CSA does not impact the fundamental principles behind this invention. The dimensions scale down proportionally.

Figure 26:
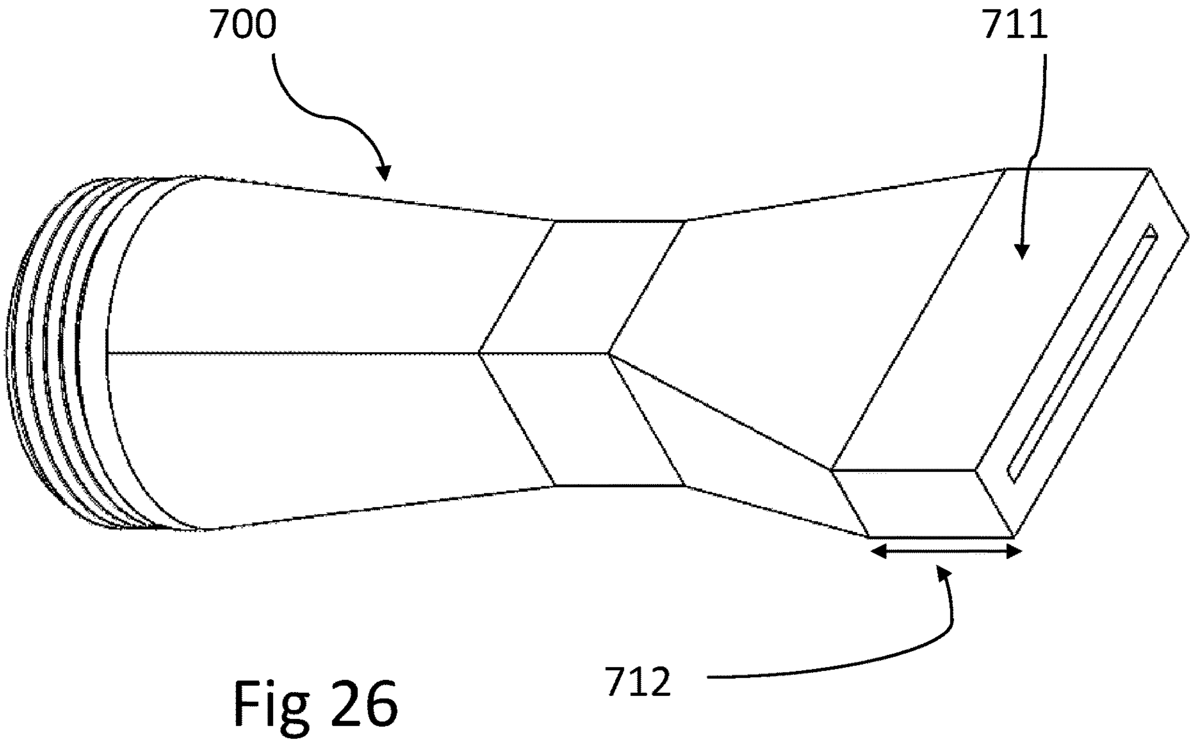
FIG. 26 is a perspective view of another embodiment of the high-efficiency nozzle of FIG. 21, wherein the nozzle has an extended transitional region that enables regulating fluid streamlines and minimizing turbulence, and the exit end of the nozzle has an extended straight profile that helps in regulating the divergence angle.

FIG. 26 provides another exemplary embodiment of the high-efficiency nozzle 700. In this embodiment, the nozzle inlet 701 can be directly attached to a hose or attached via use of a suitable adaptor or have another functional element between the hose and the nozzle like an on-off valve or a flow meter. The method of attachment should not impact the primary functionality of the nozzle. The key functionality is derived from the design of the nozzle and the nozzle can be scaled to fit hoses of various sizes, including but not limited to National Hose (NH) sizes ⅜", ½", ¾", 1", 1.5", 2"or 2.5"; or US garden hose sizes (½", ¾", ⅝" or 1").

The threads on the inlet section 701 can be male or female threads as per the requirement. The type of thread does not impact of limit the functionality of the nozzle. The exit 702 is designed such that as the water stream exits the nozzle, it forms a flat stream geometry. The velocity of the stream is a function of the cross-sectional area (CSA) of the nozzle exit, whereas the external surface area is a function of perimeter of the water stream exiting the nozzle. For any given geometric shape, a circle has the smaller ratio of perimeter to area. As compared to a circular geometry, a thin rectangle has significantly higher ratio of perimeter to area. This ratio of the CSA and perimeter for a rectangular geometry is a direct function of the ratio of the width of the rectangle and its height. Higher is the ratio of width and height of the rectangle, also known as the aspect ratio of the rectangle, higher would be the ratio of its perimeter and area.

For the nozzle 700, the width of the exiting water stream is determined by the width of the nozzle exit 703; the thickness of the water stream is determined by the height of the nozzle exit 704.

The nozzle 700 is designed such that the incoming water stream converges to a transitional cross-section 705 with a profile P and an area A. This position of transitional cross-section 705 is such that it lies in between the nozzle inlet and the nozzle exit. The profile P of the transitional area 705 can be a square, a square with rounded edges, an ellipse, or a circle. The area A of the transitional cross-section is such that it is equal to or smaller than the inlet cross-section and it is equal to or greater than the exit cross-section.

It was determined using detailed computational fluid dynamics simulations and experimentations that to enable a diverging profile with a suitable angle of divergence, this transitional area is critical. This transitional area also reduced the water streamlines cross-over.

The functions of the transitional cross-sectional area 705 include but are not limited to (a) reduce water streamline cross-overs to allow a more streamline water stream exiting from the nozzle; (b) reduce turbulence in the incoming water stream; and (c) allow suitable diverging and converging angles to the final exit cross-section. The cross-sectional area can be extended to have a length shown by 710 in FIGS. 24 and 25. In our studies it was discovered that a sharp transition from converging to diverging profiles create turbulence in the water stream. The turbulence leads to back-pressure that can impact the range and geometry of the water stream. The straight section 710 allows fluid streamlines to have an efficient transition from the converging to diverging profile. This helps increase the range of the water stream. The length of the straight section can be between 0.02" to 2".

FIGS. 22 and 23 show the cross-sections of the nozzle 700. The angle at which the incoming water stream converges to the transitional cross-section 705 is shown by the angles 706 and 708. This angle can vary from 5 degrees to 60 degrees. The smaller angle of convergence prevents water streamlines from crossing over. The advantage of larger angle is that larger angle allows creating more compact geometries. The choice of convergence angle is a function of desired flow efficiency, manufacturing constraints and cost of the final product. In our optimization studies it was determined that the most suitable angles to optimize between flow and cost were between 10 degrees and 30 degrees. As the water stream flows from the transitional cross-section to the final area, the water stream converges in one direction and diverges in the other angle. The convergence helps increase the velocity of water stream. The divergence helps create diverging stream patterns as water stream exits the nozzle. The transition from the transitional cross-sectional area 705 to the final cross-sectional area 702 is defined by the divergence angle 707 from the transitional area 705 to the final area 702 and the convergence angle 709 from the transitional area 705 to the final area 702. The value of divergence angle 707 can vary from 0 degree to 60 degrees. The value of convergence angle 709 can vary from 0 degree to 60 degrees. The function of the divergence angle 707 is to create a water stream such that on exiting the nozzle, the stream has a diverging profile. The diverging profile of the water stream would allow continual increase in surface area of water stream and coverage. This increase in surface area of the water stream is critical for enhancing fire suppression rate. The function of convergence angle is to provide increase in velocity of the water stream by keeping same or reducing the cross-sectional area from the transitional cross-section 705 to the final exit area.

The shape of the final cross-sectional area is such that the width is greater than the height. This elongated geometry allows creating water streams with high surface area. The elongated geometries can include, but are not limited to rectangles, rectangles with rounded edges and ellipses. All these geometries can be defined by their width and height. The width of the final cross-sectional area 703 and its height 704 dictate the final flow rate and geometric attributes of the water stream as it exits the nozzle. The width 703 can vary from 0.05" to 6" and height 704 can vary from 0.01" to 6". The final cross-sectional area (CSA) determines the flow rate from the nozzle.

Some examples are provided for ease of understanding. For municipal fire-fighting a flow rate of 120-150 GPM is required, in that case an optimum CSA is between 0.5 $inch^2$ to 0.75 $inch^2$. In case of wildland fire-fighting a flow rate of 30 GPM-60 GPM is desired. In that case an optimum CSA is between 0.1 $inch^2$ to 0.3 $inch^2$. For garden hose application, in the US, typical flow is 3 GPM to 6 GPM. In that case an optimum CSA would be between 0.025 $inch^2$ to 0.05 $inch^2$. The above examples are given to facilitate better understanding of the embodiment and is not necessarily to be construed as preferred or advantageous over other variations and embodiments. In our various studies, it was determined that the final CSA does not impact the fundamental principles behind this invention. The dimensions scale down proportionally.

In the present embodiment, the final cross-sectional area has an extended pathway shown by 711 in FIG. 26. The elongated pathway allows better control of the diverging stream. It was determined via detailed experimentation that for design of manufacturing, to be able to get consistent diverging pattern can be challenging. Even a small change in the diverging angle 707 can have huge impact on the final geometry of the water stream. The straight section 711 allows that the nozzles have less variations. This is critical for manufacturing in high volumes to achieve high consistency. The length 712 of the straight section 711 can vary from 0 inch to 4 inches.

FIGS. 27-28 provides another exemplary embodiment of the high efficiency nozzle 700. In this embodiment the nozzle inlet 701 can be directly attached to a hose or attached via use of a suitable adaptor or have another functional element between the hose and the nozzle like an on-off valve or a flow meter. The method of attachment should not impact the primary functionality of the nozzle. The key functionality is derived from the design of the nozzle and the nozzle can be scaled to fit hoses of various sizes, including but not limited to National Hose (NH) sizes ⅜", ½", ¾", 1", 1.5", 2" or 2.5"; or US garden hose sizes (½", ¾", ⅝" or 1").

The threads on the inlet section 701 can be male or female threads as per the requirement. The type of thread does not impact of limit the functionality of the nozzle. The exit 702 is designed such that as the water stream exits the nozzle, it forms a flat stream geometry. The velocity of the stream is a function of the cross-sectional area (CSA) of the nozzle exit, whereas the external surface area is a function of perimeter of the water stream exiting the nozzle. For any given geometric shape, a circle has the smaller ratio of perimeter to area. As compared to a circular geometry, a thin rectangle has significantly higher ratio of perimeter to area. This ratio of the CSA and perimeter for a rectangular geometry is a direct function of the ratio of the width of the rectangle and its height. Higher is the ratio of width and height of the rectangle, also known as the aspect ratio of the rectangle, higher would be the ratio of its perimeter and area.

For the nozzle 700, the width of the exiting water stream is determined by the width of the nozzle exit 703; the thickness of the water stream is determined by the height of the nozzle exit 704.

The nozzle 700 is designed such that the incoming water stream converges to a transitional cross-section 705 with a profile P and an area A. This position of transitional cross-section 705 is such that it lies in between the nozzle inlet and the nozzle exit. The profile P of the transitional area 705 can be a square, a square with rounded edges, an ellipse, or a circle. The area A of the transitional cross-section is such that it is equal to or smaller than the inlet cross-section and it is equal to or greater than the exit cross-section.

It was determined using detailed computational fluid dynamics simulations and experimentations that to enable a diverging profile with a suitable angle of divergence, this transitional area is critical. This transitional area also reduced the water streamlines cross-over.

The functions of the transitional cross-sectional area 705 include but are not limited to (a) reduce water streamline cross-overs to allow a more streamline water stream exiting from the nozzle; (b) reduce turbulence in the incoming water stream; and (c) allow suitable diverging and converging angles to the final exit cross-section.

The cross-sectional area can be extended to have a length shown by 710 in FIGS. 24 and 25. In our studies it was discovered that a sharp transition from converging to diverging profiles create turbulence in the water stream. The turbulence leads to back-pressure that can impact the range and geometry of the water stream. The straight section 710 allows fluid streamlines to have an efficient transition from the converging to diverging profile. This helps increase the range of the water stream. The length of the straight section can be between 0.02" to 2".

FIGS. 22 and 23 show the cross-sections of the nozzle 700. The angle at which the incoming water stream converges to the transitional cross-section 705 is shown by the angles 706 and 708. This angle can vary from 5 degrees to 60 degrees. The smaller angle of convergence prevents water streamlines from crossing over. The advantage of larger angle is that larger angle allows creating more compact geometries. The choice of convergence angle is a function of desired flow efficiency, manufacturing constraints and cost of the final product. In our optimization studies it was determined that the most suitable angles to optimize between flow and cost were between 10 degrees and 30 degrees. As the water stream flows from the transitional cross-section to the final area, the water stream converges in one direction and diverges in the other angle. The convergence helps increase the velocity of water stream. The divergence helps create diverging stream patterns as water stream exits the nozzle. The transition from the transitional cross-sectional area 705 to the final cross-sectional area 702 is defined by the divergence angle 707 from the transitional area 705 to the final area 702 and the convergence angle 709 from the transitional area 705 to the final area 702. The value of divergence angle 707 can vary from 0 degree to 60 degrees. The value of convergence angle 709 can vary from 0 degree to 60 degrees. The function of the divergence angle 707 is to create a water stream such that on exiting the nozzle, the stream has a diverging profile. The diverging profile of the water stream would allow continual increase in surface area of water stream and coverage. This increase in surface area of the water stream is critical for enhancing fire suppression rate. The function of convergence angle is to provide increase in velocity of the water stream by keeping same or reducing the cross-sectional area from the transitional cross-section 705 to the final exit area. The shape of the final cross-sectional area is such that the width is greater than the height. This elongated geometry allows creating water streams with high surface area. The elongated geometries can include, but are not limited to rectangles, rectangles with rounded edges and ellipses. All these geometries can be defined by their width and height. The width of the final cross-sectional area 703 and its height 704 dictate the final flow rate and geometric attributes of the water stream as it exits the nozzle. The width 703 can vary from 0.05" to 6" and height 704 can vary from 0.01" to 6". The final cross-sectional area (CSA) determines the flow rate from the nozzle.

Some examples are provided for ease of understanding. For municipal fire-fighting a flow rate of 120-150 GPM is required, in that case an optimum CSA is between 0.5 $inch^2$ to 0.75 $inch^2$. In case of wildland fire-fighting a flow rate of 30 GPM-60 GPM is desired. In that case an optimum CSA is between 0.1 $inch^2$ to 0.3 $inch^2$. For garden hose application, in the US, typical flow is 3 GPM to 6 GPM. In that case an optimum CSA would be between 0.025 $inch^2$ to 0.05 $inch^2$. The above examples are given to facilitate better understanding of the embodiment and is not necessarily to be construed as preferred or advantageous over other variations and embodiments. In our various studies, it was determined that the final CSA does not impact the fundamental principles behind this invention. The dimensions scale down proportionally.

The final cross-sectional area may have an extended pathway shown by 711 in FIG. 26. The elongated pathway allows better control of the diverging stream. It was determined via detailed experimentation that for design of manufacturing, to be able to get consistent diverging pattern can be challenging. Even a small change in the diverging angle 707 can have huge impact on the final geometry of the water stream. The straight section 711 allows that the nozzles have less variations. This is critical for manufacturing in high volumes to achieve high consistency. The length 712 of the straight section 711 can vary from 0 inch to 4 inches.

In the present embodiment the internal and external edges may have filets for ease of the manufacturing processes. The filets are created for: (1) Manufacturing processes. It is not feasible to create completely squared edges and the cost of manufacturing to create such edges can be extremely high. Filets on the internal pathway allow reducing the manufacturing cost and do not impact the flow of the fluid through the nozzle pathway. (2) Reducing sharp edges: The exterior filets help create softer edges on the exterior of the nozzle. Sharp edges are not desirable on the exterior of the nozzle for safety of the nozzle operator. (3) Increasing robustness: Sharp edges have higher pressure concentration and may lead to formation of cracks and damage under stress. Filets help distribution of stresses over larger areas and reduce damage to the nozzle. The exterior filets are shown by 713 and interior filets are shown by 714.

Figure 29:
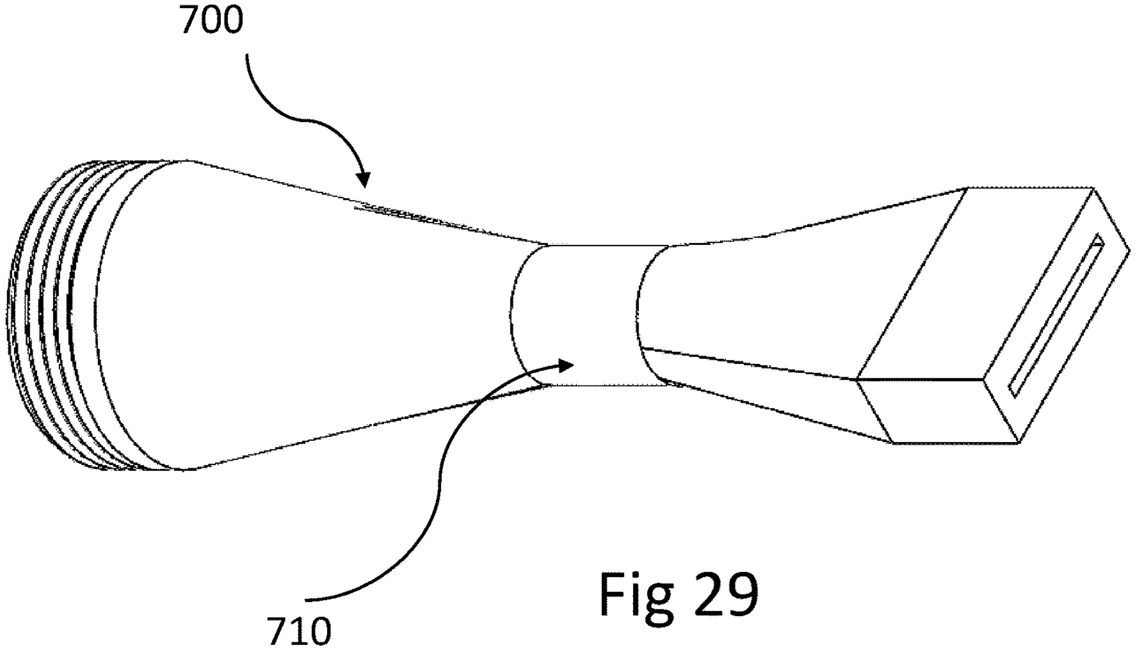
FIG. 29 is a perspective view of another embodiment of the high-efficiency nozzle of FIG. 21 wherein the transitional region is circular. This circular transitional region then translates into the final exit geometry.

With respect to FIG. 29, it should be noted that even though FIG. 29 is illustrating one example of where the transitional region is circular, the present invention is applicable to and can be applied to all different embodiments as shown in the previous figures. More specifically, where the transitional region is circular, exemplary embodiments where the transition region length can vary from 0 to 4 inches or there could be a straight section at the end of the nozzle, and such alternative applications do not warrant or require additional illustration for understanding.

FIG. 29 provides another exemplary embodiment of the high efficiency nozzle 700. In this embodiment the nozzle inlet 701 can be directly attached to a hose or attached via use of a suitable adaptor or have another functional element between the hose and the nozzle like an on-off valve or a flow meter. The method of attachment should not impact the primary functionality of the nozzle. The key functionality is derived from the design of the nozzle and the nozzle can be scaled to fit hoses of various sizes, including but not limited to National Hose (NH) sizes ⅜", ½", ¾", 1", 1.5", 2" or 2.5"; or US garden hose sizes (½", ¾", ⅝" or 1").

The threads on the inlet section 701 can be male or female threads as per the requirement. The type of thread does not impact of limit the functionality of the nozzle. The exit 702 is designed such that as the water stream exits the nozzle, it forms a flat stream geometry. The velocity of the stream is a function of the cross-sectional area (CSA) of the nozzle exit, whereas the external surface area is a function of perimeter of the water stream exiting the nozzle. For any given geometric shape, a circle has the smaller ratio of perimeter to area. As compared to a circular geometry, a thin rectangle has significantly higher ratio of perimeter to area. This ratio of the CSA and perimeter for a rectangular geometry is a direct function of the ratio of the width of the rectangle and its height. Higher is the ratio of width and height of the rectangle, also known as the aspect ratio of the rectangle, higher would be the ratio of its perimeter and area.

For the nozzle 700, the width of the exiting water stream is determined by the width of the nozzle exit 703; the thickness of the water stream is determined by the height of the nozzle exit 704.

The nozzle 700 is designed such that the incoming water stream converges to a transitional cross-section 705 with a profile P and an area A. This position of transitional cross-section 705 is such that it lies in between the nozzle inlet and the nozzle exit.

In the present embodiment the profile P of the transitional area 705 is such that it has a circular profile. The area A of the transitional cross-section is such that it is equal to or smaller than the inlet cross-section and it is equal to or greater than the exit cross-section.

It was determined using detailed computational fluid dynamics simulations and experimentations that to enable a diverging profile with a suitable angle of divergence, this transitional area is critical. This transitional area also reduced the water streamlines cross-over.

The functions of the transitional cross-sectional area 705 include but are not limited to (a) reduce water streamline cross-overs to allow a more streamline water stream exiting from the nozzle; (b) reduce turbulence in the incoming water stream; and (c) allow suitable diverging and converging angles to the final exit cross-section.

The cross-sectional area can be extended to have a length shown by 710 in FIGS. 24 and 25. In our studies it was discovered that a sharp transition from converging to diverging profiles create turbulence in the water stream. The turbulence leads to back-pressure that can impact the range and geometry of the water stream. The straight section 710 allows fluid streamlines to have an efficient transition from the converging to diverging profile. This helps increase the range of the water stream. The length of the straight section can be between 0.02" to 2".

FIGS. 22 and 23 show the cross-sections of the nozzle 700. The angle at which the incoming water stream converges to the transitional cross-section 705 is shown by the angles 706 and 708. This angle can vary from 5 degrees to 60 degrees. The smaller angle of convergence prevents water streamlines from crossing over. The advantage of larger angle is that larger angle allows creating more compact geometries. The choice of convergence angle is a function of desired flow efficiency, manufacturing constraints and cost of the final product. In our optimization studies it was determined that the most suitable angles to optimize between flow and cost were between 10 degrees and 30 degrees. As the water stream flows from the transitional cross-section to the final area, the water stream converges in one direction and diverges in the other angle. The convergence helps increase the velocity of water stream. The divergence helps create diverging stream patterns as water stream exits the nozzle. The transition from the transitional cross-sectional area 705 to the final cross-sectional area 702 is defined by the divergence angle 707 from the transitional area 705 to the final area 702 and the convergence angle 709 from the transitional area 705 to the final area 702. The value of divergence angle 707 can vary from 0 degree to 60 degrees. The value of convergence angle 709 can vary from 0 degree to 60 degrees. The function of the divergence angle 707 is to create a water stream such that on exiting the nozzle, the stream has a diverging profile. The diverging profile of the water stream would allow continual increase in surface area of water stream and coverage. This increase in surface area of the water stream is critical for enhancing fire suppression rate. The function of convergence angle is to provide increase in velocity of the water stream by keeping same or reducing the cross-sectional area from the transitional cross-section 705 to the final exit area. The shape of the final cross-sectional area is such that the width is greater than the height. This elongated geometry allows creating water streams with high surface area. The elongated geometries can include, but are not limited to rectangles, rectangles with rounded edges and ellipses. All these geometries can be defined by their width and height. The width of the final cross-sectional area 703 and its height 704 dictate the final flow rate and geometric attributes of the water stream as it exits the nozzle. The width 703 can vary from 0.05" to 6" and height 704 can vary from 0.01" to 6". The final cross-sectional area (CSA) determines the flow rate from the nozzle.

Some examples are provided for ease of understanding. For municipal fire-fighting a flow rate of 120-150 GPM is required, in that case an optimum CSA is between 0.5 $inch^2$ to 0.75 $inch^2$. In case of wildland fire-fighting a flow rate of 30 GPM-60 GPM is desired. In that case an optimum CSA is between 0.1 $inch^2$ to 0.3 $inch^2$. For garden hose application, in the US, typical flow is 3 GPM to 6 GPM. In that case an optimum CSA would be between 0.025 $inch^2$ to 0.05 $inch^2$. The above examples are given to facilitate better understanding of the embodiment and is not necessarily to be construed as preferred or advantageous over other variations and embodiments. In our various studies, it was determined that the final CSA does not impact the fundamental principles behind this invention. The dimensions scale down proportionally.

The final cross-sectional area may have an extended pathway shown by 711 in FIG. 26. The elongated pathway allows better control of the diverging stream. It was determined via detailed experimentation that for design of manufacturing, to be able to get consistent diverging pattern can be challenging. Even a small change in the diverging angle 707 can have huge impact on the final geometry of the water stream. The straight section 711 allows that the nozzles have less variations. This is critical for manufacturing in high volumes to achieve high consistency. The length 712 of the straight section 711 can vary from 0 inch to 4 inches.

The internal and external edges may have filets for ease of the manufacturing processes. The filets are created for: (1) Manufacturing processes. It is not feasible to create completely squared edges and the cost of manufacturing to create such edges can be extremely high. Filets on the internal pathway allow reducing the manufacturing cost and do not impact the flow of the fluid through the nozzle pathway. (2) Reducing sharp edges: The exterior filets help create softer edges on the exterior of the nozzle. Sharp edges are not desirable on the exterior of the nozzle for safety of the nozzle operator. (3) Increasing robustness: Sharp edges have higher pressure concentration and may lead to formation of cracks and damage under stress. Filets help distribution of stresses over larger areas and reduce damage to the nozzle. The exterior filets are shown by 713 and interior filets are shown by 714.

Figure 30:
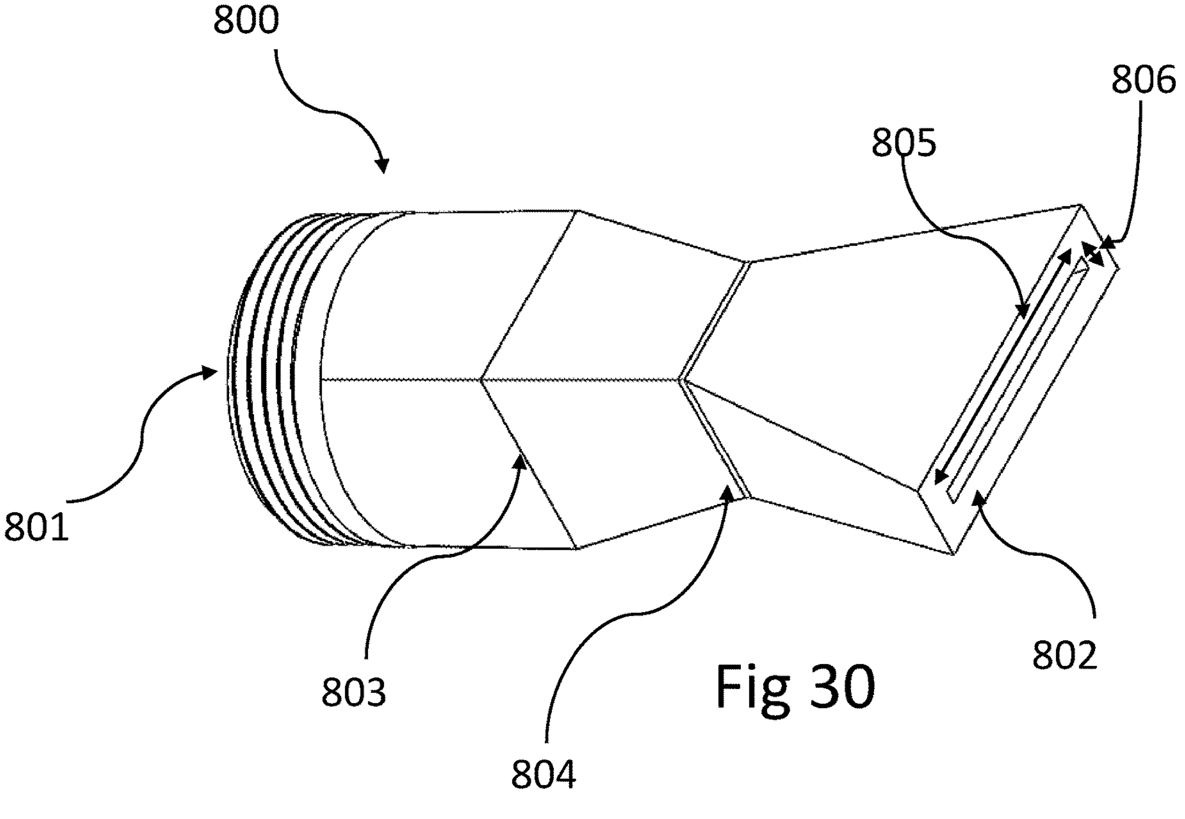
FIG. 30 is a perspective view of a high-efficiency nozzle in accordance with an exemplary embodiment of the present invention wherein two transition regions are present in the fluid pathway.
Figure 31:
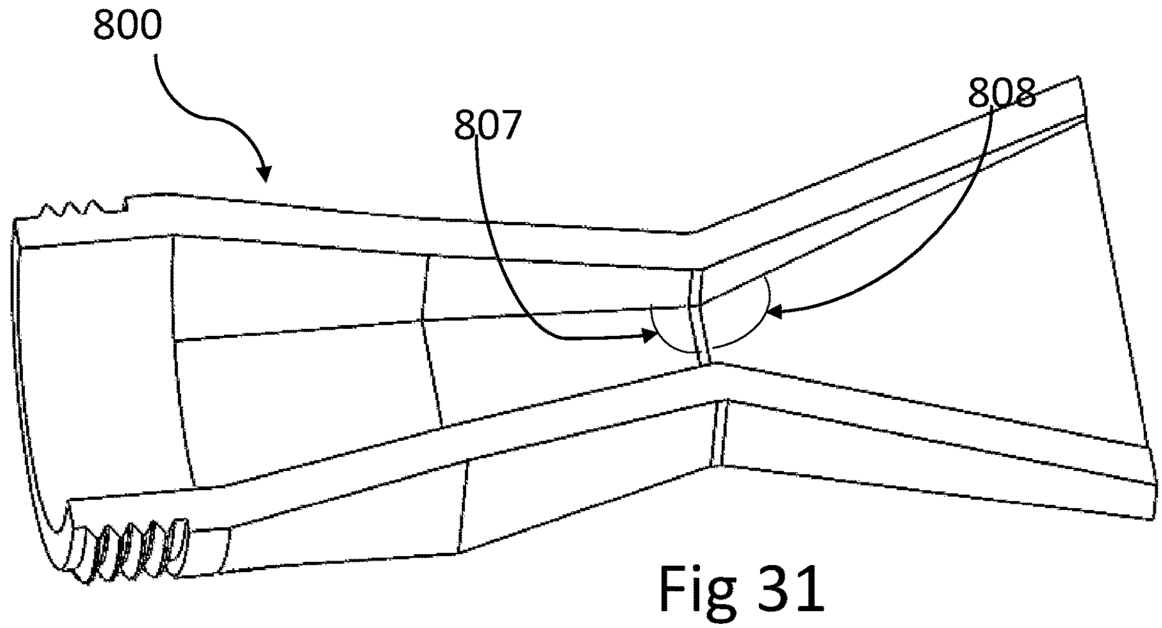
FIG. 31 is a perspective cutaway view of the nozzle of FIG. 30. The cross-section shows internal geometric parameters that enable the formation of a water stream with a desirable profile.
Figure 32:
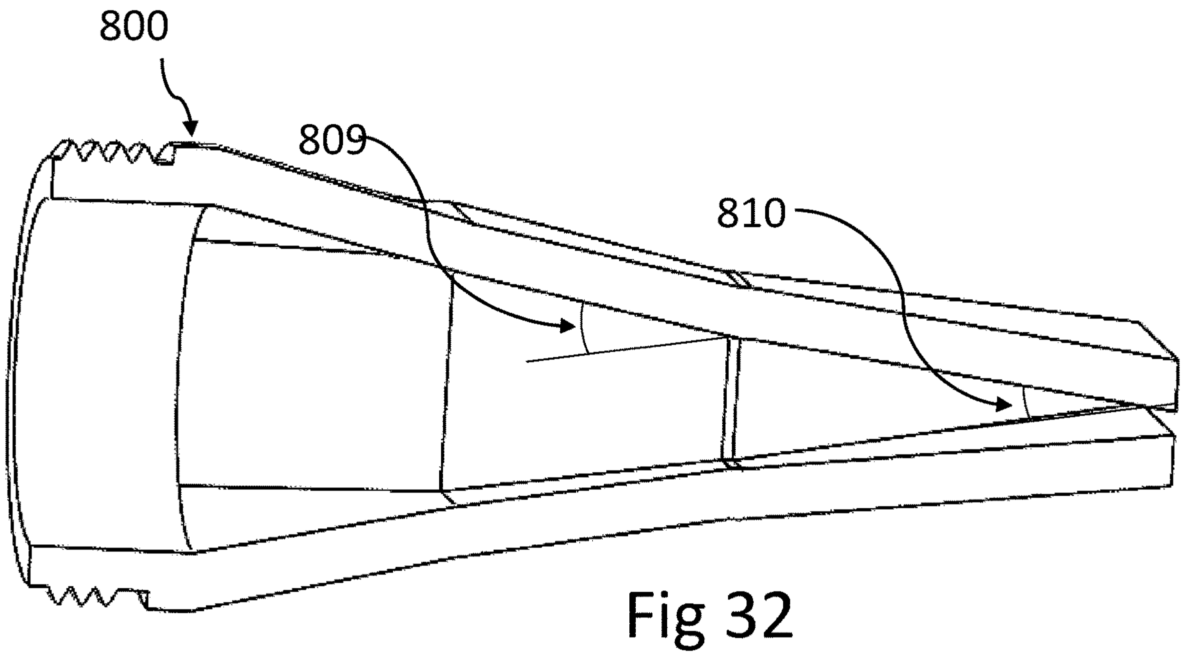
FIG. 32 is another perspective cutaway view of the nozzle of FIG. 30. The cross-section shows internal geometric parameters that enable the formation of a water stream with a desirable profile.

FIGS. 30-32 provide illustrations of high efficiency nozzle 800, in accordance with another exemplary embodiment of the current invention. In this embodiment, the nozzle 800 is designed such that the incoming water stream converges to a first transitional cross-section 803 with profile P-1 and area A-1, and a second transitional cross-section 804 with profile P-2 and area A-2. This position of transitional cross-sections 803 and 804 is such that they lie in between the nozzle inlet and the nozzle exit. The position of transitional cross-section 803 is such that it is closer to the inlet of the nozzle. The position of the transitional cross-section 804 is such that it is closer to the outlet of the nozzle. The function of the transitional cross-sectional area 803 is to provide a profile shape that can minimize stream cross-overs as the cross-sectional area reduces.

It was discovered that as the cross-sectional profile changes from circular to square or rectangular, the surface of the flow pathway introduces a twist in the water streamlines. These twists can stay in the water stream as it exits the nozzle and create undesirable stream patterns. The challenge becomes more prominent as the ratio of the diameter of the inlet to the smallest dimension of the rectangle goes up.

As an example, if the final cross-sectional profile is a rectangle with a dimension of 2" by 0.1" and the transitional area 804 is a square with sides 0.2"×0.2". Then going from a circle of diameter 1.5" to a square of sides 0.2" can introduce significant twist in water streamlines. This can impact the shape of the final geometry as it exits the nozzle. Based on detailed computational fluid dynamic simulations and experimental validations, it was discovered that to mitigate this challenge, another transitional cross-section 803 can be introduced. This transitional area 803 can be a square with sides 1"×1". The area of this 1"×1" square is less than the area of 1.5" inlet but more than the second transitional cross-section 0.2"×0.2". Going from a 1.5" circle to a square with side 1" does not introduce significant twist in the water streamlines. The second transition, that is from square with side 1" to square with side 0.2" is a square-to-square transition and does not introduce twisting in the water streamlines. Introducing an additional transitional cross-section allows improving the uniformity and shape of the exiting water stream. The above example is given to facilitate better understanding of the embodiment and is not necessarily to be construed as preferred or advantageous over other variations and embodiments.

The function of the transitional cross-section 804 include but are not limited to (a) reduce water streamline cross-overs to allow a more streamline water stream exiting from the nozzle; (b) reduce turbulence in the incoming water stream; and (c) allow suitable diverging and converging angles to the final exit cross-section.

In this embodiment the nozzle inlet 801 can be directly attached to a hose or attached via use of a suitable adaptor or have another functional element between the hose and the nozzle like an on-off valve or a flow meter. The method of attachment should not impact the primary functionality of the nozzle. The key functionality is derived from the design of the nozzle and the nozzle can be scaled to fit hoses of various sizes, including but not limited to National Hose (NH) sizes ⅜", ½", ¾", 1", 1.5", 2" or 2.5"; or US garden hose sizes (½", ¾", ⅝" or 1").

The threads on the inlet section 801 can be male or female threads as per the requirement. The type of thread does not impact of limit the functionality of the nozzle. The exit 802 is designed such that as the water stream exits the nozzle, it forms a flat stream geometry. The velocity of the stream is a function of the cross-sectional area (CSA) of the nozzle exit, whereas the external surface area is a function of perimeter of the water stream exiting the nozzle. For any given geometric shape, a circle has the smaller ratio of perimeter to area. As compared to a circular geometry, a thin rectangle has significantly higher ratio of perimeter to area. This ratio of the CSA and perimeter for a rectangular geometry is a direct function of the ratio of the width of the rectangle and its height. Higher is the ratio of width and height of the rectangle, also known as the aspect ratio of the rectangle, higher would be the ratio of its perimeter and area.

For the nozzle 800, the width of the exiting water stream is determined by the width of the nozzle exit 805; the thickness of the water stream is determined by the height of the nozzle exit 806.

FIGS. 31 and 32 show the cross-sections of nozzle 800. The angle at which the water stream converges to the transitional cross-section 804 is shown by the angles 807 and 809. This angle can vary from 5 degrees to 60 degrees. The smaller angle of convergence prevents water streamlines from crossing over. The advantage of larger angle is that larger angle allows creating more compact geometries. The choice of convergence angle is a function of desired flow efficiency, manufacturing constraints and cost of the final product. In our optimization studies it was determined that the most suitable angles to optimize between flow and cost were between 10 degrees and 30 degrees. As the water stream flows from the transitional cross-section to the final area, the water stream converges in one direction and diverges in the other angle. The convergence helps increase the velocity of water stream. The divergence helps create diverging stream patterns as water stream exits the nozzle. The transition from the transitional cross-sectional area 804 to the final cross-sectional area 802 is defined by the divergence angle 808 from the transitional area 804 to the final area 802 and the convergence angle 810 from the transitional area 804 to the final area 802. The value of divergence angle 808 can vary from 0 degree to 60 degrees. The value of convergence angle 810 can vary from 0 degree to 60 degrees. The function of the divergence angle 808 is to create a water stream such that on exiting the nozzle, the stream has a diverging profile.

The diverging profile of the water stream would allow continual increase in surface area of water stream and coverage. This increase in surface area of the water stream is critical for enhancing fire suppression rate. The function of convergence angle is to provide increase in velocity of the water stream by keeping same or reducing the cross-sectional area from the transitional cross-section 804 to the final exit area. The shape of the final cross-sectional area is such that the width is greater than the height. This elongated geometry allows creating water streams with high surface area. The elongated geometries can include, but are not limited to rectangles, rectangles with rounded edges and ellipses. All these geometries can be defined by their width and height. The width of the final cross-sectional area 805 and its height 806 dictate the final flow rate and geometric attributes of the water stream as it exits the nozzle. The width 805 can vary from 0.05" to 6" and height 806 can vary from 0.01" to 6". The net area as a function of 805 and 806 determines the final flow rate and that area can vary from the final cross-sectional area (CSA) determines the flow rate from the nozzle.

Some examples are provided for ease of understanding. For municipal fire-fighting a flow rate of 120-150 GPM is required, in that case an optimum CSA is between 0.5 inch$^2$ to 0.75 inch$^2$. In case of wildland fire-fighting a flow rate of 30 GPM-60 GPM is desired. In that case an optimum CSA is between 0.1 inch$^2$ to 0.3 inch$^2$. For garden hose application, in the US, typical flow is 3 GPM to 6 GPM. In that case an optimum CSA would be between 0.025 inch$^2$ to 0.05 inch$^2$. The above examples are given to facilitate better understanding of the embodiment and is not necessarily to be construed as preferred or advantageous over other variations and embodiments. In our various studies, it was determined that the final CSA does not impact the fundamental principles behind this invention. The dimensions scale down proportionally.

Figure 33:
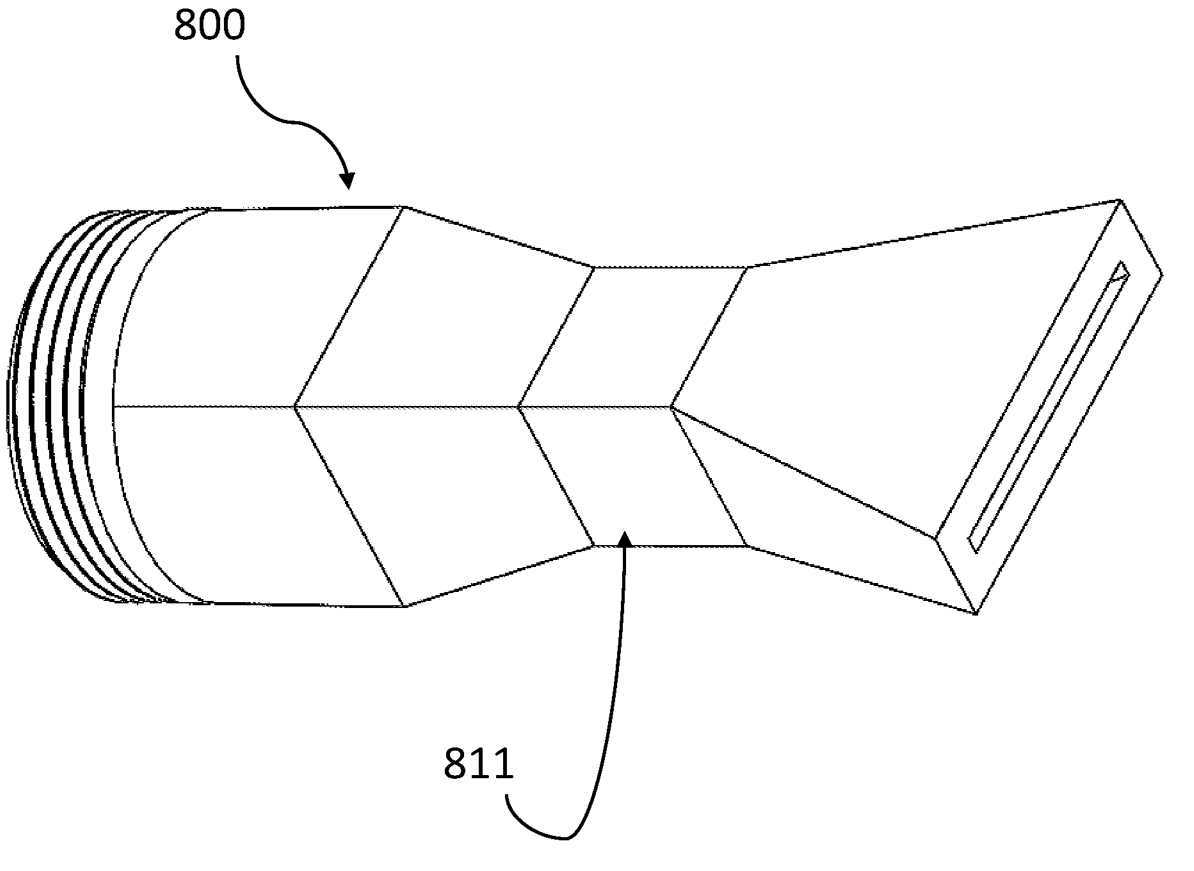
FIG. 33 is a perspective view of another embodiment of the high-efficiency nozzle of FIG. 30, wherein the second transitional region of the nozzle is extended to enables regulating fluid streamlines and minimizing turbulence.
Figure 34:
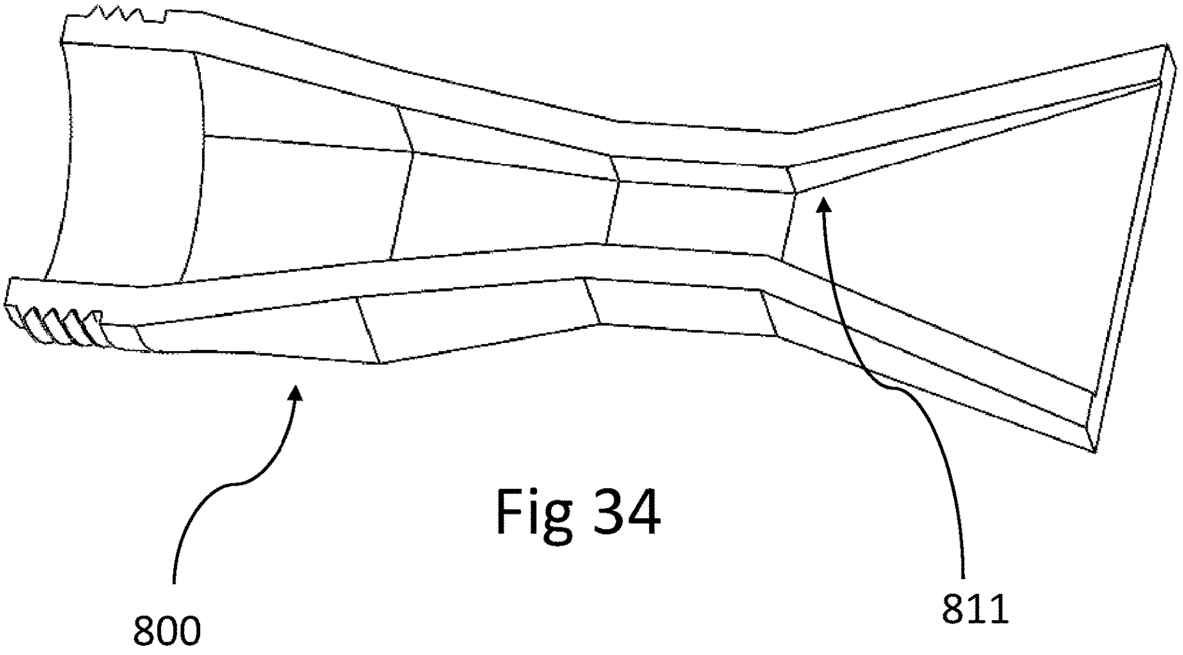
FIG. 34 is a perspective cutaway view of the nozzle of FIG. 33. The cross-section shows internal geometric parameters that enable the formation of a water stream with a desirable profile.
Figure 35:
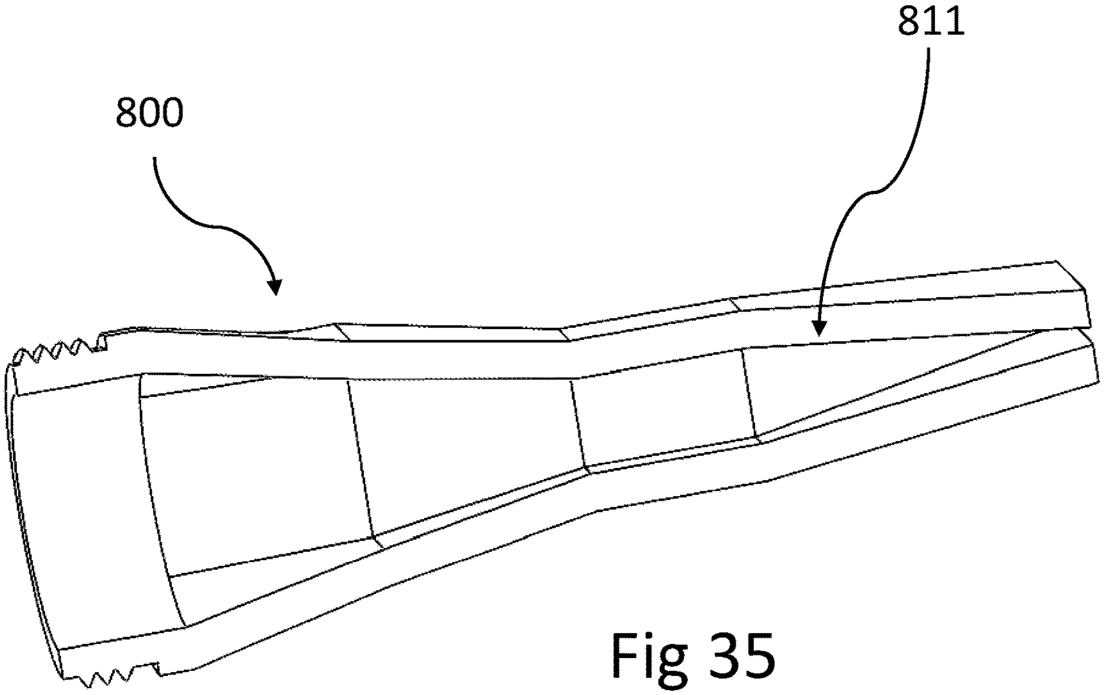
FIG. 35 is another perspective cutaway view of the nozzle of FIG. 33. The cross-section shows internal geometric parameters that enable the formation of a water stream with a desirable profile.

With reference to the figures, FIGS. 33-35, another exemplary embodiment of nozzle 800 is provided. In this embodiment, the nozzle 800 is designed such that the incoming water stream converges to a first transitional cross-section 803 with profile P-1 and area A-1, and a second transitional cross-section 804 with profile P-2 and area A-2. This position of transitional cross-sections 803 and 804 is such that they lie in between the nozzle inlet and the nozzle exit. The position of transitional cross-section 803 is such that it is closer to the inlet of the nozzle. The position of the transitional cross-section 804 is such that it is closer to the outlet of the nozzle. The function of the transitional cross-sectional area 803 is to provide a profile shape that can minimize stream cross-overs as the cross-sectional area reduces. It was discovered that as the cross-sectional profile changes from circular to square or rectangular, the surface of the flow pathway introduces a twist in the water streamlines. These twists can stay in the water stream as it exits the nozzle and create undesirable stream patterns. The challenge becomes more prominent as the ratio of the diameter of the inlet to the smallest dimension of the rectangle goes up. As an example, if the final cross-sectional profile is a rectangle with a dimension of 2" by 0.1" and the transitional area 804 is a square with sides 0.2"×0.2". Then going from a circle of diameter 1.5" to a square of sides 0.2" can introduce significant twist in water streamlines. This can impact the shape of the final geometry as it exits the nozzle. Based on detailed computational fluid dynamic simulations and experimental validations, it was discovered that to mitigate this challenge, another transitional cross-section 803 can be introduced. This transitional area 803 can be a square with sides 1"×1". The area of this 1"×1" square is less than the area of 1.5" inlet but more than the second transitional cross-section 0.2"×0.2". Going from a 1.5" circle to a square with side 1" does not introduce significant twist in the water streamlines. The second transition, that is from square with side 1" to square with side 0.2" is a square-to-square transition and does not introduce twisting in the water streamlines. Introducing an additional transitional cross-section allows improving the uniformity and shape of the exiting water stream. The above example is given to facilitate better understanding of the embodiment and is not necessarily to be construed as preferred or advantageous over other variations and embodiments.

The function of the transitional cross-section 804 include but are not limited to (a) reduce water streamline cross-overs to allow a more streamline water stream exiting from the nozzle; (b) reduce turbulence in the incoming water stream; and (c) allow suitable diverging and converging angles to the final exit cross-section.

In the present embodiment the cross-sectional area is extended to have a length shown by 811 in FIGS. 33 to 35. In our studies it was discovered that a sharp transition from converging to diverging profiles create turbulence in the water stream. The turbulence leads to back-pressure that can impact the range and geometry of the water stream. The straight section 710 allows fluid streamlines to have an efficient transition from the converging to diverging profile. This helps increase the range of the water stream. The length of the straight section can be between 0.02" to 2".

In this embodiment the nozzle inlet 801 can be directly attached to a hose or attached via use of a suitable adaptor or have another functional element between the hose and the nozzle like an on-off valve or a flow meter. The method of attachment should not impact the primary functionality of the nozzle. The key functionality is derived from the design of the nozzle and the nozzle can be scaled to fit hoses of various sizes, including but not limited to National Hose (NH) sizes ⅜", ½", ¾", 1", 1.5", 2" or 2.5"; or US garden hose sizes (½", ¾", ⅝" or 1").

The threads on the inlet section 801 can be male or female threads as per the requirement. The type of thread does not impact of limit the functionality of the nozzle. The exit 802 is designed such that as the water stream exits the nozzle, it forms a flat stream geometry. The velocity of the stream is a function of the cross-sectional area (CSA) of the nozzle exit, whereas the external surface area is a function of perimeter of the water stream exiting the nozzle. For any given geometric shape, a circle has the smaller ratio of perimeter to area. As compared to a circular geometry, a thin rectangle has significantly higher ratio of perimeter to area. This ratio of the CSA and perimeter for a rectangular geometry is a direct function of the ratio of the width of the rectangle and its height. Higher is the ratio of width and height of the rectangle, also known as the aspect ratio of the rectangle, higher would be the ratio of its perimeter and area.

For the nozzle 800, the width of the exiting water stream is determined by the width of the nozzle exit 805; the thickness of the water stream is determined by the height of the nozzle exit 806.

FIGS. 31 and 32 show the cross-sections of nozzle 800. The angle at which the water stream converges to the transitional cross-section 804 is shown by the angles 807 and 809. This angle can vary from 5 degrees to 60 degrees. The smaller angle of convergence prevents water streamlines from crossing over. The advantage of larger angle is that larger angle allows creating more compact geometries. The choice of convergence angle is a function of desired flow efficiency, manufacturing constraints and cost of the final product. In our optimization studies it was determined that the most suitable angles to optimize between flow and cost were between 10 degrees and 30 degrees. As the water stream flows from the transitional cross-section to the final area, the water stream converges in one direction and diverges in the other angle. The convergence helps increase the velocity of water stream. The divergence helps create diverging stream patterns as water stream exits the nozzle. The transition from the transitional cross-sectional area 804 to the final cross-sectional area 802 is defined by the divergence angle 808 from the transitional area 804 to the final area 802 and the convergence angle 810 from the transitional area 804 to the final area 802. The value of divergence angle 808 can vary from 0 degree to 60 degrees. The value of convergence angle 810 can vary from 0 degree to 60 degrees. The function of the divergence angle 808 is to create a water stream such that on exiting the nozzle, the stream has a diverging profile. The diverging profile of the water stream would allow continual increase in surface area of water stream and coverage. This increase in surface area of the water stream is critical for enhancing fire suppression rate. The function of convergence angle is to provide increase in velocity of the water stream by keeping same or reducing the cross-sectional area from the transitional cross-section 804 to the final exit area. The shape of the final cross-sectional area is such that the width is greater than the height. This elongated geometry allows creating water streams with high surface area. The elongated geometries can include, but are not limited to rectangles, rectangles with rounded edges and ellipses. All these geometries can be defined by their width and height. The width of the final cross-sectional area 805 and its height 806 dictate the final flow rate and geometric attributes of the water stream as it exits the nozzle. The width 805 can vary from 0.05" to 6" and height 806 can vary from 0.01" to 6". The net area as a function of 805 and 806 determines the final flow rate and that area can vary from the final cross-sectional area (CSA) determines the flow rate from the nozzle.

Some examples are provided for ease of understanding. For municipal fire-fighting a flow rate of 120-150 GPM is required, in that case an optimum CSA is between 0.5 inch$^2$ to 0.75 inch$^2$. In case of wildland fire-fighting a flow rate of 30 GPM-60 GPM is desired. In that case an optimum CSA is between 0.1 inch$^2$ to 0.3 inch$^2$. For garden hose application, in the US, typical flow is 3 GPM to 6 GPM. In that case an optimum CSA would be between 0.025 inch$^2$ to 0.05 inch$^2$. The above examples are given to facilitate better understanding of the embodiment and is not necessarily to be construed as preferred or advantageous over other variations and embodiments. In our various studies, it was determined that the final CSA does not impact the fundamental principles behind this invention. The dimensions scale down proportionally.

Figure 36:
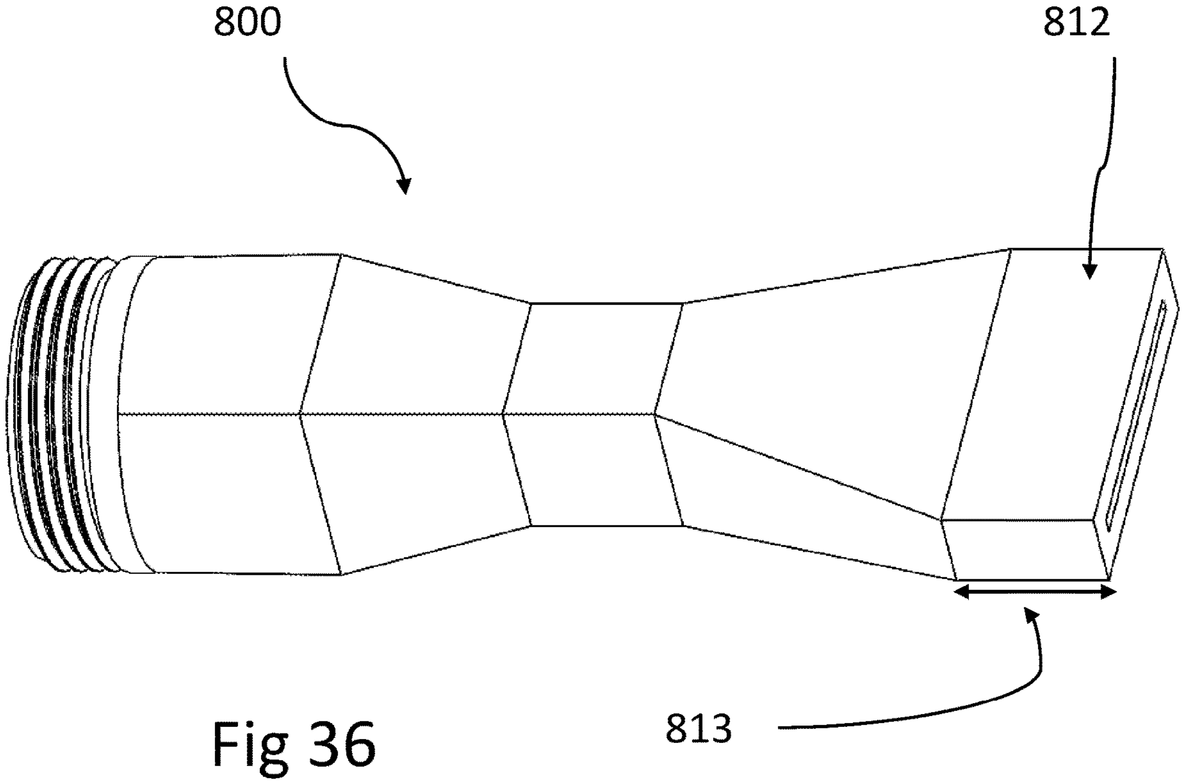
FIG. 36 is a perspective view of another embodiment of the high-efficiency nozzle of FIG. 30, wherein the nozzle has an extended transitional region that enables regulating fluid streamlines and minimizing turbulence, and the exit end of the nozzle has an extended straight profile that helps in regulating the divergence angle.

FIG. 36 provide illustrations of high efficiency nozzle 800, in accordance with another exemplary embodiment of the current invention. In this embodiment, the nozzle 800 is designed such that the incoming water stream converges to a first transitional cross-section 803 with profile P-1 and area A-1, and a second transitional cross-section 804 with profile P-2 and area A-2. This position of transitional cross-sections 803 and 804 is such that they lie in between the nozzle inlet and the nozzle exit. The position of transitional cross-section 803 is such that it is closer to the inlet of the nozzle. The position of the transitional cross-section 804 is such that it is closer to the outlet of the nozzle. The function of the transitional cross-sectional area 803 is to provide a profile shape that can minimize stream cross-overs as the cross-sectional area reduces. It was discovered that as the cross-sectional profile changes from circular to square or rectangular, the surface of the flow pathway introduces a twist in the water streamlines. These twists can stay in the water stream as it exits the nozzle and create undesirable stream patterns. The challenge becomes more prominent as the ratio of the diameter of the inlet to the smallest dimension of the rectangle goes up. As an example, if the final cross-sectional profile is a rectangle with a dimension of 2" by 0.1" and the transitional area 804 is a square with sides 0.2"×0.2". Then going from a circle of diameter 1.5" to a square of sides 0.2" can introduce significant twist in water streamlines. This can impact the shape of the final geometry as it exits the nozzle. Based on detailed computational fluid dynamic simulations and experimental validations, it was discovered that to mitigate this challenge, another transitional cross-section 803 can be introduced. This transitional area 803 can be a square with sides 1"×1". The area of this 1"×1" square is less than the area of 1.5" inlet but more than the second transitional cross-section 0.2"×0.2". Going from a 1.5" circle to a square with side 1" does not introduce significant twist in the water streamlines. The second transition, that is from square with side 1" to square with side 0.2" is a square-to-square transition and does not introduce twisting in the water streamlines. Introducing an additional transitional cross-section allows improving the uniformity and shape of the exiting water stream. The above example is given to facilitate better understanding of the embodiment and is not necessarily to be construed as preferred or advantageous over other variations and embodiments.

The function of the transitional cross-section 804 include but are not limited to (a) reduce water streamline cross-overs to allow a more streamline water stream exiting from the nozzle; (b) reduce turbulence in the incoming water stream; and (c) allow suitable diverging and converging angles to the final exit cross-section.

In this embodiment the nozzle inlet 801 can be directly attached to a hose or attached via use of a suitable adaptor or have another functional element between the hose and the nozzle like an on-off valve or a flow meter. The method of attachment should not impact the primary functionality of the nozzle. The key functionality is derived from the design of the nozzle and the nozzle can be scaled to fit hoses of various sizes, including but not limited to National Hose (NH) sizes ⅜", ½", ¾", 1", 1.5", 2" or 2.5"; or US garden hose sizes (½", ¾", ⅝" or 1").

The threads on the inlet section 801 can be male or female threads as per the requirement. The type of thread does not impact of limit the functionality of the nozzle. The exit 802 is designed such that as the water stream exits the nozzle, it forms a flat stream geometry. The velocity of the stream is a function of the cross-sectional area (CSA) of the nozzle exit, whereas the external surface area is a function of perimeter of the water stream exiting the nozzle. For any given geometric shape, a circle has the smaller ratio of perimeter to area. As compared to a circular geometry, a thin rectangle has significantly higher ratio of perimeter to area. This ratio of the CSA and perimeter for a rectangular geometry is a direct function of the ratio of the width of the rectangle and its height. Higher is the ratio of width and height of the rectangle, also known as the aspect ratio of the rectangle, higher would be the ratio of its perimeter and area.

For the nozzle 800, the width of the exiting water stream is determined by the width of the nozzle exit 805; the thickness of the water stream is determined by the height of the nozzle exit 806.

FIGS. 31 and 32 show the cross-sections of nozzle 800. The angle at which the water stream converges to the transitional cross-section 804 is shown by the angles 807 and 809. This angle can vary from 5 degrees to 60 degrees. The smaller angle of convergence prevents water streamlines from crossing over. The advantage of larger angle is that larger angle allows creating more compact geometries. The choice of convergence angle is a function of desired flow efficiency, manufacturing constraints and cost of the final product. In our optimization studies it was determined that the most suitable angles to optimize between flow and cost were between 10 degrees and 30 degrees. As the water stream flows from the transitional cross-section to the final area, the water stream converges in one direction and diverges in the other angle. The convergence helps increase the velocity of water stream. The divergence helps create diverging stream patterns as water stream exits the nozzle. The transition from the transitional cross-sectional area 804 to the final cross-sectional area 802 is defined by the divergence angle 808 from the transitional area 804 to the final area 802 and the convergence angle 810 from the transitional area 804 to the final area 802. The value of divergence angle 808 can vary from 0 degree to 60 degrees. The value of convergence angle 810 can vary from 0 degree to 60 degrees. The function of the divergence angle 808 is to create a water stream such that on exiting the nozzle, the stream has a diverging profile. The diverging profile of the water stream would allow continual increase in surface area of water stream and coverage. This increase in surface area of the water stream is critical for enhancing fire suppression rate. The function of convergence angle is to provide increase in velocity of the water stream by keeping same or reducing the cross-sectional area from the transitional cross-section 804 to the final exit area. The shape of the final cross-sectional area is such that the width is greater than the height. This elongated geometry allows creating water streams with high surface area. The elongated geometries can include, but are not limited to rectangles, rectangles with rounded edges and ellipses. All these geometries can be defined by their width and height. The width of the final cross-sectional area 805 and its height 806 dictate the final flow rate and geometric attributes of the water stream as it exits the nozzle. The width 805 can vary from 0.05" to 6" and height 806 can vary from 0.01" to 6". The net area as a function of 805 and 806 determines the final flow rate and that area can vary from the final cross-sectional area (CSA) determines the flow rate from the nozzle.

Some examples are provided for ease of understanding. For municipal fire-fighting a flow rate of 120-150 GPM is required, in that case an optimum CSA is between 0.5 $inch^2$ to 0.75 $inch^2$. In case of wildland fire-fighting a flow rate of 30 GPM-60 GPM is desired. In that case an optimum CSA is between 0.1 $inch^2$ to 0.3 $inch^2$. For garden hose application, in the US, typical flow is 3 GPM to 6 GPM. In that case an optimum CSA would be between 0.025 $inch^2$ to 0.05 $inch^2$. The above examples are given to facilitate better understanding of the embodiment and is not necessarily to be construed as preferred or advantageous over other variations and embodiments. In our various studies, it was determined that the final CSA does not impact the fundamental principles behind this invention. The dimensions scale down proportionally.

With reference to the figures, FIGS. 33-35, another exemplary embodiment of nozzle 800 is provided. In this embodiment, the nozzle 800 is designed such that the incoming water stream converges to a first transitional cross-section 803 with profile P-1 and area A-1, and a second transitional cross-section 804 with profile P-2 and area A-2. This position of transitional cross-sections 803 and 804 is such that they lie in between the nozzle inlet and the nozzle exit. The position of transitional cross-section 803 is such that it is closer to the inlet of the nozzle. The position of the transitional cross-section 804 is such that it is closer to the outlet of the nozzle. The function of the transitional cross-sectional area 803 is to provide a profile shape that can minimize stream cross-overs as the cross-sectional area reduces. It was discovered that as the cross-sectional profile changes from circular to square or rectangular, the surface of the flow pathway introduces a twist in the water streamlines. These twists can stay in the water stream as it exits the nozzle and create undesirable stream patterns. The challenge becomes more prominent as the ratio of the diameter of the inlet to the smallest dimension of the rectangle goes up. As an example, if the final cross-sectional profile is a rectangle with a dimension of 2" by 0.1" and the transitional area 804 is a square with sides 0.2"×0.2". Then going from a circle of diameter 1.5" to a square of sides 0.2" can introduce significant twist in water streamlines. This can impact the shape of the final geometry as it exits the nozzle. Based on detailed computational fluid dynamic simulations and experimental validations, it was discovered that to mitigate this challenge, another transitional cross-section 803 can be introduced. This transitional area 803 can be a square with sides 1"×1". The area of this 1"×1" square is less than the area of 1.5" inlet but more than the second transitional cross-section 0.2"×0.2". Going from a 1.5" circle to a square with side 1" does not introduce significant twist in the water streamlines. The second transition, that is from square with side 1" to square with side 0.2" is a square-to-square transition and does not introduce twisting in the water streamlines. Introducing an additional transitional cross-section allows improving the uniformity and shape of the exiting water stream. The above example is given to facilitate better understanding of the embodiment and is not necessarily to be construed as preferred or advantageous over other variations and embodiments.

The function of the transitional cross-section 804 include but are not limited to (a) reduce water streamline cross-overs to allow a more streamline water stream exiting from the nozzle; (b) reduce turbulence in the incoming water stream; and (c) allow suitable diverging and converging angles to the final exit cross-section.

In the present embodiment the cross-sectional area is extended to have a length shown by 811 in FIGS. 33 to 35. In our studies it was discovered that a sharp transition from converging to diverging profiles create turbulence in the water stream. The turbulence leads to back-pressure that can impact the range and geometry of the water stream. The straight section 811 allows fluid streamlines to have an efficient transition from the converging to diverging profile. This helps increase the range of the water stream. The length of the straight section can be between 0.02" to 2". FIGS. 34 and 35 show the cross-section of the nozzle 800 with respect to the present embodiment.

In this embodiment the nozzle inlet 801 can be directly attached to a hose or attached via use of a suitable adaptor or have another functional element between the hose and the nozzle like an on-off valve or a flow meter. The method of attachment should not impact the primary functionality of the nozzle. The key functionality is derived from the design of the nozzle and the nozzle can be scaled to fit hoses of various sizes, including but not limited to National Hose (NH) sizes ⅜", ½", ¾", 1", 1.5", 2" or 2.5"; or US garden hose sizes (½", ¾", ⅝" or 1").

The threads on the inlet section 801 can be male or female threads as per the requirement. The type of thread does not impact of limit the functionality of the nozzle. The exit 802 is designed such that as the water stream exits the nozzle, it forms a flat stream geometry. The velocity of the stream is a function of the cross-sectional area (CSA) of the nozzle exit, whereas the external surface area is a function of perimeter of the water stream exiting the nozzle. For any given geometric shape, a circle has the smaller ratio of perimeter to area. As compared to a circular geometry, a thin rectangle has significantly higher ratio of perimeter to area. This ratio of the CSA and perimeter for a rectangular geometry is a direct function of the ratio of the width of the rectangle and its height. Higher is the ratio of width and height of the rectangle, also known as the aspect ratio of the rectangle, higher would be the ratio of its perimeter and area.

For the nozzle 800, the width of the exiting water stream is determined by the width of the nozzle exit 805; the thickness of the water stream is determined by the height of the nozzle exit 806.

FIGS. 31 and 32 show the cross-sections of nozzle 800. The angle at which the water stream converges to the transitional cross-section 804 is shown by the angles 807 and 809. This angle can vary from 5 degrees to 60 degrees. The smaller angle of convergence prevents water streamlines from crossing over. The advantage of larger angle is that larger angle allows creating more compact geometries. The choice of convergence angle is a function of desired flow efficiency, manufacturing constraints and cost of the final product. In our optimization studies it was determined that the most suitable angles to optimize between flow and cost were between 10 degrees and 30 degrees. As the water stream flows from the transitional cross-section to the final area, the water stream converges in one direction and diverges in the other angle. The convergence helps increase the velocity of water stream. The divergence helps create diverging stream patterns as water stream exits the nozzle. The transition from the transitional cross-sectional area 804 to the final cross-sectional area 802 is defined by the divergence angle 808 from the transitional area 804 to the final area 802 and the convergence angle 810 from the transitional area 804 to the final area 802. The value of divergence angle 808 can vary from 0 degree to 60 degrees. The value of convergence angle 810 can vary from 0 degree to 60 degrees. The function of the divergence angle 808 is to create a water stream such that on exiting the nozzle, the stream has a diverging profile. The diverging profile of the water stream would allow continual increase in surface area of water stream and coverage. This increase in surface area of the water stream is critical for enhancing fire suppression rate. The function of convergence angle is to provide increase in velocity of the water stream by keeping same or reducing the cross-sectional area from the transitional cross-section 804 to the final exit area. The shape of the final cross-sectional area is such that the width is greater than the height. This elongated geometry allows creating water streams with high surface area. The elongated geometries can include, but are not limited to rectangles, rectangles with rounded edges and ellipses. All these geometries can be defined by their width and height. The width of the final cross-sectional area 805 and its height 806 dictate the final flow rate and geometric attributes of the water stream as it exits the nozzle. The width 805 can vary from 0.05" to 6" and height 806 can vary from 0.01" to 6". The net area as a function of 805 and 806 determines the final flow rate and that area can vary from the final cross-sectional area (CSA) determines the flow rate from the nozzle.

Some examples are provided for ease of understanding. For municipal fire-fighting a flow rate of 120-150 GPM is required, in that case an optimum CSA is between 0.5 $inch^2$ to 0.75 $inch^2$. In case of wildland fire-fighting a flow rate of 30 GPM-60 GPM is desired. In that case an optimum CSA is between 0.1 $inch^2$ to 0.3 $inch^2$. For garden hose application, in the US, typical flow is 3 GPM to 6 GPM. In that case an optimum CSA would be between 0.025 $inch^2$ to 0.05 $inch^2$. The above examples are given to facilitate better understanding of the embodiment and is not necessarily to be construed as preferred or advantageous over other variations and embodiments. In our various studies, it was determined that the final CSA does not impact the fundamental principles behind this invention. The dimensions scale down proportionally.

With respect to FIG. 36 another exemplary embodiment of nozzle 800 is provided. In this embodiment, the nozzle 800 is designed such that the incoming water stream converges to a first transitional cross-section 803 with profile P-1 and area A-1, and a second transitional cross-section 804 with profile P-2 and area A-2. This position of transitional cross-sections 803 and 804 is such that they lie in between the nozzle inlet and the nozzle exit. The position of transitional cross-section 803 is such that it is closer to the inlet of the nozzle. The position of the transitional cross-section 804 is such that it is closer to the outlet of the nozzle. The function of the transitional cross-sectional area 803 is to provide a profile shape that can minimize stream cross-overs as the cross-sectional area reduces. It was discovered that as the cross-sectional profile changes from circular to square or rectangular, the surface of the flow pathway introduces a twist in the water streamlines. These twists can stay in the water stream as it exits the nozzle and create undesirable stream patterns. The challenge becomes more prominent as the ratio of the diameter of the inlet to the smallest dimension of the rectangle goes up. As an example, if the final cross-sectional profile is a rectangle with a dimension of 2" by 0.1" and the transitional area 804 is a square with sides 0.2"×0.2". Then going from a circle of diameter 1.5" to a square of sides 0.2" can introduce significant twist in water streamlines. This can impact the shape of the final geometry as it exits the nozzle. Based on detailed computational fluid dynamic simulations and experimental validations, it was discovered that to mitigate this challenge, another transitional cross-section 803 can be introduced. This transitional area 803 can be a square with sides 1"×1". The area of this 1"×1" square is less than the area of 1.5" inlet but more than the second transitional cross-section 0.2"×0.2". Going from a 1.5" circle to a square with side 1" does not introduce significant twist in the water streamlines. The second transition, that is from square with side 1" to square with side 0.2" is a square-to-square transition and does not introduce twisting in the water streamlines. Introducing an additional transitional cross-section allows improving the uniformity and shape of the exiting water stream. The above example is given to facilitate better understanding of the embodiment and is not necessarily to be construed as preferred or advantageous over other variations and embodiments.

The function of the transitional cross-section 804 include but are not limited to (a) reduce water streamline cross-overs to allow a more streamline water stream exiting from the nozzle; (b) reduce turbulence in the incoming water stream; and (c) allow suitable diverging and converging angles to the final exit cross-section.

In the present embodiment the cross-sectional area is extended to have a length shown by 811 in FIGS. 33 to 35. In our studies it was discovered that a sharp transition from converging to diverging profiles create turbulence in the water stream. The turbulence leads to back-pressure that can impact the range and geometry of the water stream. The straight section 811 allows fluid streamlines to have an efficient transition from the converging to diverging profile. This helps increase the range of the water stream. The length of the straight section can be between 0.02" to 2". FIGS. 34 and 35 show the cross-section of the nozzle 800 with respect to the present embodiment.

In this embodiment the nozzle inlet 801 can be directly attached to a hose or attached via use of a suitable adaptor or have another functional element between the hose and the nozzle like an on-off valve or a flow meter. The method of attachment should not impact the primary functionality of the nozzle. The key functionality is derived from the design of the nozzle and the nozzle can be scaled to fit hoses of various sizes, including but not limited to National Hose (NH) sizes ⅜", ½", ¾", 1", 1.5", 2" or 2.5"; or US garden hose sizes (½", ¾", ⅝" or 1").

The threads on the inlet section 801 can be male or female threads as per the requirement. The type of thread does not impact of limit the functionality of the nozzle. The exit 802 is designed such that as the water stream exits the nozzle, it forms a flat stream geometry. The velocity of the stream is a function of the cross-sectional area (CSA) of the nozzle exit, whereas the external surface area is a function of perimeter of the water stream exiting the nozzle. For any given geometric shape, a circle has the smaller ratio of perimeter to area. As compared to a circular geometry, a thin rectangle has significantly higher ratio of perimeter to area. This ratio of the CSA and perimeter for a rectangular geometry is a direct function of the ratio of the width of the rectangle and its height. Higher is the ratio of width and height of the rectangle, also known as the aspect ratio of the rectangle, higher would be the ratio of its perimeter and area.

For the nozzle 800, the width of the exiting water stream is determined by the width of the nozzle exit 805; the thickness of the water stream is determined by the height of the nozzle exit 806.

FIGS. 31 and 32 show the cross-sections of nozzle 800. The angle at which the water stream converges to the transitional cross-section 804 is shown by the angles 807 and 809. This angle can vary from 5 degrees to 60 degrees. The smaller angle of convergence prevents water streamlines from crossing over. The advantage of larger angle is that larger angle allows creating more compact geometries. The choice of convergence angle is a function of desired flow efficiency, manufacturing constraints and cost of the final product. In our optimization studies it was determined that the most suitable angles to optimize between flow and cost were between 10 degrees and 30 degrees. As the water stream flows from the transitional cross-section to the final area, the water stream converges in one direction and diverges in the other angle. The convergence helps increase the velocity of water stream. The divergence helps create diverging stream patterns as water stream exits the nozzle. The transition from the transitional cross-sectional area 804 to the final cross-sectional area 802 is defined by the divergence angle 808 from the transitional area 804 to the final area 802 and the convergence angle 810 from the transitional area 804 to the final area 802. The value of divergence angle 808 can vary from 0 degree to 60 degrees. The value of convergence angle 810 can vary from 0 degree to 60 degrees. The function of the divergence angle 808 is to create a water stream such that on exiting the nozzle, the stream has a diverging profile. The diverging profile of the water stream would allow continual increase in surface area of water stream and coverage. This increase in surface area of the water stream is critical for enhancing fire suppression rate. The function of convergence angle is to provide increase in velocity of the water stream by keeping same or reducing the cross-sectional area from the transitional cross-section 804 to the final exit area. The shape of the final cross-sectional area is such that the width is greater than the height. This elongated geometry allows creating water streams with high surface area. The elongated geometries can include, but are not limited to rectangles, rectangles with rounded edges and ellipses. All these geometries can be defined by their width and height. The width of the final cross-sectional area 805 and its height 806 dictate the final flow rate and geometric attributes of the water stream as it exits the nozzle. The width 805 can vary from 0.05" to 6" and height 806 can vary from 0.01" to 6". The net area as a function of 805 and 806 determines the final flow rate and that area can vary from the final cross-sectional area (CSA) determines the flow rate from the nozzle.

Some examples are provided for ease of understanding. For municipal fire-fighting a flow rate of 120-150 GPM is required, in that case an optimum CSA is between 0.5 $inch^2$ to 0.75 $inch^2$. In case of wildland fire-fighting a flow rate of 30 GPM-60 GPM is desired. In that case an optimum CSA is between 0.1 $inch^2$ to 0.3 $inch^2$. For garden hose application, in the US, typical flow is 3 GPM to 6 GPM. In that case an optimum CSA would be between 0.025 $inch^2$ to 0.05 $inch^2$. The above examples are given to facilitate better understanding of the embodiment and is not necessarily to be construed as preferred or advantageous over other variations and embodiments. In our various studies, it was determined that the final CSA does not impact the fundamental principles behind this invention. The dimensions scale down proportionally.

The final cross-sectional area may have an extended pathway shown by 812 in FIG. 36. The elongated pathway allows better control of the diverging stream. It was determined via detailed experimentation that for design of manufacturing, to be able to get consistent diverging pattern can be challenging. Even a small change in the diverging angle 808 can have huge impact on the final geometry of the water stream. The straight section 812 allows that the nozzles have less variations. This is critical for manufacturing in high volumes to achieve high consistency. The length 813 of the straight section 812 can vary from 0 inch to 4 inches.

Figure 37:
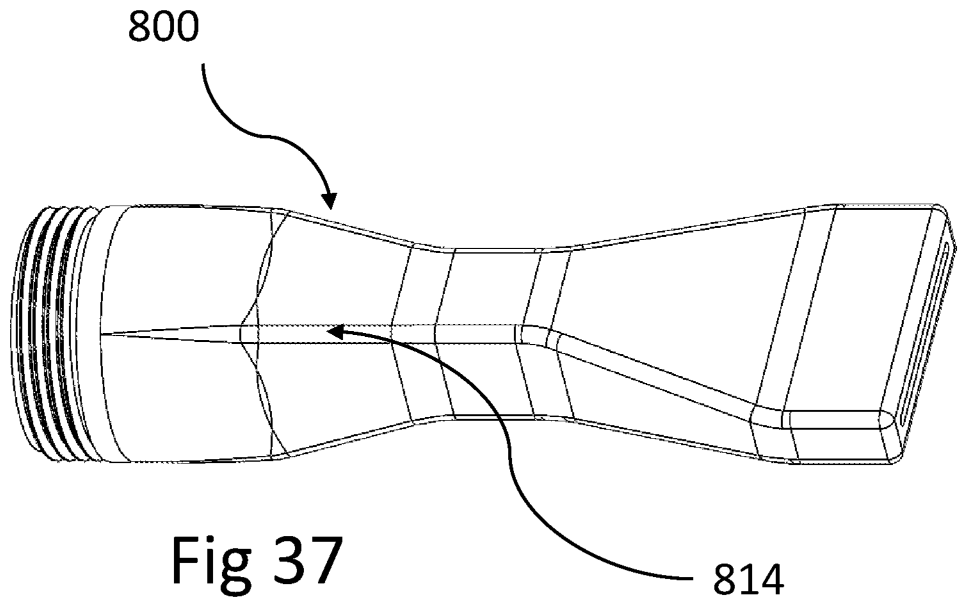
FIG. 37 is a perspective view of another embodiment of the high-efficiency nozzle of FIG. 36, wherein the nozzle has external and internal filets for ease of manufacturing and reducing turbulence associated with sharp corners.
Figure 38:
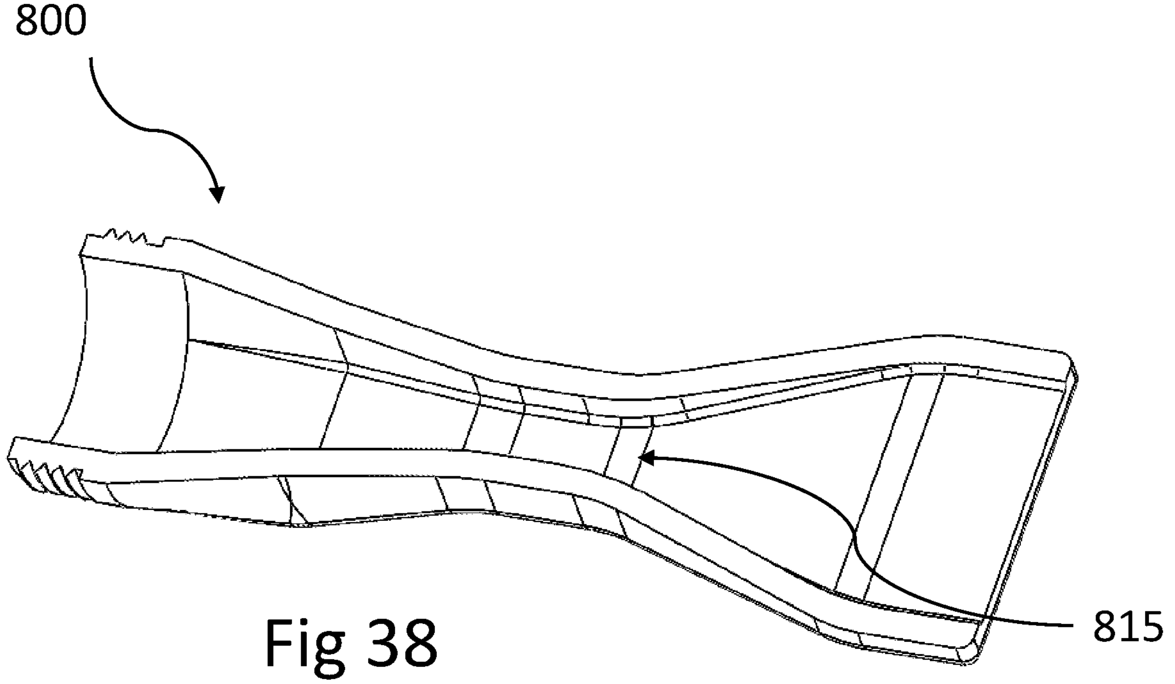
FIG. 38 is a perspective cutaway view of the nozzle of FIG. 37. The cross-section shows internal filets formed for ease of manufacturing and reducing turbulence associated with sharp corners.

With respect to FIGS. 37-38 another exemplary embodiment of nozzle 800 is provided. In this embodiment, the nozzle 800 is designed such that the incoming water stream converges to a first transitional cross-section 803 with profile P-1 and area A-1, and a second transitional cross-section 804 with profile P-2 and area A-2. This position of transitional cross-sections 803 and 804 is such that they lie in between the nozzle inlet and the nozzle exit. The position of transitional cross-section 803 is such that it is closer to the inlet of the nozzle. The position of the transitional cross-section 804 is such that it is closer to the outlet of the nozzle. The function of the transitional cross-sectional area 803 is to provide a profile shape that can minimize stream cross-overs as the cross-sectional area reduces. It was discovered that as the cross-sectional profile changes from circular to square or rectangular, the surface of the flow pathway introduces a twist in the water streamlines. These twists can stay in the water stream as it exits the nozzle and create undesirable stream patterns. The challenge becomes more prominent as the ratio of the diameter of the inlet to the smallest dimension of the rectangle goes up. As an example, if the final cross-sectional profile is a rectangle with a dimension of 2" by 0.1" and the transitional area 804 is a square with sides 0.2"×0.2". Then going from a circle of diameter 1.5" to a square of sides 0.2" can introduce significant twist in water streamlines. This can impact the shape of the final geometry as it exits the nozzle. Based on detailed computational fluid dynamic simulations and experimental validations, it was discovered that to mitigate this challenge, another transitional cross-section 803 can be introduced. This transitional area 803 can be a square with sides 1"×1". The area of this 1"×1" square is less than the area of 1.5" inlet but more than the second transitional cross-section 0.2"×0.2". Going from a 1.5" circle to a square with side 1" does not introduce significant twist in the water streamlines. The second transition, that is from square with side 1" to square with side 0.2" is a square-to-square transition and does not introduce twisting in the water streamlines. Introducing an additional transitional cross-section allows improving the uniformity and shape of the exiting water stream. The above example is given to facilitate better understanding of the embodiment and is not necessarily to be construed as preferred or advantageous over other variations and embodiments.

The function of the transitional cross-section 804 include but are not limited to (a) reduce water streamline cross-overs to allow a more streamline water stream exiting from the nozzle; (b) reduce turbulence in the incoming water stream; and (c) allow suitable diverging and converging angles to the final exit cross-section.

In the present embodiment the cross-sectional area is extended to have a length shown by 811 in FIGS. 33 to 35. In our studies it was discovered that a sharp transition from converging to diverging profiles create turbulence in the water stream. The turbulence leads to back-pressure that can impact the range and geometry of the water stream. The straight section 811 allows fluid streamlines to have an efficient transition from the converging to diverging profile. This helps increase the range of the water stream. The length of the straight section can be between 0.02" to 2". FIGS. 34 and 35 show the cross-section of the nozzle 800 with respect to the present embodiment.

In this embodiment the nozzle inlet 801 can be directly attached to a hose or attached via use of a suitable adaptor or have another functional element between the hose and the nozzle like an on-off valve or a flow meter. The method of attachment should not impact the primary functionality of the nozzle. The key functionality is derived from the design of the nozzle and the nozzle can be scaled to fit hoses of various sizes, including but not limited to National Hose (NH) sizes ⅜", ½", ¾", 1", 1.5", 2" or 2.5"; or US garden hose sizes (½", ¾", ⅝" or 1").

The threads on the inlet section 801 can be male or female threads as per the requirement. The type of thread does not impact of limit the functionality of the nozzle. The exit 802 is designed such that as the water stream exits the nozzle, it forms a flat stream geometry. The velocity of the stream is a function of the cross-sectional area (CSA) of the nozzle exit, whereas the external surface area is a function of perimeter of the water stream exiting the nozzle. For any given geometric shape, a circle has the smaller ratio of perimeter to area. As compared to a circular geometry, a thin rectangle has significantly higher ratio of perimeter to area. This ratio of the CSA and perimeter for a rectangular geometry is a direct function of the ratio of the width of the rectangle and its height. Higher is the ratio of width and height of the rectangle, also known as the aspect ratio of the rectangle, higher would be the ratio of its perimeter and area.

For the nozzle 800, the width of the exiting water stream is determined by the width of the nozzle exit 805; the thickness of the water stream is determined by the height of the nozzle exit 806.

FIGS. 31 and 32 show the cross-sections of nozzle 800. The angle at which the water stream converges to the transitional cross-section 804 is shown by the angles 807 and 809. This angle can vary from 5 degrees to 60 degrees. The smaller angle of convergence prevents water streamlines from crossing over. The advantage of larger angle is that larger angle allows creating more compact geometries. The choice of convergence angle is a function of desired flow efficiency, manufacturing constraints and cost of the final product. In our optimization studies it was determined that the most suitable angles to optimize between flow and cost were between 10 degrees and 30 degrees. As the water stream flows from the transitional cross-section to the final area, the water stream converges in one direction and diverges in the other angle. The convergence helps increase the velocity of water stream. The divergence helps create diverging stream patterns as water stream exits the nozzle. The transition from the transitional cross-sectional area 804 to the final cross-sectional area 802 is defined by the divergence angle 808 from the transitional area 804 to the final area 802 and the convergence angle 810 from the transitional area 804 to the final area 802. The value of divergence angle 808 can vary from 0 degree to 60 degrees. The value of convergence angle 810 can vary from 0 degree to 60 degrees. The function of the divergence angle 808 is to create a water stream such that on exiting the nozzle, the stream has a diverging profile. The diverging profile of the water stream would allow continual increase in surface area of water stream and coverage. This increase in surface area of the water stream is critical for enhancing fire suppression rate. The function of convergence angle is to provide increase in velocity of the water stream by keeping same or reducing the cross-sectional area from the transitional cross-section 804 to the final exit area. The shape of the final cross-sectional area is such that the width is greater than the height. This elongated geometry allows creating water streams with high surface area. The elongated geometries can include, but are not limited to rectangles, rectangles with rounded edges and ellipses. All these geometries can be defined by their width and height. The width of the final cross-sectional area 805 and its height 806 dictate the final flow rate and geometric attributes of the water stream as it exits the nozzle. The width 805 can vary from 0.05" to 6" and height 806 can vary from 0.01" to 6". The net area as a function of 805 and 806 determines the final flow rate and that area can vary from the final cross-sectional area (CSA) determines the flow rate from the nozzle.

Some examples are provided for ease of understanding. For municipal fire-fighting a flow rate of 120-150 GPM is required, in that case an optimum CSA is between 0.5 $inch^2$ to 0.75 $inch^2$. In case of wildland fire-fighting a flow rate of 30 GPM-60 GPM is desired. In that case an optimum CSA is between 0.1 $inch^2$ to 0.3 $inch^2$. For garden hose application, in the US, typical flow is 3 GPM to 6 GPM. In that case an optimum CSA would be between 0.025 $inch^2$ to 0.05 $inch^2$. The above examples are given to facilitate better understanding of the embodiment and is not necessarily to be construed as preferred or advantageous over other variations and embodiments. In our various studies, it was determined that the final CSA does not impact the fundamental principles behind this invention. The dimensions scale down proportionally.

The final cross-sectional area may have an extended pathway shown by 812 in FIG. 36. The elongated pathway allows better control of the diverging stream. It was determined via detailed experimentation that for design of manufacturing, to be able to get consistent diverging pattern can be challenging. Even a small change in the diverging angle 808 can have huge impact on the final geometry of the water stream. The straight section 812 allows that the nozzles have less variations. This is critical for manufacturing in high volumes to achieve high consistency. The length 813 of the straight section 812 can vary from 0 inch to 4 inches.

In the present embodiment the internal and external edges may have filets for ease of the manufacturing processes. The filets are created for: (1) Manufacturing processes. It is not feasible to create completely squared edges and the cost of manufacturing to create such edges can be extremely high. Filets on the internal pathway allow reducing the manufacturing cost and do not impact the flow of the fluid through the nozzle pathway. (2) Reducing sharp edges: The exterior filets help create softer edges on the exterior of the nozzle. Sharp edges are not desirable on the exterior of the nozzle for safety of the nozzle operator. (3) Increasing robustness: Sharp edges have higher pressure concentration and may lead to formation of cracks and damage under stress. Filets help distribution of stresses over larger areas and reduce damage to the nozzle. The exterior filets are shown by 814 and interior filets are shown by 815.

Figure 39:
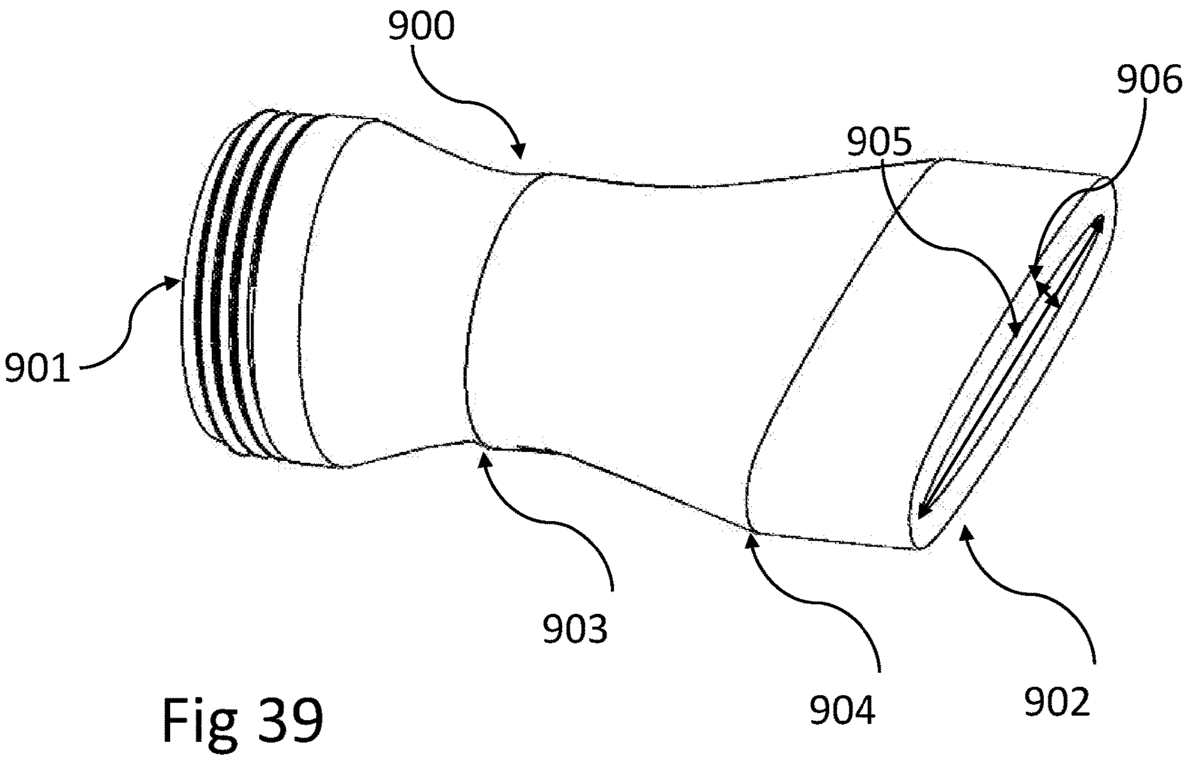
FIG. 39 is a perspective view of a high-efficiency nozzle in accordance with an exemplary embodiment of the present invention wherein the exiting profile is elliptical.
Figure 40:
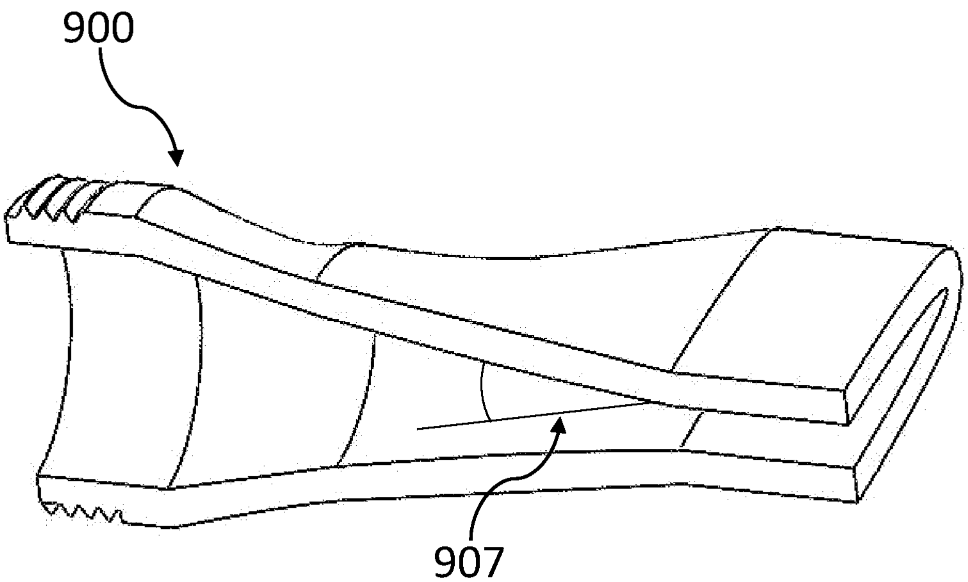
FIGS. 40-41 are perspective cutaway views of the nozzle of FIG. 39. The cross-section shows internal geometric parameters that enable formation of water stream with desirable profile.
Figure 41:
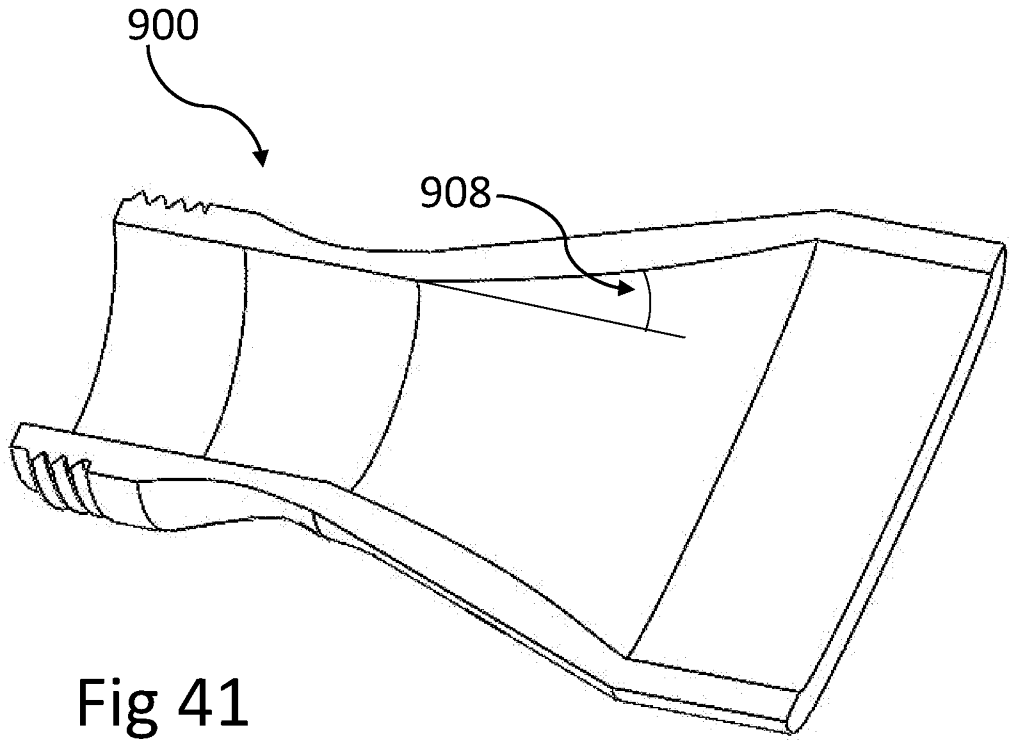

With respect to FIGS. 39-41 another exemplary embodiment of nozzle 800 is provided. In this embodiment, the nozzle 900 is designed such that the incoming water stream converges to a first transitional cross-section 903 with profile P and area A. This position of transitional cross-sections 903 is such that it lies in between the nozzle inlet and the nozzle exit. The profile of the transitional cross-sectional area 903 is elliptical.

The function of the transitional cross-section 903 include but are not limited to (a) reduce water streamline cross-overs to allow a more streamline water stream exiting from the nozzle; (b) reduce turbulence in the incoming water stream; and (c) allow suitable diverging and converging angles to the final exit cross-section.

The cross-sectional area may be extended to allow fluid streamlines to have an efficient transition from the converging to diverging profile. This helps increase the range of the water stream. The length of the straight section can be between 0.02" to 2".

In this embodiment the nozzle inlet 901 can be directly attached to a hose or attached via use of a suitable adaptor or have another functional element between the hose and the nozzle like an on-off valve or a flow meter. The method of attachment should not impact the primary functionality of the nozzle. The key functionality is derived from the design of the nozzle and the nozzle can be scaled to fit hoses of various sizes, including but not limited to National Hose (NH) sizes ⅜", ½", ¾", 1", 1.5", 2" or 2.5"; or US garden hose sizes (½", ¾", ⅝" or 1").

The threads on the inlet section 801 can be male or female threads as per the requirement. The type of thread does not impact of limit the functionality of the nozzle. The exit 802 is designed such that as the water stream exits the nozzle, it forms a flat stream geometry. The velocity of the stream is a function of the cross-sectional area (CSA) of the nozzle exit, whereas the external surface area is a function of perimeter of the water stream exiting the nozzle. For any given geometric shape, a circle has the smaller ratio of perimeter to area. As compared to a circular geometry, an extended ellipse has significantly higher ratio of perimeter to area. This ratio of the CSA and perimeter for an elliptical geometry is a direct function of the ratio of the width of the major and the minor axis of the ellipse. Higher is the ratio of major and minor axis of the ellipse, also known as the aspect ratio of the ellipse, higher would be the ratio of its perimeter and area.

For the nozzle 900, the width of the exiting water stream is determined by the width of the nozzle exit 905; the thickness of the water stream is determined by the height of the nozzle exit 906.

FIGS. 40 and 41 show the cross-sections of nozzle 900. The angle at which the water stream converges is shown by the angles 907. This angle can vary from 5 degrees to 60 degrees. The smaller angle of convergence prevents water streamlines from crossing over. The advantage of larger angle is that larger angle allows creating more compact geometries. The choice of convergence angle is a function of desired flow efficiency, manufacturing constraints and cost of the final product. In our optimization studies it was determined that the most suitable angles to optimize between flow and cost were between 10 degrees and 30 degrees. As the water stream flows from the transitional cross-section to the final area, the water stream converges in one direction and diverges in the other angle. The convergence helps increase the velocity of water stream. The divergence helps create diverging stream patterns as water stream exits the nozzle. The transition from the transitional cross-sectional area to the final cross-sectional area is defined by the divergence angle 908. The value of divergence angle 908 can vary from 0 degree to 60 degrees. The function of the divergence angle 908 is to create a water stream such that on exiting the nozzle, the stream has a diverging profile. The diverging profile of the water stream would allow continual increase in surface area of water stream and coverage. This increase in surface area of the water stream is critical for enhancing fire suppression rate. The function of convergence angle is to provide increase in velocity of the water stream by keeping same or reducing the cross-sectional area. The shape of the final cross-sectional area is such that the width is greater than the height. This elongated geometry allows creating water streams with high surface area. The width of the final cross-sectional area 905 and its height 906 dictate the final flow rate and geometric attributes of the water stream as it exits the nozzle. The width 905 can vary from 0.05" to 6" and height 906 can vary from 0.01" to 6". The final cross-sectional area (CSA) determines the flow rate from the nozzle.

Some examples are provided for ease of understanding. For municipal fire-fighting a flow rate of 120-150 GPM is required, in that case an optimum CSA is between 0.5 inch$^2$ to 0.75 inch$^2$. In case of wildland fire-fighting a flow rate of 30 GPM-60 GPM is desired. In that case an optimum CSA is between 0.1 inch$^2$ to 0.3 inch$^2$. For garden hose application, in the US, typical flow is 3 GPM to 6 GPM. In that case an optimum CSA would be between 0.025 inch$^2$ to 0.05 inch$^2$. The above examples are given to facilitate better understanding of the embodiment and is not necessarily to be construed as preferred or advantageous over other variations and embodiments. In our various studies, it was determined that the final CSA does not impact the fundamental principles behind this invention. The dimensions scale down proportionally.

The final cross-sectional area may have an extended pathway. The elongated pathway allows better control of the diverging stream. It was determined via detailed experimentation that for design of manufacturing, to be able to get consistent diverging pattern can be challenging. Even a small change in the diverging angle 908 can have huge impact on the final geometry of the water stream. The straight section allows that the nozzles have less variations. This is critical for manufacturing in high volumes to achieve high consistency. The length of the straight section 812 can vary from 0 inch to 4 inches.

The internal and external edges may have filets for ease of the manufacturing processes. The filets are created for: (1) Manufacturing processes. It is not feasible to create completely squared edges and the cost of manufacturing to create such edges can be extremely high. Filets on the internal pathway allow reducing the manufacturing cost and do not impact the flow of the fluid through the nozzle pathway. (2) Reducing sharp edges: The exterior filets help create softer edges on the exterior of the nozzle. Sharp edges are not desirable on the exterior of the nozzle for safety of the nozzle operator. (3) Increasing robustness: Sharp edges have higher pressure concentration and may lead to formation of cracks and damage under stress. Filets help distribution of stresses over larger areas and reduce damage to the nozzle.

In all the above embodiments the threads can have suitable size as per requirements, for example the threads could be male or female threads with sizes including but not limited to 0.75" NST, 1" 1.5" NST, 2.5" NST. The threads could also be based on systems including but not limited to NPT, NPSH or similar threads. The functionality of the system is independent of the size and similar systems can be employed for various sizes. These nozzle design can a variety of add-ons, including but not limited to a grip or a handle and an on-off valve.

The wall thickness of the nozzle can vary depending on the pressure rating and type of material used and does not impact the functionality of the various exemplary embodiments listed in the present invention. The nozzle can be manufactured using a variety of materials including but not limited to metals like aluminum and brass or with high strength polymers and various composite materials. The nozzles can be manufactured via multiple techniques, including but not limited to casting, injection molding, 3D printing or CNC machining. The various embodiments can also be manufactured as a single component or it can be manufactured as multiple components that are attached together using a suitable attaching methodology, including but not limited to threads, screws, adhesives, welding, and suitable fasteners. As such the choice of manufacturing technique does not impact the functionality of the nozzles as described in various exemplary embodiments in the present disclosure.

One example of a suitable metal alloy for high efficiency nozzles is Aluminum alloy 356. If 3D printed, the nozzle can be 3D printed using polymers including but not limited to ABS and PLA.

Thus, it is appreciated that the optimum dimensional relationships for the parts of the invention, to include variation in size, materials, shape, form, function, and manner of operation, assembly, and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A nozzle comprising:

a nozzle body including a flow pathway therein through which fluid is configured to flow in a flow direction, the flow pathway having:

a first flow pathway section that converges with regard to cross sectional area along the flow direction, wherein the first flow pathway section converges with regard to cross sectional area along the flow direction along an entire length thereof; and a second flow pathway section in fluid communication with the first flow pathway section, wherein the second flow pathway section converges along the flow direction at an angle greater than 0 degrees and less than or equal to 60 degrees along the flow direction with respect to a first direction and simultaneously diverges along the flow direction at an angle greater than 0 degrees and less than or equal to 60 degrees along the flow direction with respect to a second direction that is different than the first direction, wherein the second flow pathway section overall has a decreasing cross sectional area along the flow direction, wherein the second flow pathway section has a rectangular or generally rectangular cross section along its entire length, and wherein an outlet of the first flow pathway section has the same cross sectional shape as an inlet of the second flow pathway.

2. The nozzle of claim 1 wherein the first flow pathway section includes or is fluidly coupled to a nozzle inlet configured to be directly coupled to a hose, and wherein the second flow pathway section includes or is fluidly coupled to a nozzle exit such that fluid is configured to flow from the first flow pathway section to the second flow pathway section and then exit the nozzle.

3. The nozzle of claim 1 wherein the second flow pathway section converges along the flow direction with respect to the first direction along an entirety of a length of the second flow pathway section, and simultaneously diverges along the flow direction with respect to the second direction along an entirety of the length of the second flow pathway section.

4. The nozzle of claim 1 wherein the first direction is perpendicular to the second direction.

5. The nozzle of claim 1 wherein the second flow pathway section converges linearly along the flow direction with respect to the first direction and diverges linearly along the flow direction with respect to the second direction.

6. The nozzle of claim 1 wherein the flow pathway further includes a transition section positioned between the first flow pathway section and the second flow pathway section, wherein the transition section has a generally constant cross section along the flow direction for a length of the nozzle.

7. The nozzle of claim 1 wherein an outlet of the second flow pathway section has an outer perimeter, and wherein an entire inner cross sectional area defined by the outer perimeter of the second flow path is open and unobstructed to allow fluid to flow therethrough.

8. The nozzle of claim 1 wherein the second flow pathway section has smooth, planar opposing converging top and bottom walls and smooth, planar opposing diverging side walls that are oriented generally perpendicular to the top and bottom walls.

9. The nozzle of claim 1 wherein the first flow pathway section has an inlet that is circular in cross section and wherein the outlet of the first flow pathway section is rectangular or generally rectangular in cross section.

10. The nozzle of claim 1 wherein the entire flow pathway has a cross sectional area that decreases or remains constant in the flow direction from an inlet to an outlet thereof.

11. The nozzle of claim 1 wherein the second flow pathway section includes or is fluidly coupled to a nozzle exit such that fluid is configured to flow from the first flow pathway section to the second flow pathway section and then exit the nozzle through the nozzle exit, and wherein the nozzle exit has a lateral dimension between 0.05 inches and 6 inches.

12. The nozzle of claim 6 wherein the transition section has a length between 0.02 inches and 2 inches.

13. The nozzle of claim 1 wherein the second flow pathway section converges with regard to cross sectional area along the flow direction along its entire length, and wherein the outlet of the second flow pathway section is rectangular or generally rectangular.

14. The nozzle of claim 1 wherein the second flow pathway section has a rectangular cross section along its entire length.

15. The nozzle of claim 6 wherein the transition section has a constant cross section along the flow direction.

16. The nozzle of claim 1 wherein the first flow pathway section does not diverge in any direction along its entire length.

17. The nozzle of claim 1 wherein the outlet of the first flow pathway section has a generally rectangular cross section.

18. The nozzle of claim 1 wherein the outlet of the first flow pathway section has a rectangular cross section.

19. The nozzle of claim 1 wherein the first flow pathway section converges along its length from a round shape at an inlet thereof to a first rectangular or generally rectangular shape at its outlet, wherein the second flow pathway section converges along its length from the first rectangular or generally rectangular shape to a second, rectangular or generally rectangular shape at an outlet thereof, wherein the second rectangular or generally rectangular shape at the outlet of the second flow pathway section is smaller in cross sectional area as compared to the first rectangular or generally rectangular shape of the second flow pathway section.

20. The nozzle of claim 1 wherein the outlet of the first flow pathway section has the same cross sectional area as the inlet of the second flow pathway section.

21. The nozzle of claim 1 wherein the first flow pathway section converges with regard to cross sectional area along the flow direction at an angle between 10 degrees and 30 degrees.

22. A nozzle comprising:

a nozzle body including a flow pathway therein through which fluid is configured to flow in a flow direction, the flow pathway having:

a first flow pathway section having a cross sectional area that decreases along the flow direction;

a second flow pathway section in fluid communication with the first flow pathway section, wherein the second flow pathway section has a cross sectional area that decreases along the flow direction, wherein the second flow pathway section converges along the flow direction at an angle greater than 0 degrees and less than or equal to 60 degrees, and diverges along the flow direction at an angle greater than 0 degrees and less than or equal to 60 degrees, such that a rate of convergence with respect to the cross sectional area is greater than a rate of divergence with respect to the cross sectional area; and a transition section positioned between the first flow pathway section and the second flow pathway section, wherein the transition section has a constant rectangular or generally rectangular cross section along the flow direction for a length of the nozzle.

23. The nozzle of claim 22 wherein the second flow pathway section has a cross sectional area that decreases along an entire length of the second flow pathway section along the flow direction, and wherein the transition section has a length between 0.02 inches and 2 inches.

24. The nozzle of claim 22 wherein the first flow pathway section converges linearly along the flow direction at an angle between 10 degrees and 30 degrees.

25. The nozzle of claim 22 wherein the second flow pathway section includes or is fluidly coupled to a nozzle exit such that fluid is configured to flow from the first flow pathway section to the second flow pathway section and then exit the nozzle through the nozzle exit, and wherein the nozzle exit has a lateral dimension between 0.05 inches and 6 inches.

26. The nozzle of claim 22 wherein the first flow pathway converges along the flow direction with regard to cross sectional area along its entire length, wherein the second flow pathway does not diverge in any direction along its entire length, and wherein the second flow pathway is rectangular or generally rectangular along its entire length.

27. A nozzle comprising:

a nozzle body including a flow pathway therein through which fluid is configured to flow in a flow direction, the flow pathway having:

a first flow pathway section that converges with regard to cross sectional area along the flow direction, wherein the first flow pathway section converges along its length from a round shape at an inlet thereof to a first rectangular or generally rectangular shape at its outlet;

a second flow pathway section in fluid communication with the first flow pathway section, wherein the second flow pathway section converges along the flow direction at an angle greater than 0 degrees and less than or equal to 60 degrees along the flow direction with respect to a first direction and simultaneously diverges along the flow direction at an angle greater than 0 degrees and less than or equal to 60 degrees along the flow direction with respect to a second direction that is different than the first direction, wherein the second flow pathway section overall has a decreasing cross sectional area along the flow direction, wherein the second flow pathway section has a rectangular or generally rectangular cross section along its entire length, wherein an outlet of the first flow pathway section has the same cross sectional shape as an inlet of the second flow pathway, wherein the second flow pathway section converges along its length from the first rectangular or generally rectangular shape to a second, rectangular or generally rectangular shape at an outlet thereof, and wherein the second rectangular or generally rectangular shape at the outlet of the second flow pathway section is smaller in cross sectional area as compared to the first rectangular or generally rectangular shape of the second flow pathway section; and a transition section positioned between the first flow pathway section and the second flow pathway section, wherein the transition section has a constant cross section along the flow direction for a length of the nozzle.

* * * * *